(12) United States Patent
Chaen et al.

(10) Patent No.: US 9,567,875 B2
(45) Date of Patent: Feb. 14, 2017

(54) POWER GENERATION APPARATUS, POWER GENERATION METHOD, DECOMPOSITION-GAS TURBINE AND DECOMPOSITION-GAS BOILER

(75) Inventors: Shigehiro Chaen, Tokyo (JP); Junichiro Kawaguchi, Sagamihara (JP); Hiroto Habu, Sagamihara (JP); Yoshitsugu Sone, Sagamihara (JP)

(73) Assignee: SHOWA DENKO K.K., Tokyo (JP)

( * ) Notice: Subject to any disclaimer, the term of this patent is extended or adjusted under 35 U.S.C. 154(b) by 214 days.

(21) Appl. No.: 14/379,698

(22) PCT Filed: Feb. 23, 2012

(86) PCT No.: PCT/JP2012/054344
§ 371 (c)(1),
(2), (4) Date: Aug. 19, 2014

(87) PCT Pub. No.: WO2013/124997
PCT Pub. Date: Aug. 29, 2013

(65) Prior Publication Data
US 2015/0007568 A1    Jan. 8, 2015

(51) Int. Cl.
*F01K 15/00* (2006.01)
*B01D 53/86* (2006.01)
(Continued)

(52) U.S. Cl.
CPC .......... *F01K 15/00* (2013.01); *B01D 53/8625* (2013.01); *F01K 7/16* (2013.01); *F01K 7/165* (2013.01);
(Continued)

(58) Field of Classification Search
CPC .......... F01K 15/00; F01K 13/02; F01K 23/10; F01K 7/16; F01K 7/165; B01D 53/8625; B01D 2255/1025; B01D 2255/1023; B01D 2255/20738; B01D 2255/20792; B01D 2255/2073; B01D 2257/402; B01D 2255/20753; B01D 2255/2047; B01D 2255/2092; F02C 3/20; F02C 9/28; F02C 9/40; F02C 1/00; F02C 1/08; F02C 1/10; F02C 6/02; F02C 1/04; Y02C 20/10; Y02E 20/14
(Continued)

(56) References Cited

U.S. PATENT DOCUMENTS 4,693,213 A * 9/1987 Yanai ................ B01D 53/8631
122/421
5,369,947 A    12/1994 Dummersdorf
(Continued)

FOREIGN PATENT DOCUMENTS

CN    201902241 U    7/2011
EP    1488845 A1    12/2004
(Continued)

OTHER PUBLICATIONS

Communication dated Oct. 28, 2015 from the European Patent Office in counterpart European Application No. 12869258.9.
(Continued)

*Primary Examiner* — Hoang Nguyen
(74) *Attorney, Agent, or Firm* — Sughrue Mion, PLLC

(57) ABSTRACT

A power generation apparatus, a power generation method, a decomposition-gas boiler, and a decomposition-gas turbine with which nitrous oxide may be used as an environmentally friendly energy source. A fuel gas including nitrous oxide ($N_2O$) is supplied to a decomposition reactor (22) in which a catalyst (21) for decomposing nitrous oxide is disposed. Steam is generated by a decomposition-gas boiler by heat recovery from decomposition gas ($N_2$, $O_2$) generated by decomposing the nitrous oxide, the steam generated by the decomposition-gas boiler is used to drive the rotation of
(Continued)

a steam turbine to obtain motive power, and the motive power is subsequently used to drive a generator to obtain electrical power. Alternatively, the decomposition gas ($N_2$, $O_2$) generated by decomposing the nitrous oxide is used to drive the rotation of a decomposition-gas turbine to obtain motive power.

16 Claims, 14 Drawing Sheets

(51) Int. Cl.

| | | |
|---|---|---|
| F02C 3/20 | (2006.01) | |
| F02C 1/04 | (2006.01) | |
| F02C 1/08 | (2006.01) | |
| F02C 1/10 | (2006.01) | |
| F02C 6/02 | (2006.01) | |
| F01K 7/16 | (2006.01) | |
| F02C 1/00 | (2006.01) | |
| F02C 9/28 | (2006.01) | |
| F02C 9/40 | (2006.01) | |
| F01K 13/02 | (2006.01) | |
| F01K 23/10 | (2006.01) | |

(52) U.S. Cl.
CPC ............... *F01K 13/02* (2013.01); *F01K 23/10* (2013.01); *F02C 1/00* (2013.01); *F02C 1/04* (2013.01); *F02C 1/08* (2013.01); *F02C 1/10* (2013.01); *F02C 3/20* (2013.01); *F02C 6/02* (2013.01); *F02C 9/28* (2013.01); *F02C 9/40* (2013.01); *B01D 2255/1023* (2013.01); *B01D 2255/1025* (2013.01); *B01D 2255/2047* (2013.01); *B01D 2255/2073* (2013.01); *B01D 2255/2092* (2013.01); *B01D 2255/20738* (2013.01); *B01D 2255/20753* (2013.01); *B01D 2255/20792* (2013.01); *B01D 2257/402* (2013.01); *Y02C 20/10* (2013.01); *Y02E 20/14* (2013.01)

(58) Field of Classification Search
USPC ....................................... 60/39.182, 670–682
See application file for complete search history.

(56) References Cited

U.S. PATENT DOCUMENTS

| | | | |
|---|---|---|---|
| 6,107,693 A * | 8/2000 | Mongia | ................. F01K 21/047 290/4 R |
| 6,500,398 B1 | 12/2002 | Tagawa et al. | |
| 6,931,832 B2 * | 8/2005 | Berg | ....................... C06B 31/00 60/206 |
| 2003/0144142 A1 | 7/2003 | Schwefer | |
| 2009/0007541 A1 | 1/2009 | Kawaguchi et al. | |
| 2009/0133788 A1 * | 5/2009 | Mungas | .................. C06B 47/04 149/74 |
| 2012/0148925 A1 * | 6/2012 | Grannell | ................. C01B 3/047 429/408 |

FOREIGN PATENT DOCUMENTS

| | | |
|---|---|---|
| JP | 59-136140 A | 8/1984 |
| JP | 05-004027 A | 1/1993 |
| JP | 06-241063 A | 8/1994 |
| JP | 11-013478 A | 1/1999 |
| JP | 2002-153734 A | 5/2002 |
| JP | 2002-253967 A | 9/2002 |
| JP | 2005-152701 A | 6/2005 |
| JP | 2005-230795 A | 9/2005 |
| JP | 2006-022687 A | 1/2006 |
| JP | 2006-181570 A | 7/2006 |
| JP | 2008-144588 A | 6/2008 |
| JP | 4232820 B2 | 3/2009 |
| JP | 2009-172494 A | 8/2009 |

OTHER PUBLICATIONS

Communication dated Apr. 3, 2015, issued by the State Intellectual Property Office of P.R. China in counterpart Chinese application No. 201280070220.0.

International Search Report for PCT/JP2012/054344 dated Mar. 19, 2012.

* cited by examiner

US 9,567,875 B2

POWER GENERATION APPARATUS, POWER GENERATION METHOD, DECOMPOSITION-GAS TURBINE AND DECOMPOSITION-GAS BOILER

CROSS REFERENCE TO RELATED APPLICATIONS

This application is a National Stage of International Application No. PCT/JP2012/054344 filed Feb. 23, 2012, the contents of all of which are incorporated herein by reference in their entirety.

TECHNICAL FIELD

The present invention relates to a power generation apparatus using heat of decomposition or decomposition gas produced by decomposition of nitrous oxide ($N_2O$, also called dinitrogen monoxide), a power generation method, a decomposition-gas turbine and a decomposition-gas boiler.

BACKGROUND OF THE INVENTION

Power generation has used energy generated by a variety of technologies. For example, thermal power generation uses energy generated by the combustion of fossil fuels such as oil and coal, and natural gas. Further, nuclear power generation uses energy generated by the fission reaction of the nuclear fuel. The demand for energy has continued to increase because of an increasingly sophisticated lifestyle and automated production technology.

However, since the level of awareness on the global environment issues, such as resource depletion and environmental destruction, has increased recently, the demand to convert from a society dependent on fossil fuels and the like to a society using renewable alternative energy and natural energy has increased.

On the other hand, regarding the use of nuclear energy, which has been advantageous in terms of energy security and environmental issues so far, there is a need to review the safety standards because of the problem of processing radioactive waste and the possibility of nuclear accidents.

Thus, in order to solve the problems related to energy and environmental issues, developing a new environmentally-friendly energy alternative to conventional nuclear power generation and thermal power generation is desired.

[Patent Document 1] Japanese Unexamined Patent Application Publication No. H05-4027
[Patent Document 2] Japanese Unexamined Patent Application Publication No. 2005-230795
[Patent Document 3] Japanese Unexamined Patent Application Publication No. 2006-181570
[Patent Document 4] Japanese Patent No. 4232820

SUMMARY OF THE INVENTION

In such a situation, by making use of the decomposition gas and the decomposition heat generated by the decomposition of nitrous oxide, the present inventors propose the use of nitrous oxide as an environmentally-friendly energy source.

Nitrous oxide is chemically stable and easy to handle. Nitrous oxide is approved as a food additive (Thirty-fourth issue the Ministry of Health, Labour and Welfare, Mar. 22, 2005). Nitrous oxide is also used as a medical anesthesia and a combustion improver of rocket.

On the other hand, as a greenhouse gas having a global warming effect about 310 times that of the carbon dioxide ($CO_2$), nitrous oxide contributes to global warming. Therefore, in recent years, in order to prevent nitrous oxide from being released into the atmosphere, for example, many techniques of removing nitrous oxide by decomposition using a catalyst from exhaust gas emitted from plants, incineration equipment, or automobiles have been developed (for example, Patent Documents 1 to 3).

The aforementioned Patent Documents 1 and 2 disclose a technique of preheating nitrous oxide using the heat generated during decomposition of nitrous oxide in the production process of adipic acid. On the other hand, the Patent Document 3 discloses a technique of increasing energy efficiency by reducing cooling energy and heating energy needed by performing heat exchange between gas introduced into a decomposition apparatus and gas discharged from the same, in the apparatus for decomposing nitrous oxide contained in the waste anesthetic gas.

However, all purposes of the techniques are removal of the nitrous oxide released into the atmosphere by decomposition. In addition, although heating (preheating) nitrous oxide before decomposition has been disclosed by using the heat generated during the decomposition of nitrous oxide, the use of nitrous oxide as an alternative to nuclear power and thermal power, proposed by the present inventors, has not been disclosed or suggested at all.

On the other hand, the present inventors have already developed thruster device that utilizes the decomposition-gas obtained by the catalytic decomposition of nitrous oxide to produce thrust (Patent Document 4). As described in Patent Document 4, it is possible to self-decomposing (pyrolysis) additional nitrous oxide when nitrous oxide is being decomposed with a nitrous oxide-decomposition catalyst.

According to such findings, by using the decomposition-gas and the decomposition heat generated by the decomposition of nitrous oxide, the present inventors have found that it is possible to use nitrous oxide as an alternative energy to nuclear and thermal power as described above. In addition, after intensive studies, the present invention has been completed.

That is, an object of the present invention is to provide a power generation apparatus using heat of decomposition or decomposition gas produced by decomposition of nitrous oxide, as a new environmentally-friendly energy; power generation method; a decomposition-gas turbine and a decomposition-gas boiler.

The present invention provides the following.
(1) A power generation apparatus, including
a decomposition-gas boiler, generating steam by heat recovery from a decomposition gas produced by decomposition of nitrous oxide,
a steam turbine, rotationally driven by a steam generated by the decomposition-gas boiler, and
an electric generator, generating electric power by driving the steam turbine.
(2) A power generation apparatus, including
a decomposition-gas turbine, rotationally driven by decomposition gas produced by decomposition of nitrous oxide and
an electric generator, generating electric power by driving the decomposition-gas turbine.
(3) The power generation apparatus according to (1) or (2),
wherein the decomposition-gas turbine or the decomposition-gas boiler include a decomposition reaction unit, in which a nitrous oxide decomposition catalyst for decomposition of the nitrous oxide is placed; and a fuel gas supply device, which supplies a fuel gas including nitrous oxide to the decomposition reaction unit, and in the decomposition reaction unit, after decomposition of the nitrous oxide contained in the fuel gas using the nitrous oxide decomposition catalyst, decomposition of a nitrous oxide contained in a fuel gas which is supplied after the decomposition of the nitrous oxide contained in the fuel gas is continued by using the decomposition heat generated by decomposing the nitrous oxide.

(4) The power generation apparatus according to (3), wherein the decomposition-gas turbine or the decomposition-gas boiler further includes a flow regulating device for regulating the flow rate of the fuel gas supplied to the decomposition reaction unit, and temperature of the decomposition-gas is controlled by adjusting the flow rate of the fuel gas supplied to the decomposition reaction unit.

(5) The power generation apparatus according to (3) or (4), wherein the decomposition-gas turbine or the decomposition-gas boiler further includes a concentration adjustment device for adjusting the concentration of nitrous oxide contained in the fuel gas, and temperature of the decomposition-gas is controlled by adjusting the concentration of the fuel gas supplied to the decomposition reaction unit.

(6) The power generation apparatus according to (5)

wherein the concentration adjustment device adjusts the concentration of nitrous oxide contained in the fuel gas by adding nitrogen to the fuel gas.

(7) The power generation apparatus according to any one of (4) to (6), wherein the decomposition-gas turbine or the decomposition-gas boiler further includes a temperature measuring device for measuring the temperature of the decomposition-gas or the nitrous oxide decomposition catalyst or the decomposition-gas boiler, and the flow rate adjusting device adjusts the flow rate based on a result measured by the temperature measuring unit, or the concentration adjustment device adjusts the concentration based on a result measured by the temperature measuring unit.

(8) The power generation apparatus according to any one of (3) to (7), wherein the decomposition-gas turbine or the decomposition-gas boiler further includes a preheating device for preheating the nitrous oxide decomposition catalyst for decomposition, and the nitrous oxide decomposition catalyst is pre-heated before starting the decomposition of the nitrous oxide.

(9) The power generation apparatus according to (3) to (8), wherein the decomposition-gas turbine or the decomposition-gas boiler further includes a nitrogen gas supply device for supplying the nitrogen gas to the decomposition reaction unit, and the nitrogen gas is supplied into the decomposition reaction unit after stopping the supply of fuel gas to the decomposition reaction unit.

(10) The power generation apparatus according to (2), wherein the power generation apparatus further includes a decomposition-heat-recovery boiler, generating steam by heat recovery from a decomposition gas produced by the decomposition-gas turbine, a steam turbine, rotationally driven by a steam generated by the decomposition-heat-recovery boiler, and an electric generator, generating electric power by driving the steam turbine.

(11) The power generation apparatus according to any one of (1), (2), (10), wherein the power generation apparatus further includes a combustion-gas boiler, generating steam by heat recovery from the combustion gas boiler to generate steam by heat recovery from the combustion gas when fuel is burned by using the decomposition gas discharged from the decomposition-heat-recovery boiler, the decomposition-gas turbine, or the decomposition-gas boiler, a steam turbine, rotationally driven by a steam generated by the combustion-gas boiler, and an electric generator, generating electric power by driving the steam turbine.

(12) The power generation apparatus according to any one of (1), (2), (10), wherein the power generation apparatus further includes a combustion-gas turbine, rotationally driven by combustion gas when fuel is burned by using the decomposition gas discharged from the decomposition-heat-recovery boiler, the decomposition-gas turbine, or the decomposition-gas boiler, and an electric generator, generating electric power by driving the steam turbine.

(13) The power generation apparatus according to (12), wherein the power generation apparatus further includes an exhaust-heat-recovery boiler that generates steam by heat recovery from combustion gas discharged from the combustion-gas turbine, a steam turbine, rotationally driven by a steam generated by the exhaust-heat-recovery boiler, and an electric generator, generating electric power by driving the steam turbine.

(14) The power generation apparatus according to any one of (1), (10), (11) and (13), wherein the power generation apparatus further includes a condenser for condensing and cooling the steam from the steam turbine, and a feed water pump to feed condensed water to the boiler from the condenser.

(15) A power generation method, including steps of generating the steam by a decomposition-gas boiler by heat recovery from decomposition gas produced by decomposition of nitrous oxide, rotationally driving a steam turbine by a steam generated by the decomposition-gas boiler, and generating electric power by an electric generator by driving the steam turbine.

(16) A power generation method, including steps of:

rotationally driving a decomposition-gas turbine by decomposition gas produced by decomposing nitrous oxide, and generating electric power using an electric generator by driving the decomposition-gas turbine.

(17) The power generation method according to (15) or (16), wherein a fuel gas including nitrous oxide is supplied to a decomposition reaction unit in which a nitrous oxide decomposition catalyst for decomposition of the nitrous oxide is placed, and in the decomposition reaction unit, after a decomposition of the nitrous oxide contained in the fuel gas by using the nitrous oxide decomposition catalyst, by using the decomposition heat generated by decomposing the nitrous oxide, a decomposition of a nitrous oxide contained in a fuel gas which is supplied after the decomposition of the nitrous oxide contained in the fuel gas is continued.

(18) The power generation method according to (17), wherein continuous decomposition of the nitrous oxide is carried out by controlling the temperature of the decomposition gas.

(19) The power generation method according to (18), wherein the temperature of the decomposition gas is controlled by adjusting the flow rate of the fuel gas.

(20) The power generation method according to (18) or (19), wherein the temperature of the decomposition-gas is controlled by adjusting the concentration of the nitrous oxide contained in the fuel gas.

(21) The power generation method according to (20), wherein the concentration of nitrous oxide contained in the fuel gas is adjusted by adding nitrogen to the fuel gas.

(22) The power generation method according to (20), wherein the temperature of the decomposition-gas is controlled on the basis of results of the measurements of the temperatures of the decomposition gas or the nitrous oxide decomposition catalyst.

(23) The power generation method according to any one of (17) to (22), wherein the nitrous oxide decomposition catalyst is preheated before starting the decomposition of the nitrous oxide.

(24) The power generation method according to any one of (17) to (23), wherein nitrogen gas is supplied to the decomposition reaction unit after stopping the supply of fuel gas to the decomposition reaction unit.

(25) The power generation method according to (16),
wherein the method further includes steps of:
generating the steam using a decomposition-heat-recovery boiler by heat recovery from a decomposition gas produced by decomposition of nitrous oxide;
rotationally driving a steam turbine using steam generated by the decomposition-heat-recovery boiler, and
generating electric power using an electric generator by driving the steam turbine.

(26) The power generation method according to any one of (15), (16), and (25), wherein the method further includes steps of
generating steam by a combustion-gas boiler by heat recovery from the combustion gas when fuel is burned by using the decomposition gas discharged from the decomposition-heat-recovery boiler, the decomposition-gas turbine, or the decomposition-gas boiler,
rotationally driving a steam turbine by a steam generated by the combustion-gas boiler, and
generating electric power by an electric generator by driving the steam turbine.

(27) The power generation method according to any one of (15), (16), and (25),
wherein the method further includes steps of
rotationally driving a combustion-gas turbine by combustion gas when fuel is burned by using the decomposition gas discharged from the decomposition-heat-recovery boiler, the decomposition-gas turbine, or the decomposition-gas boiler, and
generating electric power using an electric generator by driving the combustion-gas turbine.

(28) The power generation method according to (27), wherein the method further includes steps of
generating steam using an exhaust-heat-recovery boiler by heat recovery from the combustion gas discharged from the combustion-gas turbine;
rotationally driving a steam turbine using steam generated by the exhaust-heat-recovery boiler; and
generating electric power using an electric generator by driving the steam turbine.

(29) The power generation method according to (15), (16), (25) and (28), wherein the method further includes steps of
condensing and cooling the steam discharged from the steam turbine using a condenser, and
feeding condensed water to the boiler from the condenser.

(30) A decomposition-gas boiler, which generates steam or hot water by heat recovery from a decomposition gas produced by decomposition of nitrous oxide.

(31) The decomposition-gas boiler according to (30), further including
a decomposition reaction unit, in which a nitrous oxide decomposition catalyst for decomposition of the nitrous oxide is placed; and
a fuel gas supply device, which supplies a fuel gas including nitrous oxide to the decomposition reaction unit, and
in the decomposition reaction unit, after a decomposition of the nitrous oxide contained in the fuel gas using the nitrous oxide decomposition catalyst, using the decomposition heat generated by decomposing the nitrous oxide, to decompose a nitrous oxide contained in a fuel gas which is supplied after the decomposition of the nitrous oxide contained in the fuel gas is continued.

(32) The decomposition-gas boiler according to (31), further including
a flow regulating device for regulating the flow rate of the fuel gas supplied to the decomposition reaction unit, and temperature of the decomposition-gas is controlled by adjusting the flow rate of the fuel gas supplied to the decomposition reaction unit.

(33) The decomposition-gas boiler according to (31) or (32), further including
a concentration adjustment device for adjusting the concentration of nitrous oxide contained in the fuel gas, and a temperature of the decomposition-gas is controlled by adjusting the concentration of the fuel gas supplied to the decomposition reaction unit.

(34) The decomposition-gas boiler according to (33), wherein the concentration adjustment device adjusts the concentration of nitrous oxide contained in the fuel gas by adding nitrogen to the fuel gas.

(35) The decomposition-gas boiler according to any one of (32) to (34), further including
a temperature measuring device for measuring the temperature of the decomposition-gas or the nitrous oxide decomposition catalyst or the decomposition-gas boiler,
wherein the flow rate adjusting device adjusts the flow rate based on a result measured by the temperature measuring unit, or the concentration adjustment device adjusts the concentration based on a result measured by the temperature measuring unit.

(36) The decomposition-gas boiler according to any one of (31) to (35), further including
a preheating device for preheating the nitrous oxide decomposition catalyst for decomposition,
wherein the nitrous oxide decomposition catalyst is preheated before starting the decomposition of the nitrous oxide.

(37) The decomposition-gas boiler according to any one of (31) to (36), further including
a nitrogen gas supply device for supplying the nitrogen gas to the decomposition reaction unit,
wherein the nitrogen gas is supplied into the decomposition reaction unit after stopping the supply of fuel gas to the decomposition reaction unit.

(38) A decomposition-gas turbine, which is rotationally driven by a decomposition gas produced by decomposition of nitrous oxide.

(39) The decomposition-gas turbine according to (38), further including a decomposition reaction unit, in which a nitrous oxide decomposition catalyst for decomposition of the nitrous oxide is placed; and a fuel gas supply device, which supplies a fuel gas including nitrous oxide to the decomposition reaction unit, and in the decomposition reaction unit, after a decomposition of the nitrous oxide contained in the fuel gas using the nitrous oxide decomposition catalyst, by using the decomposition heat generated by decomposing the nitrous oxide to decompose nitrous oxide contained in a fuel gas which is supplied after the decomposition of the nitrous oxide contained in the fuel gas is continued.

(40) The decomposition-gas turbine according to (39), further including a flow regulating device for regulating the flow rate of the fuel gas supplied to the decomposition reaction unit, and temperature of the decomposition-gas is controlled by adjusting the flow rate of the fuel gas supplied to the decomposition reaction unit.

(41) The decomposition-gas turbine according to (39) or (40), further including a concentration adjustment device for adjusting the concentration of nitrous oxide contained in the fuel gas, and temperature of the decomposition-gas is controlled by adjusting the concentration of the fuel gas supplied to the decomposition reaction unit.

(42) The decomposition-gas turbine according to (41), wherein the concentration adjustment device adjusts the concentration of nitrous oxide contained in the fuel gas by adding nitrogen to the fuel gas.

(43) The decomposition-gas turbine according to any one of (40) to (42), further including a temperature measuring device for measuring the temperature of the decomposition-gas or the nitrous oxide decomposition catalyst or the decomposition-gas boiler, wherein the flow rate adjusting device adjusts the flow rate based on a result measured by the temperature measuring unit, or the concentration adjustment device adjusts the concentration based on a result measured by the temperature measuring unit.

(44) The decomposition-gas turbine according to any one of (40) to (43), further including a preheating device for preheating the nitrous oxide decomposition catalyst for decomposition, wherein the nitrous oxide decomposition catalyst is preheated before starting the decomposition of the nitrous oxide.

(45) The decomposition-gas turbine according to any one of (39) to (44), further including a nitrogen gas supply device for supplying the nitrogen gas to the decomposition reaction unit, wherein the nitrogen gas is supplied into the decomposition reaction unit after stopping the supply of fuel gas to the decomposition reaction unit.

(46) A heat transport apparatus, including a decomposition-gas boiler, generating steam by heat recovery from a decomposition gas produced by decomposition of nitrous oxide, a steam turbine, rotationally driven by steam generated by the decomposition-gas boiler, and a heat pump, carrying out heat transport by driving the steam turbine.

(47) A heat transport apparatus, including a decomposition-gas turbine, rotationally driven by decomposition gas produced by decomposition of nitrous oxide, and a heat pump, carrying out heat transport by driving the steam turbine.

(48) The heat transport apparatus according to (47), further including a decomposition-heat-recovery boiler, generating steam by heat recovery from a decomposition gas produced by the decomposition-gas turbine, a steam turbine, rotationally driven by a steam generated by the decomposition-heat-recovery boiler, and a heat pump, carrying out heat transport by driving the steam turbine.

(49) The heat transport apparatus according to any one of (46) to (48), further including a combustion-gas boiler, generating steam by heat recovery from the combustion gas boiler to generate steam by heat recovery from the combustion gas when fuel is burned by using the decomposition gas discharged from the decomposition-heat-recovery boiler, the decomposition-gas turbine, or the decomposition-gas boiler, a steam turbine, rotationally driven by a steam generated by the combustion-gas boiler, and a heat pump, carrying out heat transport by driving the steam turbine.

(50) The heat transport apparatus according to any one of (46) to (48), further including a combustion-gas turbine, rotationally driven by combustion gas when fuel is burned by using the decomposition gas discharged from the decomposition-heat-recovery boiler, the decomposition-gas turbine, or the decomposition-gas boiler, and a heat pump, carrying out heat transport by driving the steam turbine.

(51) The heat transport apparatus according to (50), further including an exhaust-heat-recovery boiler that generates steam by heat recovery from combustion gas discharged from the combustion-gas turbine, a steam turbine, rotationally driven by a steam generated by the exhaust-heat-recovery boiler, and a heat pump, carrying out heat transport by driving the steam turbine.

(52) The heat transport apparatus according to any one of (46), (48), (49), (51) further including a condenser for condensing and cooling the steam from the steam turbine, and a feed water pump to feed condensed water to the boiler from the condenser.

(53) The heat transport apparatus according to any one of (46) to (52), wherein the heat pump includes a refrigerant circulation system of circulating a refrigerant;

a compression unit of compressing and feeding the refrigerant in the refrigerant circulation system;

a condensation unit of condensing the coolant compressed by the compression unit and, at the same time, releasing heat from the refrigerant;

an expanding unit of expanding the refrigerant from which heat is released in the condensation unit;

an evaporating unit of evaporating the refrigerant which is expanded in the expanding unit, and at the same time, making the refrigerant to absorb the heat, and the condensation unit is driven by the steam turbine, the decomposition-gas turbine and the combustion-gas turbine.

(54) The heat transport apparatus according to (53) further including
a switching device for switching the flow direction of the refrigerant.

(55) A heat transport method, including steps of
generating the steam by a decomposition-gas boiler by heat recovery from a decomposition gas produced by decomposition of nitrous oxide,
rotationally driving a steam turbine by a steam generated by the decomposition-gas boiler, and
carrying out heat transport by a heat pump by driving the steam turbine.

(56) A heat transport method, including steps of
rotationally driving a decomposition-gas turbine by decomposition gas produced by decomposition of nitrous oxide, and
carrying out heat transport by a heat pump by driving the steam turbine.

(57) The heat transport method according to (56),
wherein the method further includes steps of
generating the steam by a decomposition-heat-recovery boiler by heat recovery from a decomposition gas produced by decomposition of nitrous oxide,
rotationally driving a steam turbine by a steam generated by the decomposition-heat-recovery boiler, and
carrying out heat transport by a heat pump by driving the steam turbine.

(58) The heat transport method according to any one of (55) to (57),
wherein the method further includes steps of
generating steam by a combustion-gas boiler by heat recovery from the combustion gas when fuel is burned by using the decomposition gas discharged from the decomposition-heat-recovery boiler, the decomposition-gas turbine, or the decomposition-gas boiler,
rotationally driving a steam turbine by a steam generated by the combustion-gas boiler, and
carrying out heat transport by a heat pump by driving the steam turbine.

(59) The heat transport method according to any one of (55) to (57),
wherein the method further includes steps of
rotationally driving a combustion-gas turbine by combustion gas when fuel is burned by using the decomposition gas discharged from the decomposition-heat-recovery boiler, the decomposition-gas turbine, or the decomposition-gas boiler, and
carrying out heat transport by a heat pump by driving the steam turbine.

(60) The heat transport method according to of (59),
wherein the method further includes steps of
generating steam by an exhaust-heat-recovery boiler by heat recovery from the combustion gas discharged from the combustion-gas turbine,
rotationally driving a steam turbine by a steam generated by the exhaust-heat-recovery boiler, and
carrying out heat transport by a heat pump by driving the steam turbine.

(61) The heat transport method according to any one of (55), (57),(58) and (60),
wherein the method further includes steps of condensing and cooling the steam by a condenser from the steam turbine, and feeding condensed water to the boiler from the condenser.

(62) A heat transport apparatus, including
a refrigerant circulating system of circulating a refrigerant;
an absorption liquid circulation system which is connected to a refrigerant circulating system and circulates the absorption liquid which absorbing the refrigerant;
a condensation unit of condensing the refrigerant compressed by the compression unit and, at the same time, releasing heat from the refrigerant;
an evaporating unit of evaporating the refrigerant which is expanded in the expanding unit, and at the same time, making the refrigerant to absorb the heat;
an absorption unit of making the absorption liquid in absorption liquid circulation system to absorb the evaporated refrigerant; and
a regeneration unit of making the absorbed refrigerant evaporate from the absorption liquid in the absorption liquid circulation system,
wherein the regeneration unit includes a heating device for heating the absorption liquid, and
the heating device performs heating by using a decomposition heat generated by decomposition of nitrous oxide.

(63) The heat transport apparatus according to (62),
wherein the condensation unit and/or the absorption unit includes a cooling device which cools the refrigerant/or the absorption liquid, and the cooling device carries out cooling by using cooling heat due to an adiabatic expansion of nitrous oxide.

(64) The heat transport apparatus according to (63), further includes
a high pressure gas container to which the nitrous oxide is filled, wherein nitrous oxide which is discharged from the high pressure gas container is expanded by adiabatic expansion is supplied to the condensation unit and/or the absorption unit.

(65) The heat transport apparatus according to (63), further includes
a decomposition reaction unit in which nitrous oxide-decomposition catalyst for decomposition of nitrous oxide is placed,
a first supply line supplying the nitrous oxide gas obtained by allowing adiabatic expansion of the nitrous oxide to the condensation unit and/or the absorption unit,
a second supply line supplying the nitrous oxide gas discharged from the condensation unit and/or the absorption unit to the decomposition reaction unit; and
a third supply line supplying a decomposition-gas of nitrous oxide obtained by decomposing the nitrous oxide gas by the decomposition reaction unit to the regeneration unit.

(67) A heat transport method, including steps of
condensing a refrigerant in a refrigerant circulation system, at the same time, releasing heat from the refrigerant, in the refrigerant circulating system in which the refrigerant is circulated;
evaporating the refrigerant in the refrigerant circulation system, and at the same time, making the refrigerant to absorb the heat;
absorbing the evaporated refrigerant by the absorption liquid in the absorption liquid circulation system, in the absorption liquid circulation system which is connected to a refrigerant circulation system and circulates the absorption liquid which absorbing the refrigerant; and
regenerating the refrigerant by evaporating the absorption liquid in the absorption liquid circulation system,
wherein in the regenerating step, the absorption liquid is heated by using the decomposition heat generated by the decomposition of nitrous oxide.

(68) The heat transport method according to (67), wherein in the condensing and/or absorbing steps, the absorption liquid and/or the refrigerant is cooled by using a cooling heat during adiabatic expansion of nitrous oxide.

(69) The heat transport method according to (68), wherein in the condensing and/or absorbing steps, nitrous oxide gas obtained after adiabatic expansion is used, wherein which the nitrous oxide gas is discharged from the high pressure gas container.

(70) The heat transport method according to (68), wherein after cooling the refrigerant in the condensing/or absorbing step by using nitrous oxide gas which is obtained by allowing adiabatic expansion of the nitrous oxide, the nitrous oxide gas is decomposed by using a nitrous oxide decomposition catalyst, and then the absorbing liquid is heated by using the decomposition-gas of nitrous oxide obtained by the decomposition of nitrous oxide gas, in the regenerating step.

(71) A cogeneration system, which includes the power generation apparatus according to any one of (1) to (14) and the heat transport apparatus according to any one of (46) to (54).

(72) The cogeneration system according to (71), further includes the heat transport apparatus according to any one of (62) to (65).

(73) A cogeneration system, which includes the power generation apparatus according to any one of (1) to (14) and the heat transport apparatus according to any one of (62) to (65).

As described above, according to the present invention, it is possible to provide a power generation apparatus that enables the use of nitrous oxide as an environmentally-friendly energy, power generation method, a decomposition-gas turbine and a decomposition-gas boiler.

BRIEF DESCRIPTION OF THE DRAWINGS

FIG. 7 (a) is a schematic system diagram in the case of adopting the single shaft type, and FIG. 7 (b) is a system diagram in the case of adopting the multi-shaft type.

FIG. 9 (b) is a schematic system diagram showing a configuration adding a combustion-gas turbine in the power generation apparatus shown in FIG. 1, FIG. 2 or FIG. 7.

FIG. 12 (a) is a schematic system diagram in the case of adopting a single shaft type, and FIG. 12 (b) is a schematic diagram in the case of adopting a multi-axial shaft.

FIG. 15 (a) is a schematic system diagram showing a state of cooling, and FIG. 15 (b) is a schematic system diagram showing the state of heating.

DETAIL DESCRIPTION OF THE INVENTION

Hereinafter, a power generation apparatus, a power generation method, a decomposition-gas turbine and a decomposition-gas boiler according to the present invention, will be described in detail with reference to the drawings.

An electric power is able to be obtained by the power generation apparatus and the power generation method of the present invention using a decomposition-gas and a decomposition heat generated by the decomposition of nitrous oxide ($N_2O$, also called dinitrogen monoxide), and using nitrous oxide as an environmentally-friendly energy.

Nitrous oxide is a stable gas at room temperature and atmospheric pressure. On the other hand, the temperature of heat generation by self-decomposition (pyrolysis) is about 500° C. or more. Thus, the decomposition of nitrous oxide generates heat (exothermic reaction). Since the temperature of the decomposition-gas of nitrous oxide heated may rise to as high as about 1600° C. (decomposition heat), nitrous oxide is acknowledged as a substance with high internal energy.

Further, when nitrous oxide is decomposed using a catalyst, the decomposition start temperature may decrease to, for example, 350 to 400° C. Then, after decomposition of nitrous oxide, it is possible that the decomposition heat generated by the decomposition of nitrous oxide is used in continuous decomposition of nitrous oxide supplied subsequently. Furthermore, when nitrous oxide is decomposed using a catalyst, the mixed gas (decomposition-gas) of nitrogen ($N_2$) and oxygen ($O_2$) are yielded while heat is generated.

By utilizing the decomposition-gas and the decomposition heat generated by the decomposition of nitrous oxide, the present inventors found that it is possible to use nitrous oxide as an alternative energy source to replace nuclear power or thermal power using the above-described conventional energy source. After further intensive studies, the present invention was accomplished.

The power generation apparatus and power generation methods shown in FIGS. 1 and 2 as an embodiment of the present invention will be described hereinafter.

Figure 1:
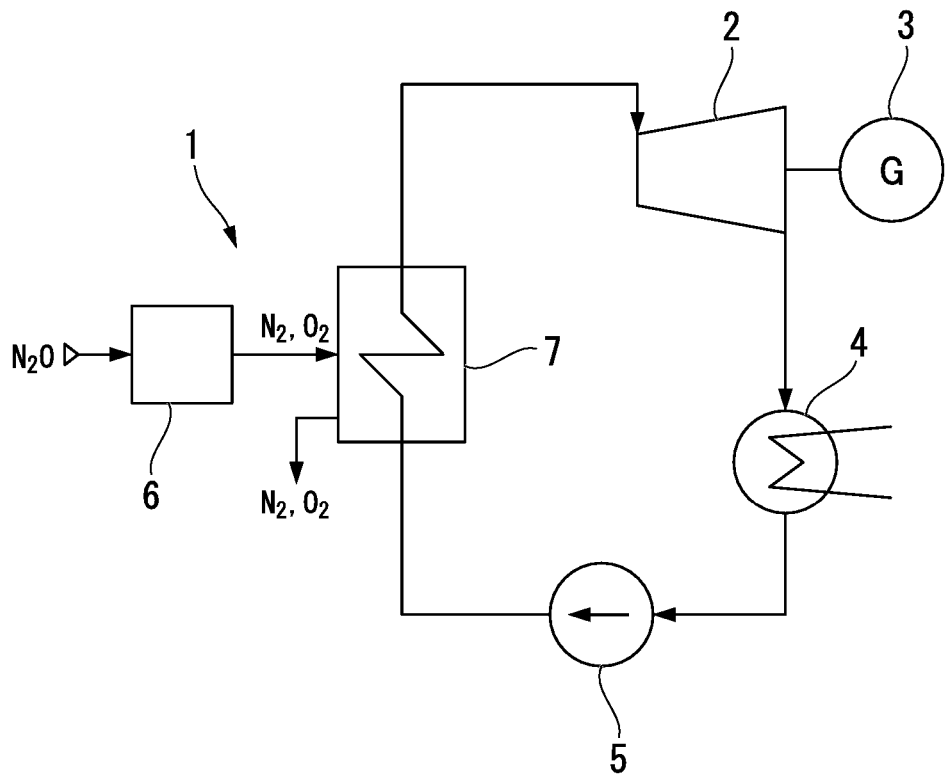
FIG. 1 is a schematic system diagram showing a configuration of a power generation apparatus including a decomposition-gas boiler according to the present invention.

FIG. 1 is a schematic system diagram showing the configuration of a power generation apparatus including a decomposition-gas boiler 1 according to the present invention. The power generation apparatus obtains electric power using the decomposition heat generated by the decomposition of nitrous oxide ($N_2O$).

Specifically, the power generation apparatus shown in FIG. 1 includes a decomposition-gas boiler 1 generating steam by heat recovery from decomposition-gas ($N_2$, $O_2$) produced by decomposition of nitrous oxide, a steam turbine 2 which is rotationally driven by the steam generated in decomposition-gas boiler 1, an electric generator 3 which generates power by driving the steam turbine 2, a condenser 4 for condensing and cooling the steam from the steam turbine 2, and a water supply pump 5 which supplies condensed water from the condenser 4 to the decomposition-gas boiler 1.

Further, the decomposition-gas boiler 1 according to the present invention includes a decomposition reaction unit 6 for decomposing nitrous oxide and a steam generating unit 7 for generating steam by heat exchange with the decomposition gas generated by the decomposition of nitrous oxide.

Figure 2:
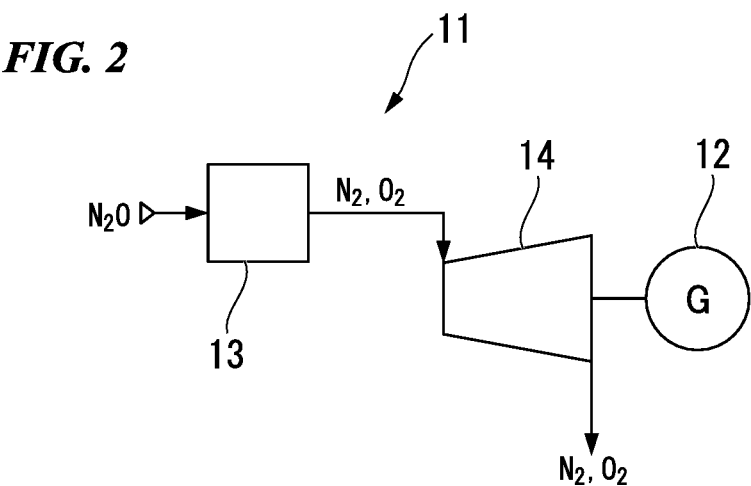
FIG. 2 is a schematic system diagram showing a configuration of a power generation apparatus including a decomposition-gas turbine according to the present invention.

On the other hand, FIG. 2 is a schematic system diagram showing a configuration of a power generation apparatus including a decomposition-gas turbine 11 according to the present invention. In the power generation apparatus, power is obtained using the decomposition-gas ($N_2$, $O_2$) produced by decomposition of nitrous oxide ($N_2O$).

Specifically, the power generation apparatus shown in FIG. 2 as a schematic system diagram includes the decomposition-gas turbine 11 which is rotationally driven by a decomposition gas generated by the decomposition of nitrous oxide, and an electric generator 12 that generates electric power by driving the decomposition-gas turbine 11.

Further, the decomposition-gas turbine 11 according to the present invention includes the decomposition reaction unit 13 for decomposing nitrous oxide, and a turbine unit 14 in which the power is obtained by rotating the turbine shaft by spraying decomposition gas produced by decomposition of nitrous oxide to a turbine blade (moving blade) from the nozzle (stationary blade).

As a feature of the present invention, the decomposition-gas turbine 11 or the decomposition-gas boiler 1 shown in FIGS. 1 and 2 include a decomposition reaction units 6, 13 for decomposing nitrous oxide as described above. That is, the decomposition reaction units 6, 13 are used as alternative units to combustors (combustion reactor) included in a conventional combustion gas boiler to generate steam by using combustion heat obtained when combusting fossil fuels, or a combustion-gas turbine which is rotated by utilizing the combustion gas when combusting fossil fuels.

Figure 3:
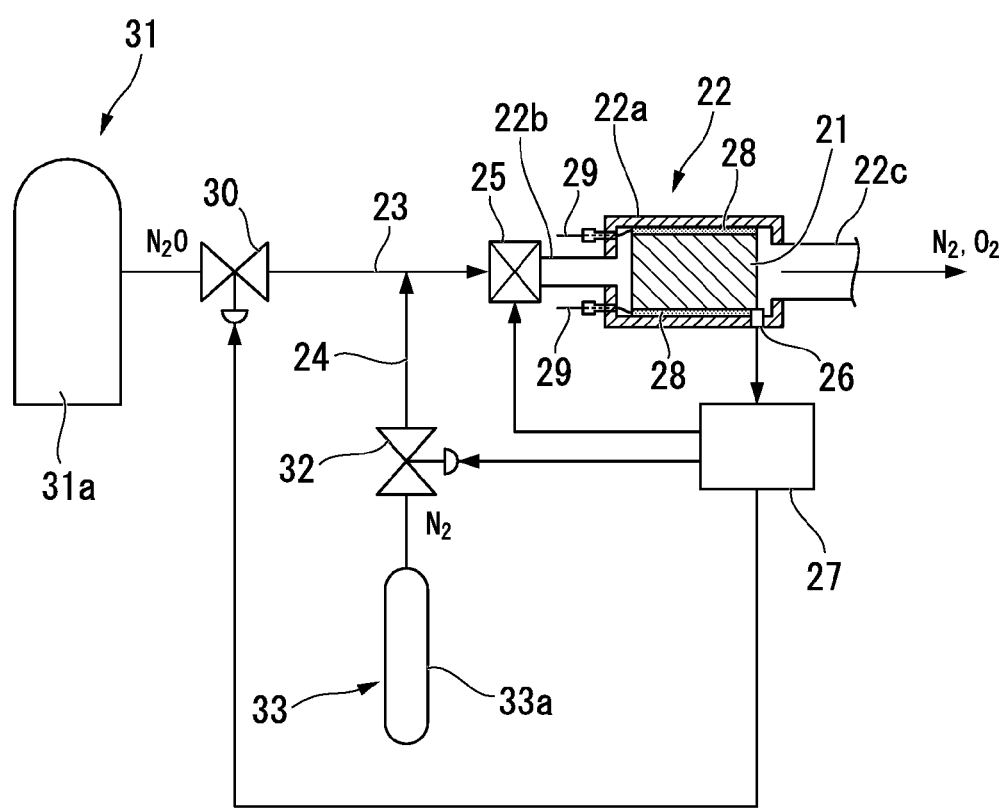
FIG. 3 is a schematic diagram showing a feature of the present invention including a decomposition-gas turbine shown in FIG. 2 and decomposition-gas boiler shown in FIG. 1.

Specifically, as shown in FIG. 3, the feature of the present invention includes a decomposition reactor 22 (corresponding to the reaction unit 6, 13) in which a nitrous oxide decomposition catalyst (hereinafter, simply refer to "catalyst") for decomposing nitrous oxide is placed, a fuel gas supply line (fuel gas supply device) 23 which supplies fuel gas containing nitrous oxide ($N_2O$) to the decomposition reactor 22, a nitrogen gas supply line (nitrogen gas supply unit) 24 which supplies nitrogen gas ($N_2$) to the decomposition reactor 22, a flow rate adjusting unit 25 (flow rate adjusting device) which adjusting a flow rate of fuel gas supplied to the decomposition reactor 22, a temperature measuring unit 26 (temperature measuring device) for measuring the temperature of the catalyst 21, and a control unit 27 (control device) for controlling the temperature of the various units.

The decomposition reactor 22A includes a main body portion 22*a* in which the catalyst 21 is housed inside, a gas inlet 22*b* from which the fuel gas is introduced and which is placed at one end of the main body portion 22*a*, and a gas outlet 22*c* from which decomposition-gas is discharged and which is placed at another end of the main body portion 22*a*.

As a material of the decomposition reactor 22, the material having excellent oxidation resistance and heat resistance are preferred. Particularly as a material of the portion which are on the side of the gas outlet 22*c* which is exposed to high temperature and high pressure of the decomposition-gas, the material that can withstand oxidation or thermal fatigue under high temperature and high pressure is preferred. As examples of such materials, Ni-based alloys and stainless steels, and Co-based alloys may be used. Further, silicon carbide ceramics (SiC) and the like may be used as a thermal barrier material. Further, it is possible to use a composite material thereof. Further, the decomposition reactor 22 may include a forcibly cooling structure utilizing air cooling or water cooling.

It is preferable that the catalyst 21 is not only able to efficiently decompose nitrous oxide in the a wide temperature range (low temperature range in particular), but also to withstand oxidation or thermal fatigue at high temperature. Catalysts with an excellent oxidation resistance and heat resistance, and with a high efficiency of decomposition nitrous oxide, which are disclosed and described in, for example, "Japanese Unexamined Patent Application Publication No. 2002-153734" and "Japanese Unexamined Patent Application Publication No. 2002-253967" which will be mentioned later, may be used.

Specifically, it is possible to use as a catalyst any one of the following (1) to (6).

(1) Catalyst in which aluminum (Al), magnesium (Mg) and rhodium (Rh) are supported on a carrier.

(2) Catalyst in which rhodium (Rh) and magnesium (Mg) are supported on a carrier made from alumina ($Al_2O_3$)

(3) Catalyst in which rhodium (Rh) is supported on a carrier of a spinel crystalline composite made from at least magnesium (Mg) and aluminum (Al).

(4) Catalyst in which aluminum (Al), rhodium (Rh), and at least one metal selected from the group consisting of manganese (Mn), Zinc (Zn), iron (Fe) and nickel (Ni) are supported on a carrier.

(5) Catalyst in which rhodium (Rh), and at least one metal selected from the group consisting of manganese (Mn), zinc (Zn), iron (Fe) and nickel (Ni) are supported on a carrier made from alumina ($Al_2O_3$).

(6) Catalyst in which rhodium (Rh) is supported on a carrier of a spinel crystalline composite made from at least one metal selected from the group consisting of manganese (Mn), zinc (Zn), iron (Fe) and nickel (Ni).

Further, in the present invention, the catalyst in which at least one of the noble metals selected from the group consisting of rhodium (Rh), ruthenium (Ru), palladium (Pd) is supported on the carriers made from silica ($SiO_2$) or silica-alumina($SiO_2$—$Al_2O_3$), can be suitably used. By using such the catalyst 21, it is possible to decompose nitrous oxide into nitrogen and oxygen in the decomposition efficiency close to 100%. In particular, in the case of using a catalyst rhodium (Rh) supported on a carrier consisting of silica ($SiO_2$) or silica-alumina ($SiO_2$—$Al_2O_3$), it is possible that little NO gas, such as nitric oxide (NO) nitrogen dioxide ($NO_2$), is generated, and nitrous oxide decomposes into nitrogen and oxygen almost completely.

Further, the catalyst 21 may use, for example, a catalyst which is obtained by impregnating the support of porous ceramic, metal honeycomb or cordierite wash-coated alumina with 2-3% by weight fraction of active rhodium which is effective to decompose nitrogen oxides. The catalyst 21 may use, for example, a catalyst in which active rhodium for decomposing nitrogen oxides is supported on the carrier layer which is made from alumina and formed on the structure of the ceramic honeycomb structure made from silicon carbide, cordierite or alumina. However, it is not limited thereto.

Further, the catalyst 21 may use, for example, a catalyst that is used to decompose and remove the nitrous oxide in exhaust gas emitted by the manufacturing processes of nitric acid and the manufacturing process of adipic acid. Such catalysts include, for example, a catalyst represented by $MAl_2O_3$ (M is any one of Pd, Cu, Cu/Mg, Cu/Zn, Cu/Zn/Mg), and in which noble metal in an amount of 0.1 to 2 wt % is supported on the carrier made from alumina containing 10 to 30 wt % of M.

The shape of the catalyst 21, is not limited particularly, for example, may be powders, granules, pellets, honeycomb, porous, crushed shape, mesh, plate, or sheet-like, and may be those appropriately selected as the best shape and size from any shapes.

In addition, the method of filling the catalyst 21 into the main body portion 22a, and the shape of the body portion 22a selected in accordance with the catalyst 21 may be selected to match the design of the decomposition reaction units 6, 13 included in the decomposition-gas boiler 1 and the decomposition-gas turbine 11, arbitrarily.

In accordance with the overtime deterioration of the catalyst 21, the decomposition reactor 22 (the whole of main body portion 22a, optionally) may include catalyst 21 which is replaceable. Further, after the noble metal is recovered, extracted and purified from the degraded catalyst 21, a catalyst in which the recovered noble metal is supported on the new carrier may be used as a regenerated catalyst.

The decomposition reactor 22 includes a heater (preheating device) 28 for heating the catalyst 21. The heater 28 is used for pre-heating catalyst 21 to the temperature at which nitrous oxide starts to decompose (decomposition starting temperature), before starting the decomposition of nitrous oxide, that is, before supplying the fuel gas to the decomposition reactor 22.

For example, the heater 28 shown in FIG. 3, are placed in contact around the catalyst 21 inside the main body portion 22a. Further, the heater 28 is electrically connected to a power source (not shown) via the supply line 29, which makes it possible to generate heat by the power supply from the power source. Further, the heater 28 may use an induction heating system, a resistance heating system or the like.

The method of heating the catalyst 21 by a heater 28 includes, not limited to, heating the catalyst 21 by a heater 28 disposed inside the main body portion 22a as described above. The method of heating the catalyst 21 may also include heating the catalyst 21 by a heater 28 disposed outside of the main body portion 22a. In this case, it is possible to heat the main body portion 22a by the heater 28, and then to heat the catalyst 21 by conduction or radiation from the body portion 22a.

Further, the heating method of the catalyst 21 may include heating the catalyst 21 by providing power directly to the catalyst 21. The heating method of the catalyst 21 is not limited particularly, and may include heating the catalyst 21 by a method selected appropriately.

The fuel gas supply line (channel) 23 includes one end which is connected to input side of the decomposition reactor 22 (gas inlet port 22b) via a flow rate adjusting device 25, and another end which is connected to fuel gas supply source 31 via a fuel gas valve 30.

The fuel gas valve 30 is a device for opening and closing the fuel gas supply line 23, and performs supply/shutoff of the fuel gas from the fuel gas supply source 31 (switching device). The fuel gas valve 30 may not only be used to open and close the fuel gas supply line 23, but may also be used to adjust the opening amount (including adjusting pressure, and so on).

Further, the fuel gas valve 30 may use an adjustable flow control valve capable of controlling flow rate (flow control valve). Then, after the fuel gas valve 30 is electrically connected to the control unit 27, it is possible to drive and control the fuel gas valve 30 using the control unit 27.

The fuel gas valve 30 is not limited to the above-mentioned fuel valve using the valve of controlling the flow rate (flow control valve). In addition, it is possible to provide a configuration in which beside a valve to control open/close of the fuel gas supply line 23, a regulator for regulating the flow rate of the fuel gas flowing in the gas supply line 23 (flow controller) may be introduced.

In order to supply a fuel gas containing nitrous oxide, a fuel gas supply source 31 includes a fuel gas reservoir in which fuel gas is temporarily stored may be provided, wherein the fuel gas reservoir include a high pressure gas container (such as cylinder, tank, curdle) 31a filled with nitrous oxide. Then, the fuel gas supply source 31 may supply a fuel gas containing nitrous oxide to the fuel gas supply line 23 from the high pressure gas container 31a by opening the fuel gas valve 30.

The nitrogen gas supply line 24 have one end which is a pipe (flow path) connected to the fuel gas supply line 23 at a position in the upstream side than the flow rate adjusting device 25, and another end which is connected to a nitrogen gas supply source 33 through a nitrogen gas on-off valve 32. Further, the nitrogen gas supply line 24 is used as a concentration adjusting device for adjusting the concentration of the nitrous oxide contained in the fuel gas, by introducing nitrogen gas into the fuel gas supply line 23.

The nitrogen gas valve 32 is a device for opening and closing the nitrogen gas supply line 24, and performing supply/shutoff of the nitrogen gas from the nitrogen gas supply source 33 (switching device). The nitrogen gas valve 32 may not only be used to open and close the nitrogen gas supply line 24, but also be used to adjust an opening amount (including adjusting pressure, etc.).

Further, the nitrogen gas valve 32 may use an adjustable flow control valve (flow control valve) capable of controlling flow rate. Then, after the nitrogen gas valve 32 is electrically connected to the control unit 27, it is possible to drive and control the nitrogen gas valve 32 using the control unit 27.

The nitrogen gas valve 32 is not limited to the above-mentioned fuel valve using the valve of controlling the flow rate (flow control valve). In addition, it is possible to provide a configuration in which beside a valve to control open/close of the nitrogen gas supply line 24, a regulator for regulating the flow rate of the nitrogen gas flowing in the gas supply line 24 (flow controller) may be introduced.

In order to supply a nitrogen gas, a nitrogen gas supply source 33 includes a nitrogen gas reservoir in which nitrogen gas is temporarily stored may be provided, wherein the nitrogen gas reservoir include a high pressure gas container 33*a* filled with nitrogen (such as a cylinder, a tanka cyclinder bundle). Then, the nitrogen gas supply source 33 may supply a nitrogen gas to the nitrogen gas supply line 24 from the high pressure gas container 33*a* by opening the nitrogen gas valve 32.

A flow rate adjusting device 25 is not limited, as long as it may adjust the flow rate (introduced amount) of the fuel gas to be introduced into the decomposition reactor 22 from the fuel gas supply line 23. For example, the flow rate adjusting device 25 may use a regulator (flow regulator) or a valve with flow control (flow control valve). Then, after the flow rate adjusting device 25 is electrically connected to the control unit 27, it is possible to drive and control the flow rate adjusting device 25 by the control unit 27.

The flow rate adjusting device 25 includes a flow meter for measuring the flow rate of the fuel gas flowing through the flow rate adjusting device 25 (flow rate measuring device), or a control valve or regulator having a flow meter. So, it is possible to accurately adjust the flow rate of the fuel gas to be introduced into the decomposition reactor 22.

The temperature measuring instrument 26 may directly or indirectly measure the temperature of the catalyst 21, and is electrically connected to the control unit 27. As a result, the temperature measuring instrument 26 may output the measurement results (measurement data) to the control unit 27.

The temperature measuring instrument 26 shown in FIG. 3 may be attached to the body portion 22*a* of the decomposition reactor 22 to contact the catalyst 21, and it is possible to measure the temperature in the downstream side of the catalyst 21.

In the decomposition of nitrous oxide using a catalyst 21, since the nitrous oxide is decomposed while the nitrous oxide flows through the catalyst 21, the temperature of downstream side (gas outlet 22*c*) of the catalyst 21 is generally higher than the temperature of upstream side (gas inlet port 22*b*). Thus, it is preferable to measure the temperature of downstream side (gas outlet 22*c*) of the catalyst 21 as described above in order to prevent deterioration (heat and oxidation fatigue, for example) of the catalyst 21 or members in the gas outlet 22*c* side due to being exposed to the decomposition-gas with high temperature and high pressure, particularly to the decomposition-gas of nitrous oxide containing oxygen.

On the other hand, the temperature measuring instrument 26, not limited to the configuration shown in FIG. 3 described above, may measure the temperature of the upstream side (gas inlet port 22*b*) of the catalyst 21. Before starting decomposition of nitrous oxide, it is preferable to detect whether the catalyst 21 is heated to the decomposition starting temperature by the heater 28. Then, based on the measurement result by the temperature measuring instrument 26, when the catalyst 21 is heated to the decomposition initiation temperature, it is possible to stop heating by the heater 28. Thus, it is efficiently heated by the heater 28.

The position for measuring the temperature of the catalyst 21 is not limited to the position described above, for example, an average temperature of the catalyst 21, or a temperature of the central portion of the catalyst 21 may be measured. It is also possible to measure separate temperatures at multiple locations.

Further, the temperature measuring unit 26, not limited to the structure of directly measuring the temperature of the catalyst 21, for example, may indirectly measure the temperature of the catalyst 21 by measuring the temperature of the main body portion 22*a* housing the catalyst 21.

Further, the present invention is not limited to the structure that directly or indirectly measure the temperature of the catalyst 21 described above. The temperature measuring instrument 26 may measure directly or indirectly the temperature of the decomposition gas discharged from the gas outlet 22*c* of the decomposition reactor 22. Further, the temperature measuring instrument 26 may measure the temperatures of both the decomposition-gas and the decomposition catalyst 21.

The temperature measuring instrument 26 may use, for example, a thermometer using a thermocouple thermometer, a non-contact thermometer such as a radiation thermometer, data loggers or the like. The temperature measuring instrument 26, not limited to these things, may use any one suitably selected from those which are able to measure the temperature of the decomposition-gas or the catalyst 21.

The control unit 27 including a computer (CPU) or the like, may control the flow rate adjusting device 25, the fuel gas shutoff valve 30, and the nitrogen gas on-off valve 32 as described above, based on the measurements (measured data) from the temperature measuring instrument 26, in accordance with a control program recorded in an internal unit.

Specifically, it is important to control the temperature of the decomposition-gas in order to carry out continuous decomposition of nitrous oxide using the above catalyst 21 in the decomposition reactor 22.

That is, when the temperature of the decomposition-gas becomes too high, deterioration (such as oxidation and thermal fatigue, for example) of members such as the gas outlet 22*c* side and the catalyst 21, which are exposed to high temperature and high pressure by the decomposition-gas, occur as described above. On the other hand, when the temperature of the decomposition-gas is too low, it is difficult to continue the self-decomposition of nitrous oxide. Further, when undecomposed nitrous oxide is discharged from the gas outlet 22*c* of the decomposition reactor 22, in some cases, NOx gases described above may be yielded. These gases are sources of air pollution and global warming as described above.

Therefore, it is preferable that the control unit 27 controls the temperature of the decomposition-gas so that the decomposition of nitrous oxide with a catalyst 21 in the decomposition reactor 22 is continued and as a result, no such problem arises.

Here, a method of controlling the temperature of the decomposition-gas includes two methods, for example, such as (1) adjusting the flow rate of the fuel gas supplied to the decomposition reactor 22, and (2) adjusting the concentration of nitrous oxide contained in the fuel gas.

Among them, in the method (1), based on measurements from the temperature measuring instrument 26, the control unit 27 controls the flow rate adjusting device 25, to adjusts the flow rate of the fuel gas supplied to the decomposition reactor 22 from the fuel gas supply line 23.

Specifically, to increase the temperature of the decomposition gas, control is performed to increase the relative flow rate of the fuel gas supplied to the decomposition reactor 22 from the fuel gas supply line 23. Thus, when the amount of the fuel gas introduced into the decomposition reactor 22 increases, the temperature of the decomposition-gas increases relatively by increasing the amount of decomposition (decomposition heat) of nitrous oxide which is decomposed in the decomposition reactor 22.

On the other hand, when the temperature of the decomposition-gas decreases, control is performed to reduce the relative flow rate of the fuel gas supplied to the decomposition reactor 22. Thus, when the amount of the fuel gas introduced into the decomposition reactor 22 decreases, the temperature of the decomposition-gas decreases relatively by decreasing the amount of decomposition (heat of decomposition) of nitrous oxide which is decomposed in the decomposition reactor 22.

In the above manner, in the feature of the present invention shown in FIG. 3, it is possible to carry out the decomposition of nitrous oxide using the catalyst 21 at the decomposition reactor 22 continually, while controlling the temperature of the decomposition-gas by the control unit 27.

On the other hand, in the method (1), based on measurements from the temperature measuring instrument 26, the control unit 27 controls the nitrogen gas on-off valve 32 to adjust the flow rate of the nitrogen supplied to the fuel gas supply line 23 from the nitrogen gas supply line 24.

Specifically, when increasing the temperature of the decomposition-gas, control is performed to increase the relative concentration of the nitrous oxide contained in the fuel gas. That is, the flow rate of the nitrogen gas supplied to the fuel gas supply line 23 from the nitrogen gas supply line 24 is reduced relatively, or the supply of nitrogen gas to the fuel gas supply line 23 from the nitrogen gas supply line 24 is stopped. As a result, it is possible to obtain a relatively high concentration of nitrous oxide in the fuel gas, by stopping or reducing the amount of nitrogen gas added to the fuel gas flowing in the fuel gas supply line 23. Then, it is possible to increase the temperature of decomposition-gas relatively by increasing the amount of decomposition (decomposition heat) of nitrous oxide which is decomposed in the decomposition reactor 22.

On the other hand, when decreasing the temperature of the decomposition-gas, control is performed to reduce the relative concentration of the nitrous oxide contained in the fuel gas. That is, the relative flow rate of the nitrogen gas supplied to the fuel gas supply line 23 from the nitrogen gas supply line 24 increases, or the supply of nitrogen gas to the fuel gas supply line 23 from the nitrogen gas supply line 24 is controlled to start. As a result, it is possible to obtain a relatively low concentration of nitrous oxide contained in the fuel gas, by starting or increasing the amount of nitrogen gas added to the fuel gas flowing in the fuel gas supply line 23. Then, it is possible to relatively decrease the temperature of decomposition-gas by decreasing the amount of decomposition (decomposition heat) of nitrous oxide which is decomposed in the decomposition reactor 22.

In the above method (2), other than addition of nitrogen gas described above, it is possible to adjust the concentration of the nitrous oxide contained in the fuel gas, for example, by adding an inert gas such as helium (He), neon (Ne), argon (Ar), xenon (Xe), krypton (Kr), air (including dry air), or the like to the fuel gas.

In the above manner, in the feature of the present invention shown in FIG. 3, it is possible to carry out the decomposition of nitrous oxide using the catalyst 21 at the decomposition reactor 22 continually, while controlling the temperature of the decomposition-gas.

In the feature of the present invention shown in FIG. 3, it is also possible to control the temperatures of decomposition-gases by using a method combined the methods (1), (2) described above. Then, the method using these above methods (1), (2) has a simple configuration for the temperature control of the decomposition-gas described above. It is possible to perform stably. On the other hand, the present invention, is not limited necessarily to the method of using (1) and (2) above, and may use any other methods to control the temperature of the decomposition-gas.

Further, the present invention may include $NO_x$ meter ($NO_x$ measurement unit) for measuring the $NO_x$ concentration in the decomposition-gas. In this case, by measuring the concentration of $NO_x$ gas such as nitrous oxide ($N_2O$) undecomposed contained in the decomposition-gas, nitric oxide (NO), and nitrogen dioxide ($NO_2$), it is possible to accurately control the temperature of the decomposition-gas as described above.

Further, the present invention may include a device ($NO_x$ removing device) for removing $NO_x$ contained in the decomposition-gas. The $NO_x$ removing device, for example, may use a denitration device in which NO is decomposed to water ($H_2O$) and nitrogen by adding ammonia ($NH_3$) in the decomposition-gas containing $NO_x$, carrying out selective (reduce) reaction between the $NO_x$ and ammonia by using a denitration catalyst. The denitration catalyst may be a catalyst selected the optimum from among those known in the art. Further, the $NO_x$ removing device may use a $NO_x$ catalyst for directly decomposing NO contained in the decomposition-gas.

Further, in the decomposition reactor 22, in order to stop the decomposition of nitrous oxide using the above catalyst 21, it is preferable to introduce the nitrogen gas into the decomposition reactor 22 after stopping the supply of fuel gas to the decomposition reactor 22.

This is because that there is a possibility that the catalyst 21 is deteriorated by the oxygen contained in the decomposition-gas which is accumulated in the catalyst 21 immediately after stopping the supply of fuel gas to the decomposition reactor 22.

In this case, by performing a control of closing the fuel gas valve 30 by the control unit 27, the supply of fuel gas to the decomposition reactor 22 is stopped, and the nitrogen gas is supplied from the nitrogen gas supply line 24 and introduced into the decomposition reactor 22.

It is thereby possible to remove the remained decomposition-gas accumulated in the catalyst 21 by extruding the decomposition-gas which is accumulated in the catalyst 21 by the nitrogen gas introduced into the decomposition reactor 22. Then, after a certain time when nitrogen gas is introduced to the decomposition reactor 22 for long enough time and the decomposition-gas staying in the catalyst 21 has been removed, a control of closing the nitrogen gas on-off valve 32 is performed by the control unit 27, to stop the supply of nitrogen gas to the decomposition reactor 22.

It is possible to prevent deterioration of the catalyst 21 by oxygen, to extend the life of the catalyst 21. Further, it is possible to reduce the frequency of exchanging (extend the exchanging cycle of) the catalyst 21 as described above. In addition, when using this method, it is possible to easily resume decomposition of nitrous oxide, after the decomposition of nitrous oxide was paused, In the case of stopping the decomposition of nitrous oxide as described above, it is also possible to introduce inert gases such as He, Ne, Xe, Ar, Kr, or air (including dry air), other than nitrogen gas, into the decomposition reactor 22.

Figure 4:
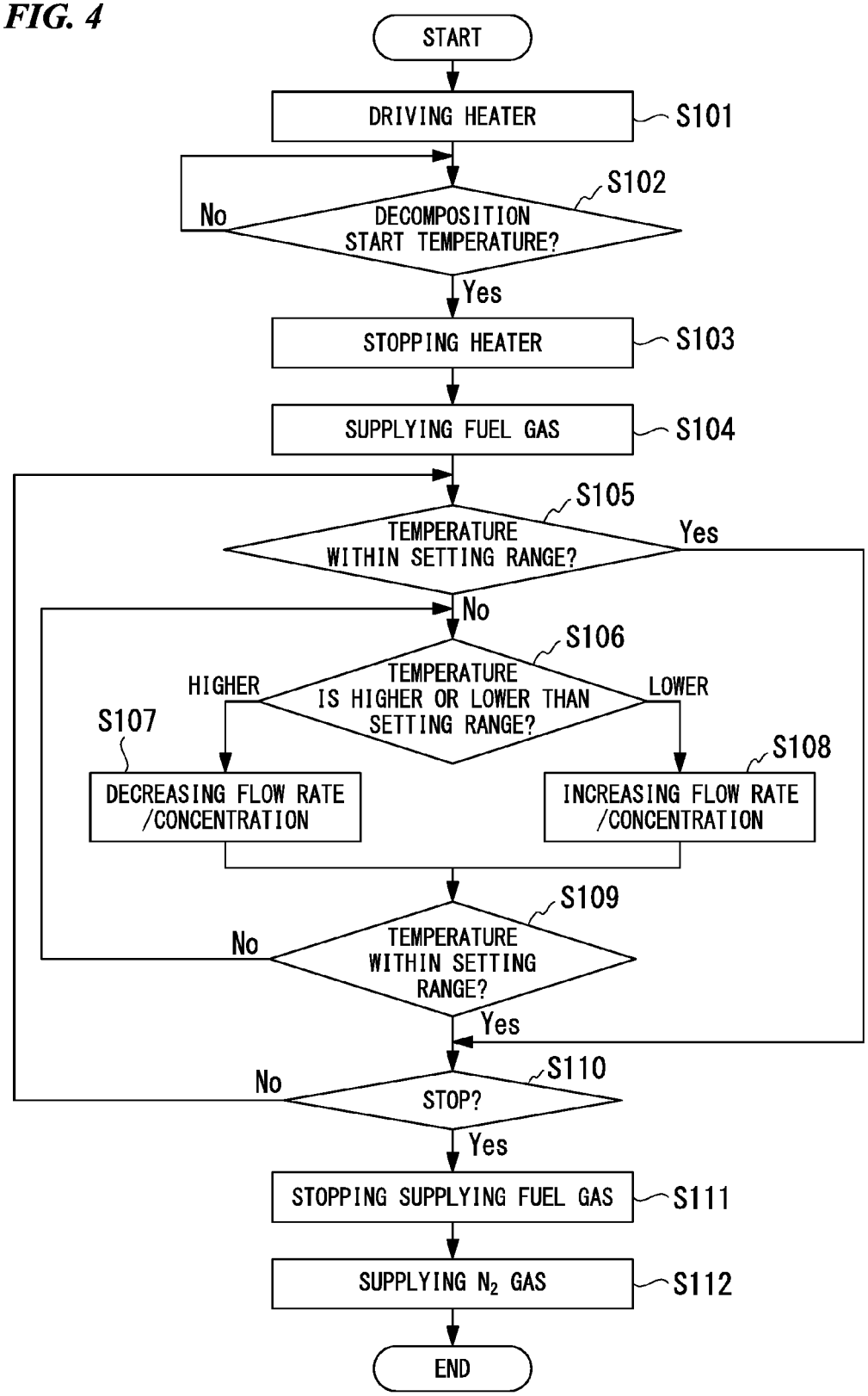
FIG. 4 is a flow chart showing an example of a specific operations (control method) in the feature of the present invention.

Here, with reference to the flowchart shown in FIG. 4, an example of a specific operation (control method) of the present invention will be described.

Regarding the feature of the present invention, firstly, in step S101, before starting decomposition of nitrous oxide, the catalyst 21 is heated (preheated) by driving the heater 28.

Next, in step S102, based on the temperature of the catalyst 21 which is measured by the temperature measuring instrument 26, the control unit 27 makes a determination whether or not to heat the catalyst 21 up to the decomposition start temperature. When it is determined that the catalyst 21 has been heated up to the decomposition start temperature, the process proceeds to step S103 in which the driving the heater 28 is stopped. On the other hand, when it is determined that the catalyst 21 has not been heated up to the decomposition start temperature, the heater 28 continues to heat the catalyst 21 until it reaches the decomposition starting temperature.

Next, in step S104, a fuel gas is supplied to the decomposition reactor 22, at which the decomposition of nitrous oxide is carried out by using the catalyst 21. The flow rate of the fuel gas or the concentration of nitrous oxide contained in the fuel gas which is supplied to the decomposition reactor 22, have preset values.

Next, in step S105, based on the temperature of the catalyst 21 (decomposition gas) measured by the temperature measuring instrument 26, the control unit 27 determines whether or not the preset temperature of the catalyst 21 (decomposition gas) exceeds the temperature of a set value (range). When it is determined that the temperature of the catalyst 21 (decomposition gas) has exceeded the set value (range), the process proceeds to step S106. On the other hand, when it is determined that the set value (range) of the temperature of the catalyst 21 (decomposition gas), the process proceeds to step S110.

Next, in step S106, the control unit 27 determines whether the temperature of the catalyst 21 (decomposition gas) is lower or higher than the set value (range) (comparing them).

Then, if it is determined that the temperature of the catalyst 21 (decomposition gas) is higher than the set value (range), the process proceeds to step S107, in which the control unit 27 makes adjustments in the direction of lowering the flow rate of the fuel gas or the concentration of nitrous oxide contained in the fuel gas which is supplied to decomposition reactor 22. After the adjustments, the process proceeds to step S109.

On the other hand, when it is determined that the temperature of the catalyst 21 (or decomposition gas) is lower than the set value (range), the process proceeds to step S108, in which the control unit 27 makes adjustments in the direction of increasing the flow rate of the fuel gas or the concentration of nitrous oxide contained in the fuel gas which is supplied to decomposition reactor 22. After the adjustments, the process proceeds to step S109.

The adjustment in the step S108 or step S107 are performed, for example, by increasing or decreasing one level from the present level wherein the levels are determined by dividing the adjustable ranges of the set values of the flow rate of the fuel gas, or the set values of the concentration of nitrous oxide contained in the fuel gas which is supplied to the decomposition reactor 22 into several levels having a predetermined number of levels.

Next, in step S109, based on the temperature of the catalyst 21 (decomposition gas) which is measured by the temperature measuring instrument 26, the control unit 27 determines whether or not the temperature of the catalyst 21 (decomposition gas) returns to the set value (range) of the catalyst 21. When it is determined that the temperature of the catalyst 21 (decomposition gas) has returned to the set value (range), the process proceeds to step S110.

On the other hand, when the temperature of the catalyst 21 (or decomposition gas) has not returned the set value (range), the process returns to step S106, in which the control unit 27 re-performs the determination of whether the temperature of the catalyst 21 (or decomposition gas) is lower or higher than the set value (range) (comparing them). The process proceeds to step S108 or step S107, in which the control unit 27 makes adjustments in the direction of lowering or increasing the flow rate of the fuel gas or the concentration of nitrous oxide contained in the fuel gas which is supplied to decomposition reactor 22. The process then proceeds to step S109, in which the control unit 27 make a determination of whether or not the temperature of the catalyst 21 (decomposition gas) returns to the set value (range) of the catalyst 21. Such adjustments are repeated until the temperature of the catalyst 21 (decomposition gas) has returned the set value (range). When it exceeds an adjustable range as a result of repeating such an adjustment, the control unit 27 is forced to make a determination that it meets abnormal condition. Then it proceeds to step S110' (not shown in FIG. 4)

Next, in step S110, the control unit 27 makes a determination whether to stop the supply of fuel gas. At the case of stopping the supply of fuel gas, for example, a stop command from the outside is received, or an abnormal condition is determined in step S109, and then, the supply of the fuel gas is stopped, The process proceeds to step S111. On the other hand, when the supply of the fuel gas is not stopped, the process returns to step S105, in which the measurement of the temperature of the catalyst 21 (or decomposition-gas) by the temperature measuring instrument 26 continues.

Next, in step S111, after stopping the supply of the fuel gas, the process proceeds to step S112, in which the nitrogen gas is supplied to the decomposition reactor 22. It is thereby possible to extrude the decomposition-gas which is accumulated in the catalyst 21 by nitrogen gas in order to remove the decomposition-gas which is accumulated in the catalyst 21.

In the above manner, according to the feature of the present invention shown in FIG. 3, it is possible to carry out the decomposition of nitrous oxide using the catalyst 21 at the decomposition reactor 22, while controlling the temperature of the decomposition-gas.

In the present invention, for example, the determination result of the control unit 27 based on its measurement data measured by the temperature measuring instrument 26 as described above may be shown in a monitor, or may be output to a printer (not shown in drawings). The present invention is not limited to an automatic control by the control unit 27 described above, and for example, the present invention can be controlled manually by an operator or the like.

Further, when an abnormal condition is determined in step S109, it may be notified as required. A notification method is not particularly limited, and it is possible, for example, to sound an alarm, or to show a notification on a display.

Since the decomposition-gas turbine 11 shown in FIG. 2 and the decomposition-gas boiler 1 shown in FIG. 1 may include a structure similar to the feature of the present invention as described above, it is possible to carry out continuous decomposition of nitrous oxide while controlling the temperature of the decomposition gas as described above.

That is, in the decomposition-gas boiler 1 or the decomposition-gas turbine 11 having the feature of the present invention above-mentioned, it is possible to continuously carry out decomposition of nitrous oxide contained in the fuel gas which is supplied at latter stage by using the decomposition heat generated by the decomposition of the nitrous oxide contained in a fuel gas which is supplied in the initial stage to the decomposition reaction unit 6, 13 and is decomposed in the decomposition reaction unit 6, 13.

Figure 5:
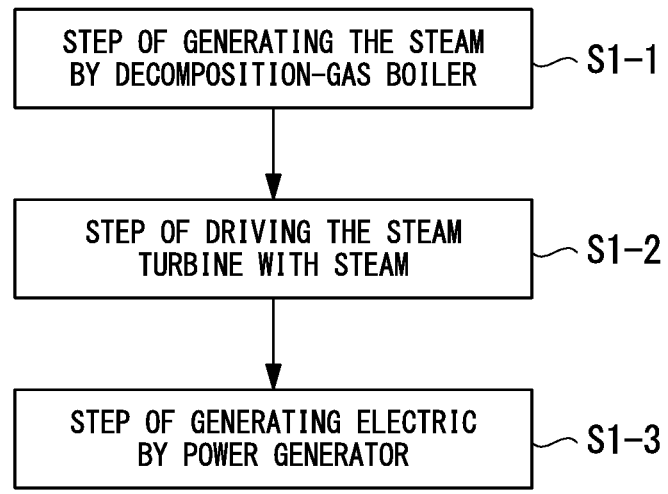
FIG. 5 is a process diagram of the power generation method using a power generation apparatus shown in FIG. 1.

As shown in FIG. 5, the power generation method according to the present invention includes step S1-1 of generating the steam by the decomposition-gas boiler 1 by heat recovery from the decomposition gas generated by the decomposition of nitrous oxide, step S1-2 of rotating the steam turbine 2 with steam generated by the decomposition-gas boiler 1, a step S1-3 of generating electric by power generator 3 by driving the steam turbine 2.

Specifically, in the decomposition-gas boiler 1 shown in FIG. 1, the decomposition-gas having a high temperature and high pressure generated by the decomposition of nitrous oxide at the decomposition reaction unit 6 is supplied to the steam generating unit 7. Thus, it is possible to generate steam by heat exchange with the decomposition-gas in the steam generating unit 7.

Further, in the power generation apparatus including the decomposition-gas boiler 1, the steam turbine 2 is rotationally driven by steam generated in the decomposition-gas boiler 1 (steam generating unit 7). Then, it is possible to obtain electric power by driving the electric generator 3 which is connected to the steam turbine 2.

Then, after the steam exhausted from the steam turbine 2 is cooled and then condensed to water by the condenser 4, the water is delivered to the decomposition-gas boiler 1 by the water supply pump 5 and then is circulated to a vapor again by exchanging the heat of the decomposition gas in the decomposition-gas boiler 1.

Regarding the features described above of the present invention in the above decomposition-gas boiler 1, it is not limited to the configuration shown in FIG. 3. That is, it is possible to appropriately change a size or a format of the boiler, as long as the features of the present invention shown in FIG. 3 is applied to the decomposition-gas boiler 1.

For example, a shape and arrangement of the decomposition reactor 22 may be appropriately changed in accordance with a design of the decomposition-gas boiler. Further, it is also possible to add such appropriate modifications, according to the design of the decomposition-gas boiler, to the fuel gas supply line 23 or the nitrogen gas supply line 24 which are connected to the decomposition reactor 22, the flow rate adjusting device 25, the temperature measuring instrument 26, the control unit 27, the heater 28, the power supply line 29, the fuel gas valve 30, the fuel gas supply source 31, the nitrogen gas shutoff valve 32, or the nitrogen gas supply source 33.

On the other hand, in the decomposition-gas boiler 1, it is possible that structures other than the characteristic portions of the present invention described above have structures similar to those of a conventional combustion gas boiler. For example, as a structure other than the characteristic portions of the present invention of the decomposition-gas boiler, it is possible to use types similar to a conventional water-tube boiler or round boiler. As the round boiler, for example, a flue boiler, a fire-tube boiler, a flue fire-tube boiler, a longitudinal drum boiler and the like may be used. On the other hand, as the water-tube boiler, for example, a boiler of natural circulation type, a forced-circulation type or a once-through type may be used.

Further, in the decomposition-gas boiler 1, the decomposition reaction unit 6 supplies the decomposition gas to the steam generating unit 7, and then steam is generated by heat exchange with the decomposition-gas in the steam generating unit 7. However, it is not limited to such a configuration. For example, in the present invention, it is possible to integrate the steam generating unit 7 and the decomposition reaction unit 6, and to generate steam by heat exchange between the steam generating unit 7 and the decomposition reaction unit 6.

Specifically, for example, it is possible to generate steam by exchanging heat generated by the decomposition reaction unit 6 (thermal decomposition) by providing the steam generating unit 7 to the outside the decomposition reaction unit 6 (the decomposition reactor 22). In this case, it is possible to obtain steam by the heat generated in the decomposition reaction unit 6 (the decomposition reactor 22) and at the same time to cool the decomposition reaction unit 6.

Also, the decomposition-gas boiler 1, in addition to the configuration shown in FIG. 1, may further provides, for example, accessories (apparatus/component) such as a superheater for superheating steam by further heating the steam obtained in the steam generating unit 7 or a preheater for preheating the feed water or fuel gas by the decomposition-gas having a high temperature obtained by the decomposition reaction unit 6, or necessary security equipment (apparatus/component).

Further, in the power generation apparatus shown in FIG. 1, regarding the configurations other than the decomposition-gas boiler 1, such as the steam turbine 2 as described above, the electric generator 3, the condenser 4, and the water supply pump 5, it is possible to use those similar to the conventional devices. In addition, the same security equipment (apparatus/component) and accessories (apparatus/component) may be used.

In this manner, according to the power generation method and the power generation apparatus including the decomposition-gas boiler 1 of the present invention, it is possible to generate electric power using the decomposition heat generated by the decomposition of nitrous oxide. Then, the present invention may provide a decomposition-gas boiler 1 as described above, a power generation apparatus including the decomposition-gas boiler 1 which enables using nitrous oxide as an environmentally-friendly energy, and an electric power generation method using the power generation apparatus.

Figure 6:
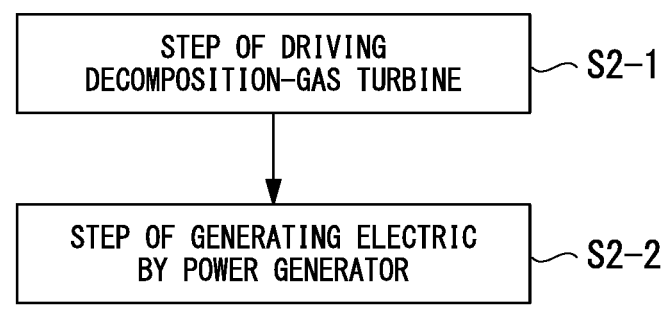
FIG. 6 is a process diagram of the power generation method using a power generation apparatus shown in FIG. 2.

A power generation method, as shown in FIG. 6, includes step S2-1 of rotationally driving a decomposition-gas turbine 11 by decomposition gas produced by decomposition of nitrous oxide, and step S2-2 generating electric power using an electric generator 12 by driving the decomposition-gas turbine 11.

Specifically, in the decomposition-gas turbine 11 shown in FIG. 2, a decomposition-gas with high temperature and high pressure generated by the decomposition of nitrous oxide is supplied to a turbine unit 14 from a decomposition reaction unit 13. Thus, in the turbine unit 14, it is possible to obtained the power by rotating the turbine shaft by blowing decomposition gas produced by decomposition of nitrous oxide to turbine blades (moving blade) from the nozzles (stationary blades).

Further, in the power generation apparatus including the decomposition-gas turbine 11, it is possible to obtain electric power by driving an electric generator 12 connected the decomposition-gas turbine 11 (turbine unit 14).

In the decomposition-gas turbine 11, the feature of the present invention described above is not limited to the configuration shown in FIG. 3. That is, when the feature of the present invention shown in FIG. 3 is applied to the decomposition-gas turbine 11, it is possible to appropriately change it according to the size or the format of the turbine.

For example, a shape and arrangement of the decomposition reactor 22 may be appropriately changed in accordance with a design of the decomposition-gas boiler. Further, it is also possible to add such appropriate modifications, according to the design of the decomposition-gas boiler, to the fuel gas supply line 23 or the nitrogen gas supply line 24 which are connected to the decomposition reactor 22, the flow rate adjusting device 25, the temperature measuring instrument 26, the control unit 27, the heater 28, the power supply line 29, the fuel gas valve 30, the fuel gas supply source 31, the nitrogen gas shutoff valve 32, or the nitrogen gas supply source 33.

On the other hand, in the decomposition-gas turbine 11, even though a conventional combustion turbine includes a compressor for compressing combustion air and feeding it to a gas turbine, the present invention described above does not require such the configuration feature in contrast. It is possible to reduce the weight of the decomposition-gas turbine 11 by using such a simple configuration.

On the other hand, the decomposition-gas turbine 11 may include a compressor coupled to the turbine shaft (supercharger) (not shown in drawings). Then, it is possible to include a configuration of supplying the fuel gas containing nitrous oxide compressed (supercharged) by the compressor (supercharger) to the decomposition reaction unit 13. In the case of using the fuel gas compressed (supercharged), it is preferable that the nitrous oxide is compressed (supercharged) before being liquefied.

Also, the decomposition-gas turbine 11, besides the configuration shown in FIG. 2, may further includes, for example, a preheater for preheating the feed water or fuel gas by the decomposition-gas having a high temperature obtained by the decomposition reaction unit 13, or a necessary security equipment (apparatus/component).

Further, in the power generation apparatus shown in FIG. 2, regarding the configurations other than the decomposition-gas turbine 11, the electric generator 12 described above may use the conventional one. In addition, the same security equipment (apparatus/component) and accessories (apparatus/component) may also be used.

In this manner, in the power generation method and the power generation apparatus including the decomposition-gas turbine 11 according to the present invention, power generation is possible by using the decomposition gas generated by the decomposition of nitrous oxide. Then, the present invention provides a power generation apparatus including a decomposition-gas turbine 11 which enables the use of nitrous oxide as an environmentally-friendly energy, a decomposition-gas boiler 1 as described above, a power generation method for generating electric power by using an power generation apparatus.

The present invention is not limited to the embodiment shown in FIG. 1 and the FIG. 2, the present invention is capable of being variously modified without departing from the scope of the present invention.

Figure 7:
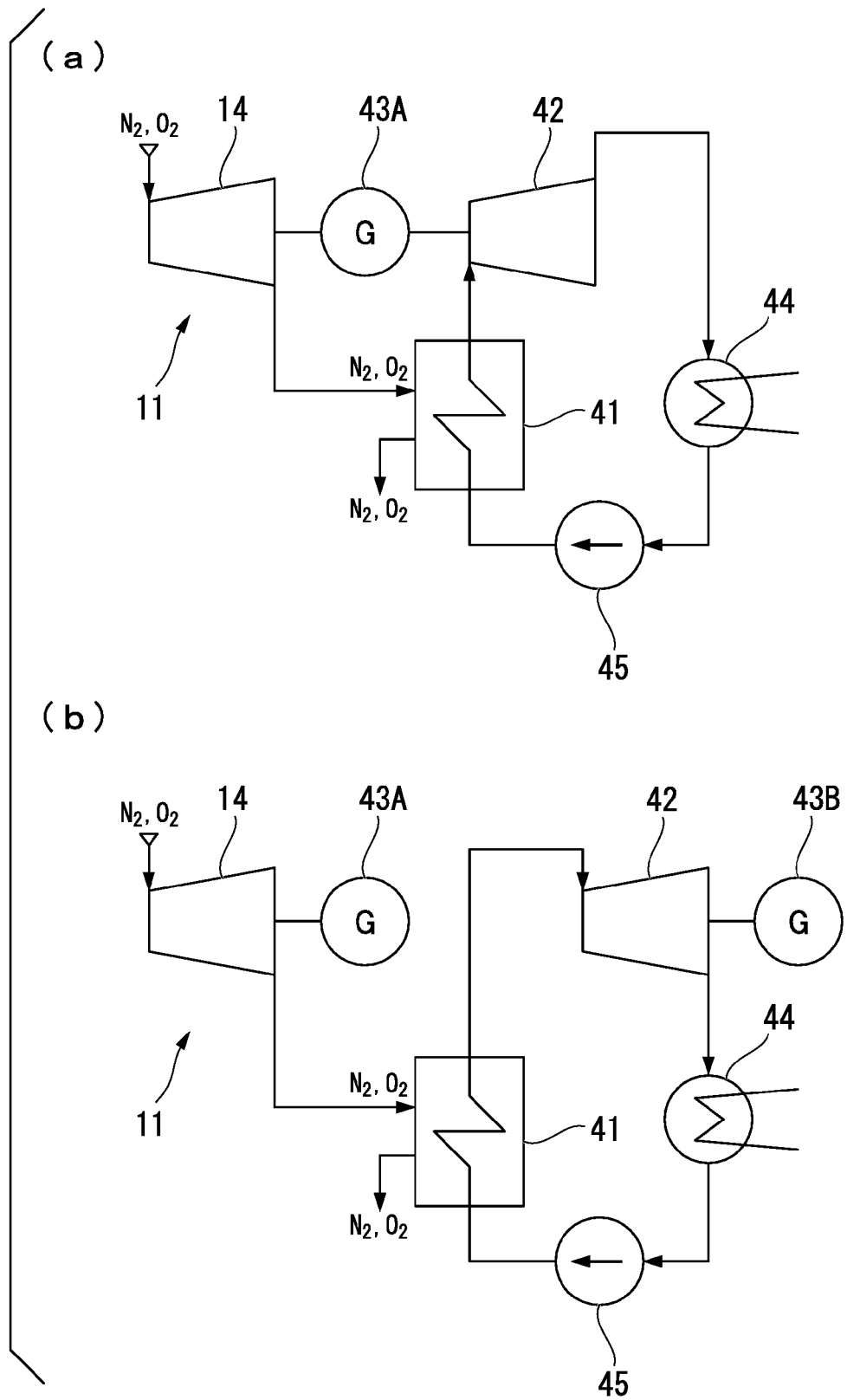
FIG. 7 shows a configuration such as a decomposition-heat-recovery boiler that may be added in the power generation apparatus shown in FIG. 2.

In particular, the power generation apparatus of the present invention may also be the power generation apparatus changing from the structure shown in FIG. 2 by further adding structures shown in FIG. 7 (a).

The FIGS. 7 (a) and (b) shows components such as a decomposition-heat-recovery boiler 41 that can be added to the power generation apparatus shown in FIG. 2; and FIG. 7 (a) is a schematic system diagram in the case of adopting the single shaft, FIG. 7 (b) is a system diagram in the case of adopting the multi-shaft type.

The power generation apparatus as shown in FIGS. 7(a) and (b) is a complex power generation apparatus (combined cycle) using the decomposition heat recovery system. The heat of decomposition of the decomposition gas discharged from the decomposition-gas turbine 11 (in FIG. 7, only the turbine unit 14 is shown) is utilized.

Specifically, the power generation apparatus as shown in FIGS. 7(a) and (b), in addition to the configuration (only the turbine unit 14 is shown in drawing) shown in FIG. 2, further includes a decomposition-heat-recovery boiler 41 which generates steam by heat recovery from the decomposition-gas turbine 11 (turbine unit 14), a steam turbine 42 which is rotationally driven by the steam generated by the decomposition-heat-recovery boiler 41, and an electric generator 43A, (43B) which generates electric power is by driving the steam turbine 42, a condenser 44 which cools and condenses the steam from the steam turbine 42, and a water supply pump 45 which supplies water from the condenser 44 to the decomposition-heat-recovery boiler 41.

Further, in the single shaft shown in FIG. 7 (a), by placing the decomposition-gas turbine 11 and the steam turbine 42 (turbine unit 14) in a single shaft, the same electric generator 43A is driven by both. Meanwhile, in the multi-shaft type shown in FIG. 7(b), by placing the decomposition-gas turbine 11 and a steam turbine 42 (turbine unit 14) in separate shafts, the different electric generators 43A and 43B are driven by the two turbines.

Figure 8:
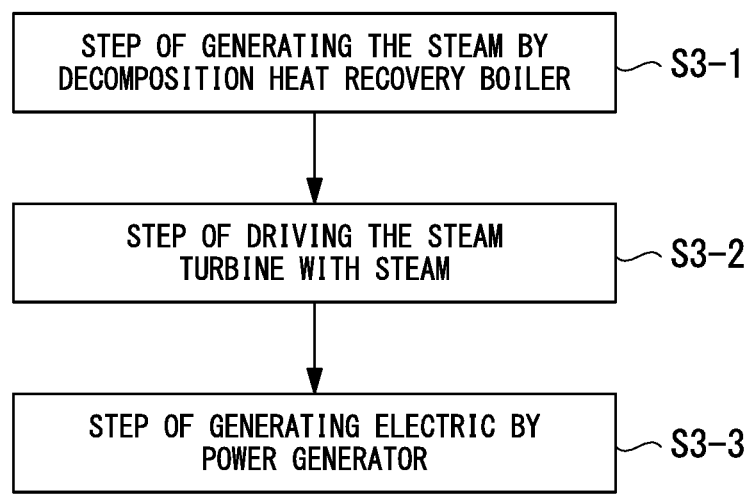
FIG. 8 is a process diagram of the power generation method using a power generation apparatus shown in FIGS. 7(a), (b).

As shown in FIG. 8, the power generation method according to the present invention, includes step S3-1 of generating steam in the decomposition-heat-recovery boiler 41 by heat recovery from the decomposition gas discharged by the decomposition-gas turbine 11 (turbine unit 14), step S3-2 of rotationally driving the steam turbine 42 by steam generated by the decomposition-heat-recovery boiler 41, and step S3-3 of generating electric power by the electric generator 43A (43B) by driving the steam turbine 42.

Specifically, in the power generation apparatus shown in FIGS. 7 (a), (b), while the electric generator 43A which is connected the decomposition-gas turbine 11 (turbine unit 14) is driven, the steam turbine 42 is driven by steam generated from the decomposition-heat-recovery boiler 41, and the electric generator 43A (43B) which is connected to the steam turbine 42 is rotatably driven. As a result, it is possible to obtain electric power more efficiently.

Then, after the steam exhausted from the steam turbine 42 is cooled and condensed to water by the condenser 44, the water is delivered to the decomposition-heat-recovery boiler 41 by a supply pump 45, and then the decomposition-heat-recovery boiler 41 re-generates steam again by heat exchange with the decomposition gas.

In this way, in the power generation apparatus shown in FIGS. 7 (a), (b), it is possible to generate electric power using the decomposition heat and decomposition gas generated by the decomposition of nitrous oxide. As a result, it is possible to obtain a higher thermal efficiency in the power generation.

The decomposition-heat-recovery boiler 41, except that the target of the heat recovery described above is the decomposition gas of nitrous oxide, may have structures similar to a conventional exhaust-heat-recovery boiler for generating steam by heat recovery of the combustion gas (exhausted gas) when combusting conventional fossil fuels. In addition, the same security equipment (apparatus/component) and accessories (apparatus/component) as a conventional ones may also be used.

Further, not only the decomposition-heat-recovery boiler 41 of the power generation apparatus shown in FIG. 7 (a), (b), but also the other component such as a steam turbine 42 as described above, an electric generator 43A (43B), a condenser 44, or a water pump 45 may have the same structure as the conventional one. In addition, an accessories (apparatus/component) and a security equipment (apparatus/component) may also have the same structure as the conventional one.

Meanwhile, the power generation apparatus according to the present invention may also be the power generation apparatus changing from the structure shown in FIG. 1, 2 or 7, by further adding other components shown in FIGS. 9(a), (b), for example.

Figure 9:
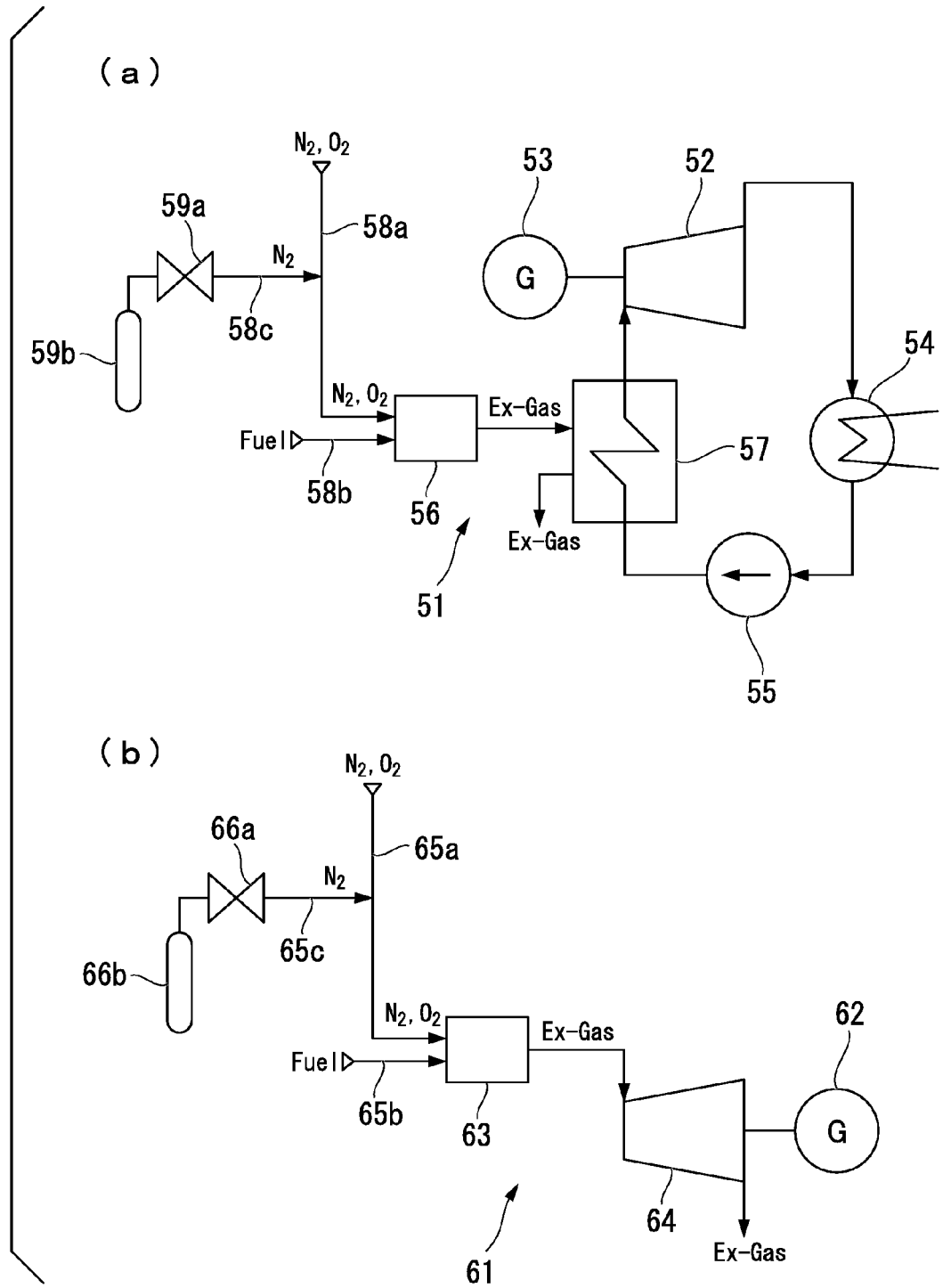
FIG. 9 (a) is a schematic system diagram showing a configuration such as a combustion gas boiler that may be added in the power generation apparatus shown in FIG. 1, FIG. 2 or FIG. 7.

FIG. 9 (a) is a schematic system diagram showing a configuration such as the combustion-gas boilers 51 that can be added in the power generation apparatus shown in FIG. 1, FIG. 2 or FIG. 7; and FIG. 9 (b) is a schematic system diagram showing a configuration such as a combustion-gas turbine 61 that can be added in the power generation apparatus shown in FIG. 1, FIG. 2 or FIG. 7.

The power generation apparatus shown in FIGS. 9 (a), (b) is a complex power generation apparatus (combined cycle) employing exhaust relapse method, and it utilizing oxygen contained in the above-described decomposition gas to the combustion of the combustion-gas turbine 61 and the combustion gas boiler 51.

Specifically, the power generation apparatus shown in FIG. 9 (a) includes, in addition to the configurations shown in FIG. 1, 2 or 7 (not shown in FIG. 9 (a)), a combustion gas boiler 51 for generating steam by heat recovery from combustion gas (Ex-Gas) when fuel is burned using decomposition-gas (N2, O2) discharged from a decomposition-gas boiler 1, a decomposition-gas turbine 11 or a decomposition-heat-recovery boiler 41, a steam turbine 52 which is rotationally driven by the steam generated in the combustion gas boiler 51, an electric generator 53 which generates electric power by driving the steam turbine 52, a condenser 54 for condensing and cooling the steam from the steam turbine 52, and a water supply pump 55 which supplies water which is condensed by the condenser 54 to the combustion gas boilers 51.

The combustion gas boiler 51 includes a combustion reactor 56 which burns the fuel with the oxygen of the decomposition gas, and a steam generating unit 57 to generate steam by heat exchange with the combustion gas generated by combusting fuel.

The combustion reaction unit 56 is connected to a decomposition-gas supply line 58a supplying the gas decomposition ($N_2$, $O_2$) and a fuel supply line 58b supplying fuel. Further, the decomposition-gas supply line 58a is connected to the nitrogen gas supply line 58c supplying nitrogen gas ($N_2$). Then, it is possible to supply the nitrogen gas to the nitrogen gas supply line 58c from the nitrogen gas supply source 59b, which is connected via a nitrogen gas on-off valve 59a with the nitrogen gas supply line 58c.

Then, it becomes possible to adjust the concentration of oxygen contained in the decomposition-gas by introducing (adding) the nitrogen gas into the decomposition-gas flowing in the decomposition-gas supply line 58a from the nitrogen gas supply line 58c.

In the nitrogen gas supply source 59b and nitrogen gas on-off valve 59a, it is possible to use the same devices as used in the nitrogen gas supply source 33 and nitrogen-off valve 32 shown in FIG. 3. Further, the nitrogen gas supply line 58c is not a configuration necessarily. In order to have an appropriate concentration of oxygen contained in the decomposition gas for the fuel, and the amount of the nitrogen gas supplied to the fuel gas supply line 23 from the nitrogen gas supply line 24 shown in FIG. 3 may be adjusted in advance. In that case, it is possible to omit the nitrogen gas supply line 58c.

Figure 10:
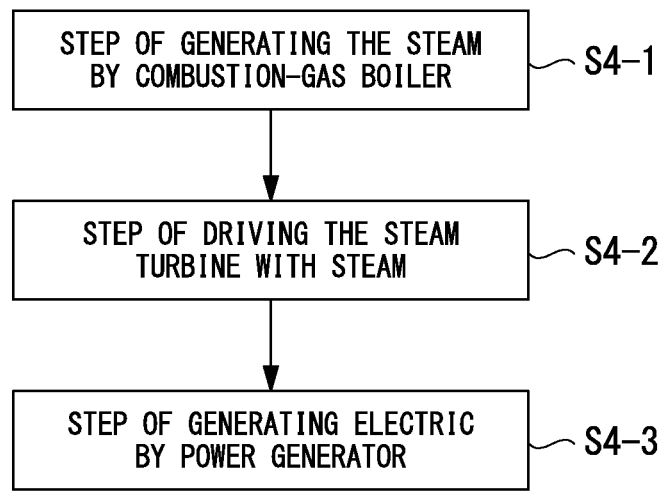
FIG. 10 is a process diagram of the power generation method using a power generation apparatus shown in FIG. 9(a)

As shown in FIG. 10, the power generation method according to the present invention includes a step S4-1 of generating steam by combustion gas boiler 51 by heat recovery from the decomposition gas generated from the combustion when using the decomposition gas discharged from a heat recovery boiler 41, the decomposition-gas boiler 1, or decomposition-gas turbine 11, and a step S4-2 for rotationally driving the steam turbine 52 by steam generated by the combustion gas boiler 51, a step S4-3 of generating electric power using an electric generator 53 being driven by the steam turbine 52.

Specifically, in the power generation apparatus shown in 9 (a), it is possible to obtain the additional power by rotatably moving the steam turbine 52 by steam generated in the combustion gas boiler 51 (a steam generation unit 57), and driving the electric generator 53 which is connected to the steam turbine 52.

Then, after the steam exhausted from the steam turbine 52 is cooled and condensed to water by the condenser 54, the water is delivered to the combustion gas boiler 51 by supply pump 55, and the water is changed to steam again by exchanging the heat of the combustion gas in the combustion gas boiler 51.

On the other hand, the power generation apparatus shown in FIG. 9 (b) further includes, in addition to the configuration shown in FIG. 1, 2 or 7 (not shown in FIG. 9(b)), a combustion-gas turbine 61 which is rotationally driven by combustion gas (Ex-Gas) when fuel is burned using decomposition-gas ($N_2$, $O_2$) discharged from a decomposition-gas boiler 1, a decomposition-gas turbine 11 or a decomposition-heat-recovery boiler 41, and a power generation apparatus 62 which is driven by the steam turbine 61 and generates electric power.

The combustion-gas turbine 61 includes the combustion reactor 63 which burns the fuel with the oxygen of the decomposition-gas, and a turbine unit 64 which obtain the power to rotate the turbine shaft by blowing the combustion gas generated by combustion of fuel to the turbine blade (moving blade) from the nozzle blade (stationary blade).

The combustion reaction unit 63 is connected to a decomposition-gas supply line 65a supplying the gas decomposition ($N_2$, $O_2$) and a fuel supply line 65b supplying fuel. Further, the decomposition-gas supply line 65a is connected to the nitrogen gas supply line 65c supplying nitrogen gas ($N_2$). Then, it is possible to supply the nitrogen gas to the nitrogen gas supply line 65c from the nitrogen gas supply source 66b, which is connected via a nitrogen gas on-off valve 66a with the nitrogen gas supply line 65c.

Then, it becomes possible to adjust the concentration of oxygen contained in the decomposition-gas by introducing (adding) the nitrogen gas into the decomposition-gas flowing in the decomposition-gas supply line 58a from the nitrogen gas supply line 65c.

In the nitrogen gas supply source 66b and nitrogen gas on-off valve 66a, it is possible to use the same devices as used in the nitrogen gas supply source 33 and nitrogen-off valve 32 shown in FIG. 3. Further, the nitrogen gas supply line 65c is not a configuration necessarily. In order to have an appropriate concentration of oxygen contained in the decomposition-gas for the fuel, and the amount of the nitrogen gas supplied to the fuel gas supply line 23 from the nitrogen gas supply line 24 shown in FIG. 3 may be adjusted in advance. In that case, it is possible to omit the nitrogen gas supply line 65c.

Figure 11:
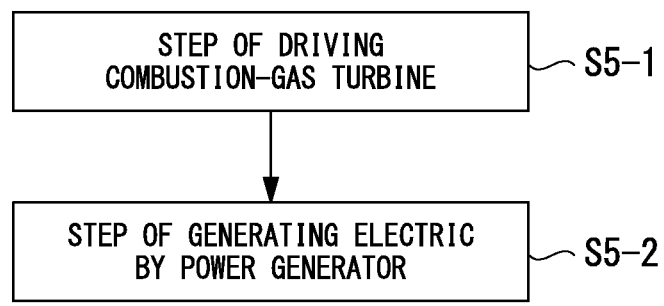
FIG. 11 is a process diagram of the power generation method using a power generation apparatus shown in FIG. 9 (b).

As shown in FIG. 11, the power generation method according to the present invention includes a step S5-1 for rotationally driving the combustion-gas turbine 61 by the decomposition gas generated from the combustion when using the decomposition gas discharged from a heat recovery boiler 41, the decomposition-gas boiler 1, or decomposition-gas turbine 11, and a step S5-3 of generating electric power by an electric generator 62 driven by the combustion-gas turbine 61.

Specifically, in the power generation apparatus shown in 9 (b), it is possible to obtain the additional power by driving the electric power generator 62 which is connected to the combustion-gas turbine 61 (turbine unit 64).

In this way, in the power generation apparatus shown in FIGS. 9(a), (b), it is possible to use the decomposition gas discharged from the decomposition-heat-recovery boiler 41, the decomposition-gas boiler 1, or decomposition-gas turbine 11, and further, it is possible to perform power generation more efficiently by utilizing oxygen contained in the decomposition-gas in the combustion of the fuel.

The combustion-gas turbine 61 and the combustion gas boiler 51, except for using oxygen contained in the decomposition-gas in the combustion of the fuel as described above, has a structure similar to that of combustion-gas turbines and combustion gas boilers conventionally used for the combustion of oxygen in the air. In addition, the same security equipment (apparatus/component), and accessories (apparatus/component) may also be used.

Further, the fuel used in the combustion-gas turbine 61 and the combustion gas boiler 51 may, for example, use a fossil fuel such as a fossil oil, coal, or natural gas, or use alternative fuels, such as biomass fuel, as long as it is combustible with oxygen contained in the decomposition gas. It is possible to use appropriately other fuels selecting from gaseous fuels, liquid fuels, and solid fuels.

Further, the combustion-gas turbine 61 and the combustion gas boiler 51, not limited to the configuration shown in FIGS. 9 (a), (b), may further includes, for example, a flow rate adjusting unit (flow rate adjusting device) for adjusting the respective flow rates of the fuel, decomposition-gas ($N_2$, $O_2$), and nitrogen gas ($N_2$), which are supplied to the combustion reactors 56 and 63.

Further, not only the combustion-gas turbine 61 of the power generation apparatus shown in FIGS. 9 (a), (b), but also the other components such as the combustion gas boiler 51, the steam turbine 52, the electric generators 53 and 62, the condenser 54, and the water supply pump 55 described above, may have a conventional structure. In addition, accessories (apparatus/component) and security equipment (apparatus/component) may also have a conventional structure.

In particular, the power generation apparatus of the present invention may also be the power generation apparatus changing from the structure shown in FIG. 9(b) by further adding structures shown in FIGS. 12(a), (b).

Figure 12:
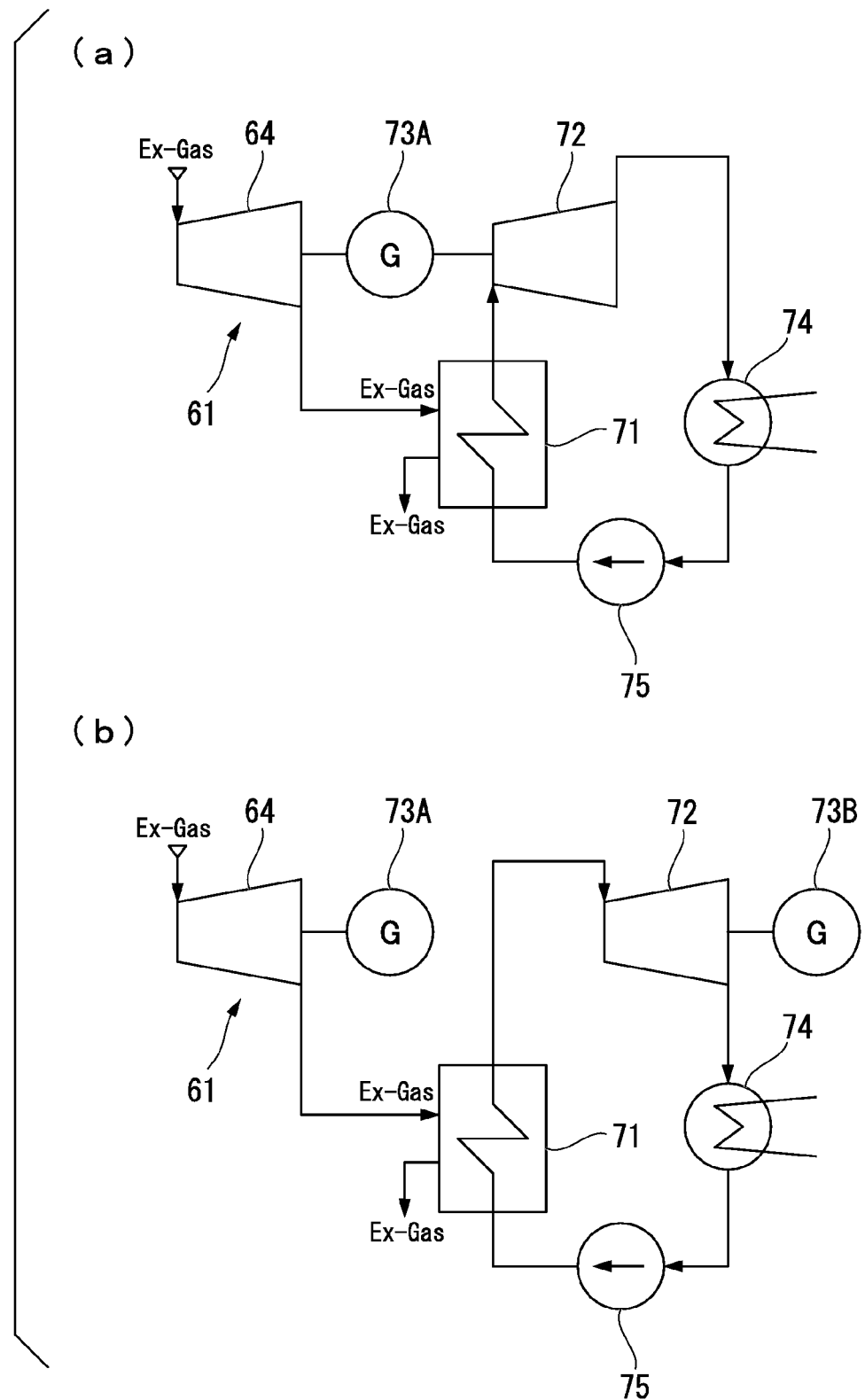
FIG. 12 shows a configuration such as an exhaust-heat-recovery boiler that may be added in the power generation apparatus shown in FIG. 9(b)

The FIGS. 12 (a) and (b) shows an exhaust-heat-recovery boiler 71 that can be added to the power generation apparatus shown in FIG. 9(b); and FIG. 12(a) is a schematic system diagram in the case of adopting the single shaft, and FIG. 12 (b) is a system diagram in the case of adopting the multi-shaft type.

A power generation apparatus as shown in FIGS. 12(a) and (b) is a complex power generation apparatus (combined cycle) using the exhaust-heat-recovery system. The combustion heat (exhaust heat) of the combustion gas (exhaust gas) discharged from the combustion-gas turbine 61 (in FIG. 12, only the turbine unit 64 is shown) is utilized.

Specifically, the power generation apparatus as shown in FIGS. 12(a) and (b), in addition to the configuration (only the turbine unit 64 is shown in drawing) shown in FIG. 9 (b), further includes the exhaust-heat-recovery boiler 71 which generates steam by heat recovery from combustion gas (Ex-gas) discharged from the combustion-gas turbine 61 (turbine unit 64), a steam turbine 72 which is rotationally driven by the steam generated by the exhaust-heat-recovery boiler 71, an electric generator 73A (73B) which generates electric power by driving the steam turbine 72, a condenser 74 which cools and condenses the steam from the steam turbine 72, and a water supply pump 75 which supplies water of the condenser 74 to the exhaust-heat-recovery boiler 71.

Further, in the single shaft shown in FIG. 12 (a), by placing the combustion-gas turbine 61 and the steam turbine 62 (turbine unit 64) in a single shaft, the same electric generator 73A is driven by both. Meanwhile, in the multi-shaft type shown in FIG. 12(b), by placing the combustion-gas turbine 61 and a steam turbine 62 (turbine unit 64) in separate shafts, the different electric generators 73A and 73B are driven by the two turbines.

Figure 13:
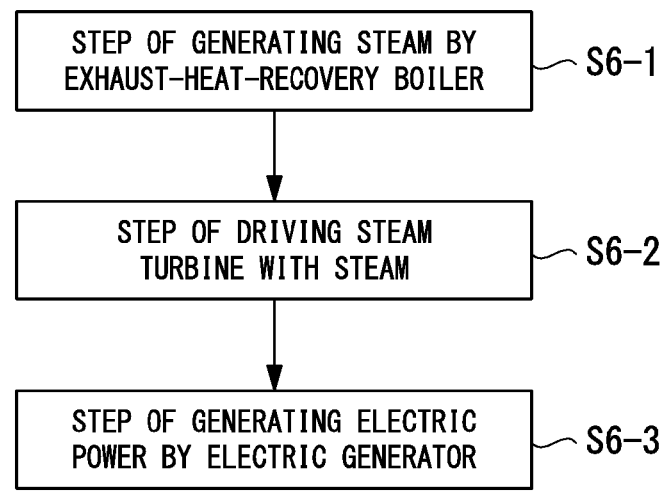
FIG. 13 is a process diagram of the power generation method using a power generation apparatus shown in FIGS. 12(a), (b).

As shown in FIG. 13, the power generation method according to the present invention, includes a step S6-1 of generating steam in the exhaust-heat-recovery boiler 71 by heat recovery from the decomposition gas discharged by the combustion-gas turbine 61 (turbine unit 64), step S6-2 of rotationally driving the steam turbine 72 by steam generated by the exhaust-heat-recovery boiler 71, and step S6-3 of generating electric power by electric generator 73A (73B) by driving the steam turbine 72.

Specifically, in the power generation apparatus shown in FIGS. 12 (a), (b), while an electric generator 73A which is connected the combustion-gas turbine 61 (turbine unit 64) are driven, the steam turbine 72 is driven by steam generated from the exhaust-heat-recovery boiler 71. The electric generator 73A (73B) which is connected to the steam turbine 72 is rotatably driven. As a result, it is possible to obtain the power more efficiently.

Then, after the steam exhausted from the steam turbine 72 is cooled and condensed to water by the condenser 74, the water is delivered to the exhaust-heat-recovery boiler 71 by supply pump 75, and then the exhaust-heat-recovery boiler 71 re-generates steam again by heat exchange with the combustion gas.

In this way, in the power generation apparatus shown in FIGS. 12 (a), (b), it is possible to generate electric power using the combustion heat (exhaust heat) of combustion-gas discharged from the combustion-gas turbine 61. As a result, it is possible to obtain a higher thermal efficiency in power generation.

The exhaust-heat-recovery boiler 71 has a structure similar to that of conventional exhaust-heat-recovery boiler. In addition, the same security equipment (apparatus/component), and accessories (apparatus/component) may also be used.

Further, not only the exhaust-heat-recovery boiler 71 of the power generation apparatus shown in FIG. 12 (a), (b), but also the other component such as the steam turbine 72 as described above, the electric generator 73A (73B), the condenser 74, or the water pump 75 may have the same structure as the conventional one. In addition, accessories (apparatus/component) and security equipment (apparatus/component) may also have a conventional structure.

The power generation apparatus according to the present invention may have various sizes. For example, a large power generation apparatus (power generation plant) may be used to replace a thermal power generation plant or a nuclear power generation plant, and a small one (power generation module) may be used in a transportation equipment, a machinery or electrical equipment.

In addition, the power generation apparatus according to the present invention may be used in various areas, such as, for example, in plants (industry) and in houses (home). It is possible to design them to be suitable for stationary-type apparatuses, movable-type apparatuses, and portable-type apparatuses.

Similarly, the decomposition-gas boiler 1 and the decomposition-gas turbines 11 according to the present invention may have various sizes. For example, a large one may be used in a power generation apparatus as described above, or a small one may be used as a micro-boiler or a micro-gas turbine.

Similarly, the decomposition-gas boiler 1 and the decomposition-gas turbines 11 according to the present invention may be used in various application, and is not limited for use in power generation and, for example, may be used in the same applications as conventional combustion-gas turbines and combustion gas boilers.

Further, the decomposition-gas boiler 1 according to the present invention may generate hot water, and is not limited to generating steam using the heat of decomposition generated by the decomposition of nitrous oxide, as described above.

In addition, the working fluid (steam source) in the circulation system from boilers 1 and 51 (steam generation unit 7, 57), 41 and 71, to steam turbines 2, 52, 42, 72, condensers 4, 54, 44, 74, or water supply pumps 5, 55, 45, 75 as described above may use water (water steam) in general. On the other hand, in the present invention, for example, a fluid having a boiling point lower than that of water may also be used, for example, organic medium such as ammonia or normal pentane used in the binary cycle power generation such as geothermal power generation. In addition, it is may use a working fluid having a boiling point higher than water.

Further, in order to take full advantage of the decomposition-gas, steam or combustion gas, the gas turbines 11 and 61 (turbine units 14, 64) and the steam turbines 2, 42, 52, 72 as described above, for example, may include combinations of a high pressure turbine and a low pressure turbine, or combinations of a low pressure turbine and an intermediate pressure turbine and a pressure turbine in accordance with the characteristics of decomposition-gas, steam or combustion gas. Further, the complex turbines may be arranged in series (single-shaft) or in parallel (multi-shaft) with each other.

In addition, each of the gas turbines 11 and 61 (turbine unit 14, 64) or each of the steam turbines 2, 42, 52, 72 are not be limited to an impulse turbine in which both of a turbine blade and a turbine shaft are rotated by spraying decomposition-gas, or combustion gas from the nozzle (stationary blades) to turbine blades, as described above. Each of the gas turbines 11 and 61 (turbine unit 14, 64) or each of the steam turbines 2, 42, 52, 72 may be an reaction turbine in which both of the turbine blades and turbine shafts are rotated by an expanding reaction force generated when the decomposition-gas, steam or combustion gas flowing into the turbine blades flow out of the turbine blades. Further, complex turbines, which are a combination of the reaction turbines and impulse turbines thereof described above, may be used.

In addition, the power generation system by driving each electric generators 12, 62, 3, 43 A, 43B, 53, 73 A, 73B by rotating each gas turbines 11 and 61 (turbine unit 14, 64) or each steam turbines 2, 42, 52, 72 as described above, is not limited to the configuration for rotating each the electric generators 12, 62, 3, 43A, 43B, 53, 73A, and 73B at single draft with each of the gas turbines 11 and 61 (turbine units 14, 64) or each of the steam turbines 2, 42, 52, 72 thereof. The power generation system, for example, may have a configuration in which a clutch or a transmission is arranged between the each turbines including gas turbine 11 and 61 (turbine unit 14, 64) and steam turbines 2, 42, 52, 72, and each electric generators 12, 62, 3, 43 A, 43B, 53, 73 A, 73B. Further, the power generation system may have a structure in which a device (governor device) for adjusting the rotational speed of the steam turbines 2, 42, 52, 72 and the gas turbines 11, 61 (turbine units 14, 64).

Further, the present invention, instead of the steam turbines 2, 42, 52, 72 and gas turbines 11, 61 (turbine units 14, 64) described above, electric power may be obtained by driving the electric generators 12, 62, 3, 43A, 43B, 53, 73 A, and 73B by rotational power which is obtained by converting reciprocating motion of a piston to the rotational motion of a crank shaft, similarly to a reciprocating engine (piston-crank mechanism), by introducing decomposition gas or steam into a cylinder, reciprocating the piston in the cylinder (reciprocating piston mechanism), and then rotating the crank shaft connected to the piston via a connecting rod.

Further, the electric generators 12, 62, 3, 43A, 43B, 53, 73A, 73B, not limited to one that generates electric power by the rotation motion, may be generated by reciprocating motion (vibration) or the like. In this case, it is possible to provide a converting mechanism to convert the rotation motion by the steam turbines 2, 42, 52, 72 (turbine unit 14, 64) or gas turbines 11, 61 as described above to the reciprocating motion (vibration) or the like. Further, it is also possible to directly reciprocate by using the reciprocating piston mechanism described above.

The power generation apparatus of present invention, not limited to those newly designed, may be those in which a conventional combustion or gas turbine, combustion gas or boiler included in a power generation apparatus or a reactor nuclear power generation apparatus are converted to the decomposition-gas turbine 11 and decomposition-gas boiler 1 of the power generation apparatus according to the present invention. Further, it is possible to add the decomposition-gas turbine 11 or the decomposition-gas boiler 1 of the present invention to the conventional equipment. In this case, the power generation using nitrous oxide as an environmental-friendly energy may be easily produced at a low-cost in comparison to designing a new one.

In the present invention, it is possible to combine a heat transport apparatus performing heat transfer by utilizing the energy generated by the decomposition of the nitrous oxide with the power generation apparatus for generating electric power by utilizing the energy generated by the decomposition of nitrous oxide as described above.

That is, in the present invention, it is possible to take out electric power and heat at the same time from the energy generated when nitrous oxide is decomposed as described above, and to construct a so-called co-generation system (system combined heat and power). It is possible to increase energy efficiency.

Figure 14:
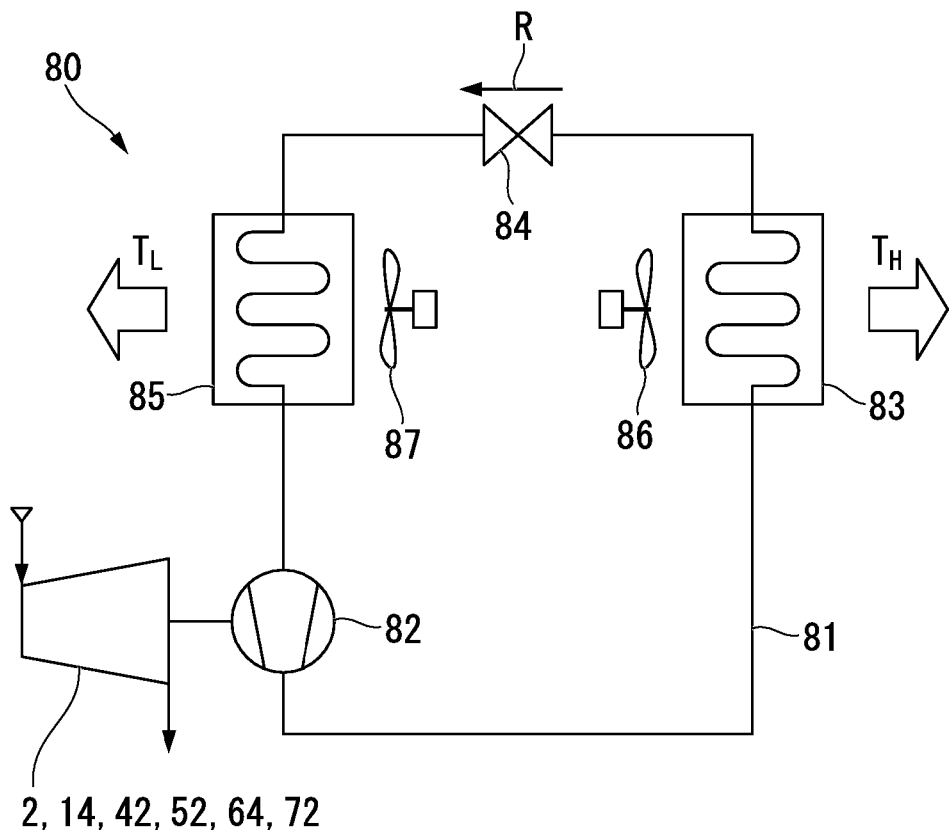
FIG. 14 is a schematic system diagram showing a configuration of a heat transport apparatus having a compression-typed heat pump, as an example of a cogeneration system according to the present invention.

For example, the cogeneration system according to the present invention, as shown in FIG. 14, may include a compression-typed heat pump 80 which is driven by any one of the steam turbine 2 shown in FIG. 1, the decomposition-gas turbine 11 shown in FIG. 2, the steam turbine 42 shown in the FIG. 7 (a), (b), the steam turbine 52 shown in FIG. 9 (a), the combustion-gas turbine 61 shown in FIG. 9(b), and the steam turbine 72 shown in FIG. 12(a), (b).

In this case, at the same time to generate electric power by utilizing energy generated by the decomposition of nitrous oxide or the energy generated by combustion of the fuel as described above, it is possible to transfer heat using the compression-typed heat pump 80 in the cogeneration system.

Specifically, the compression-typed heat pump 80, as shown in FIG. 14, includes a refrigerant circulation system 81 in which the refrigerant R is circulated, a compression unit 82 for feeding and compressing the refrigerant R in the refrigerant circulation system 81, and a condenser unit 83 for releasing heat from the refrigerant R while condensing the refrigerant R that has been compressed by the compression unit 82, an expansion unit 84 for expanding the refrigerant R that is radiated by the condenser 83, a vaporizing unit 85 for absorbing the heat to the refrigerant R while evaporating the refrigerant R which is expanded in the expansion unit 84.

The refrigerant circulation system 81 is composed of piping (channel) connected sequentially to the compression unit 82, the condenser unit 83, the expansion unit 84, and the evaporator unit 85. The refrigerant R, as a heat medium for heat transfer, circulates in the refrigerant circulation system 81, while repeating heat dissipation and heat absorption due to changing the state (vaporization and liquefaction) while changing the pressure (compression and expansion). As the refrigerant R, for example, fluorocarbons (CFCs) (such as hydrofluorocarbon (HFC), hydrochlorofluorocarbons (HCFC)), hydrocarbons (such as propane, butane, isobutene), water, carbon dioxide, and ammonia, may be used.

The compression unit 82 is made from a compressor, and is driven by connected to any one of the steam turbine 2 shown in FIG. 1, the decomposition-gas turbine 11 shown in FIG. 2, the steam turbine 42 shown in the FIG. 7 (a), (b), the steam turbine 52 shown in FIG. 9 (a), the combustion-gas turbine 61 shown in FIG. 9(b), and the steam turbine 72 shown in FIG. 12(a), (b). The refrigerant R is fed to the condenser unit 83, after it becomes a gas with high temperature and high pressure while it is heated by being compressed by the compression unit 82.

The condensation unit 83 is made from a heat exchanger (radiator) called a condenser, and release the heat from the refrigerant R which is compressed by the compression unit 82, while the refrigerant R is condensed by heat exchange with the outside when passing through the inside of the condensation unit 83. As a result, the refrigerant R is delivered to the expansion unit 84 after becoming a liquid with room temperature and high pressure. Further, the compression-typed heat pump 80 includes a fan (air blowing device) 86 in a side of the condenser 83, and as a result, it is possible to efficiently release the hot air $T_H$ to the outside. Further, it is also possible to perform heating by using the hot air $T_H$, or to use the heat radiating (high-temperature) side of the heat exchanger as a heater (heating unit).

The expansion unit 84 is made from an expansion valve and a capillary tube. The refrigerant R is fed to the evaporator unit 85, after it becomes a liquid with a low temperature and low pressure while it is cooled by being expanded in the expansion unit 84.

The evaporation unit 85 is made from a heat exchanger (heat absorber) called a evaporator, and make the refrigerant R which is expanded by the expansion unit 84 to absorb heat, while the refrigerant R is expanded by heat exchange with the outside when passing through the inside of the evaporation unit 85. As a result, the refrigerant R is delivered to the compression unit 82 after becoming a gas with low temperature and low pressure. Further, the compression-typed heat pump 80 includes a fan (air blowing device) 87 in a side of the evaporator unit 85, and as a result, it is possible to efficiently release the cold air $T_L$ to the outside. Further, it is also possible to perform cooling by using the cold air $T_L$, or to use the endothermic (low-temperature) side of the heat exchanger as a cooler (cooling unit).

The compression-typed heat pump 80 having a structure as described above may constitute a heat transport apparatus which transports heat while circulating the refrigerant R within the refrigerant circulation system 81, and the compression-typed heat pump 80 is driven by any one of the steam turbine 2 shown in FIG. 1, the decomposition-gas turbine 11 shown in FIG. 2, the steam turbine 42 shown in the FIG. 7 (a), (b), the steam turbine 52 shown in FIG. 9 (a), the combustion-gas turbine 61 shown in FIG. 9(b), and the steam turbine 72 shown in FIG. 12(a), (b).

In the cogeneration system of the present invention as described above, it is possible to perform heat transfer using a compression-typed heat pump 80, and, at the same time to generate electric power by utilizing energy generated by the decomposition of nitrous oxide as described above, or energy generated by combustion of the fuel. By constructing such a cogeneration system of the present invention, it is possible to improve the overall energy efficiency.

The present invention is not limited to the configuration of the heat transport apparatus shown in FIG. 14, and making various modifications can be made without departing from the scope of the present invention.

Figure 15:
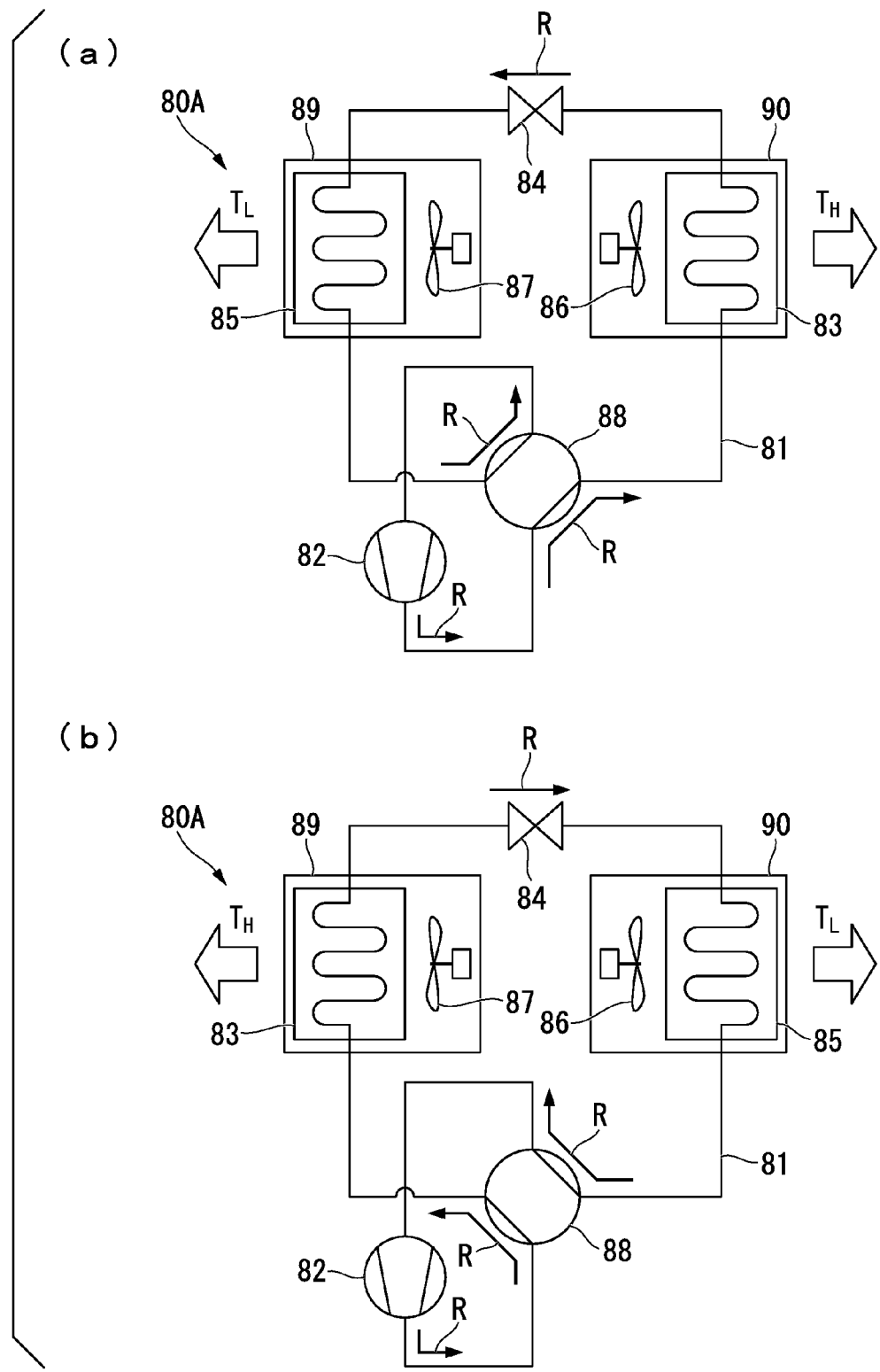
FIG. 15 is a schematic system diagram of a compression-typed heat pump provided in the air-conditioned according to the present invention.

For example, the heat transport apparatus shown in FIG. 14 may include a compression-typed heat pump 80A as shown in FIG. 15, instead of the compression-typed heat pump 80, and then constitute a so-called air-conditioning which performs heating and cooling.

FIG. 15 (a) shows the cooling operation of the heat pump 80A, and FIG. 15 (b) shows the heating operation of the heat pump 80A. Further, in the heat pump 80A shown in FIGS. 15(a), (b), regarding the components equivalent to the above heat pump 80, the description thereof is omitted, and the same reference numerals are used.

Specifically, the compression-typed heat pump 80A includes, in addition to the configuration of the heat pump 80, a four-way valve (switching device) 88 for switching the flow direction of the refrigerant R of the refrigerant circulation system 81, an indoor unit 89 installed indoor, and an outdoor unit 90 installed outdoors.

Here, in the heat exchanger of the indoor unit 89 side and the heat exchanger of the outdoor unit 90 side, the function of the evaporator unit 85 and the condensation unit 83 are replaced by switching the direction of flow of the refrigerant R by four-way valve 88. That is, in the cooling operation as shown in FIG. 15 (a), the heat exchanger of the indoor unit 89 side has functions as the evaporator unit 85, the heat exchanger of the outdoor unit 90 side functions as the condenser unit 83. On the other hand, in the heating operation as shown in FIG. 15 (b), the heat exchanger of the indoor unit 89 side functions as the condenser unit 83, the heat exchanger of the outdoor unit 90 side functions as the evaporator unit 85.

In the air conditioner having a compression-typed heat pump 80A as described above, the compression unit 82 is driven by being connected to any one of the steam turbine 2 shown in FIG. 1, the decomposition-gas turbine 11 shown in FIG. 2, the steam turbine 42 shown in the FIG. 7 (*a*), (*b*), the steam turbine 52 shown in FIG. 9 (*a*), the combustion-gas turbine 61 shown in FIG. 9(*b*), and the steam turbine 72 shown in FIG. 12(*a*), (*b*) (no shown in FIG. 15). Thus, the compression-typed heat pump 80A may perform heat transfer while circulating refrigerant R within the refrigerant circulation system 81. Then, in the cooling operation as shown in FIG. 15 (*a*), it is possible to emit cold air $T_L$ to the room by the fan 87 of the indoor unit 89 side, on the other hand, in the heating operation shown in FIG. 15 (*b*), it is possible to emit warm air $T_H$ to the room by the fan 87 of the indoor unit 89 side.

In the cooling operation as shown in FIG. (a), it is possible to emit warm air $T_H$ outside by the fan 86 of the outdoor unit 90 side, on the other hand, in the heating operation shown in FIG. 15 (*b*), it is possible to emit cold air $T_L$ outside by the fan 86 of the outdoor unit 90 side.

Further, the air conditioner according to the present invention, in addition to the cooling and heating as described above, may include a dehumidifier function for performing dehumidification in a room. The dehumidification, for example, has a weak cooling dehumidification (dry) type, in which using the cooling operation with weak air flow, after performing dehumidification by condensing moisture in the air in the heat exchanger of indoor unit side, dry air is back to room; and a re-heated dehumidification (thermal recycling) type, in which after performing dehumidification by condensing moisture in the air in the heat exchanger of indoor unit side, the cool and dry air is reheated by reheater, and then the warmed air is back to room.

In the cogeneration system of the present invention as described above, it is possible to perform heat transfer using a compression-typed heat pump 80A, at the same time as generation of electric power utilizing energy generated by the decomposition of nitrous oxide, or energy generated by combustion of the fuel, as described above. By constructing such a cogeneration system of the present invention, it is possible to improve the overall energy efficiency.

In the cogeneration system according to the present invention, any one of the electric generators 3, 12, 43A, 43B, 53, 62, 73A, and 73B which are included in a power generation apparatus shown in FIG. 1, 2, 7, 9, or 12 above, may be replaced by the compression-typed heat pumps 80, 80A as shown in FIG. 14 or the FIG. 15. In another cogeneration system according to the present invention, together with one of the electric generators 3, 12, 43A, 43B, 53, 62, 73A, and 73B which are included in a power generation apparatus shown in FIG. 1, 2, 7, 9, or 12 above, the compression-typed heat pumps 80, 80A as shown in FIG. 14 or the FIG. 15 may be driven by any one of the steam turbine 2 shown in FIG. 1, the decomposition-gas turbine 11 shown in FIG. 2, the steam turbine 42 shown in the FIG. 7 (*a*), (*b*), the steam turbine 52 shown in FIG. 9 (*a*), the combustion-gas turbine 61 shown in FIG. 9(*b*), and the steam turbine 72 shown in FIG. 12(*a*), (*b*).

Figure 16:
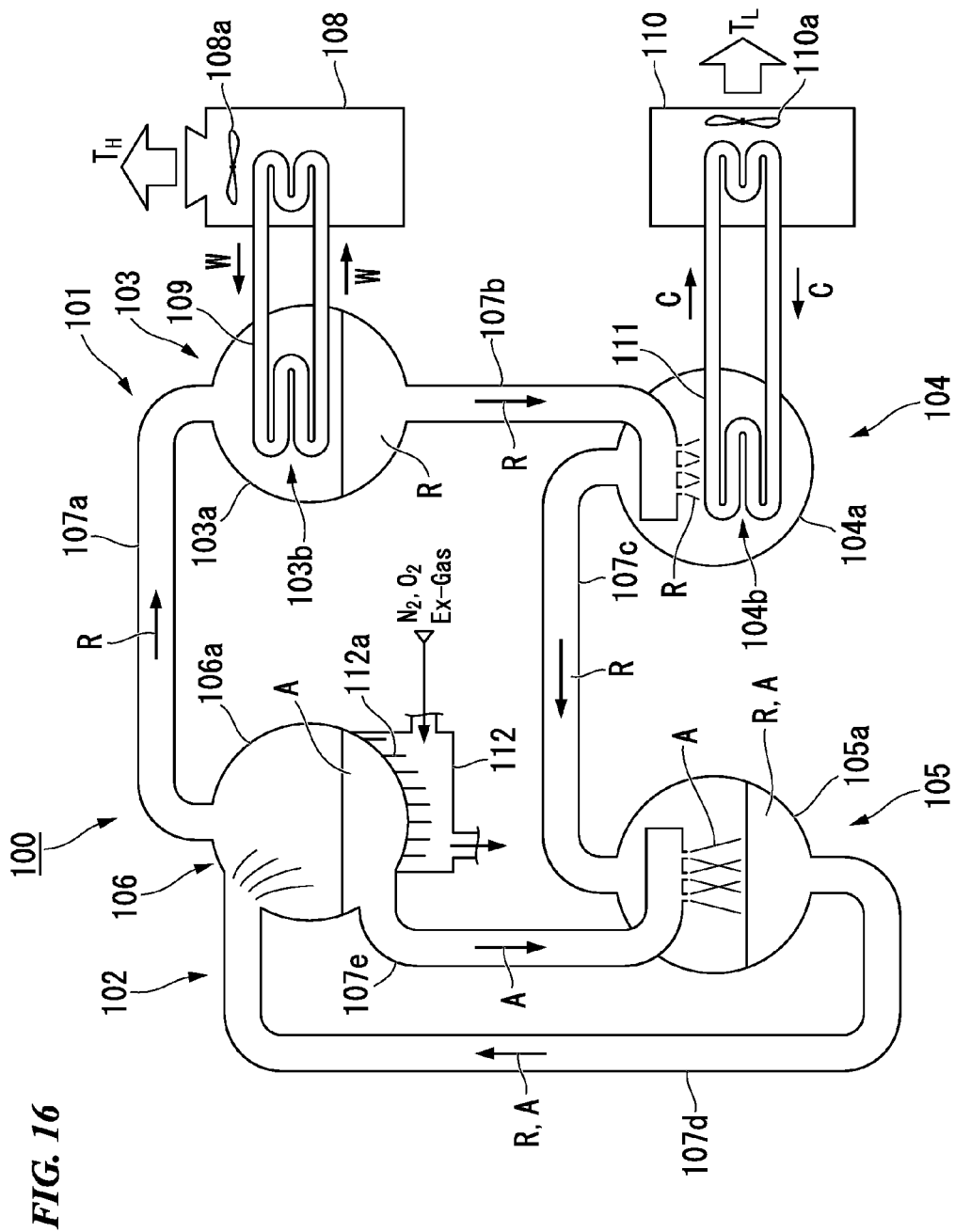
FIG. 16 is a schematic diagram showing a structure of a heat transport apparatus having an absorption-typed heat pump as another example of a cogeneration system according to the present invention.

Also, the cogeneration system according to the present invention may further combine the absorption-typed heat pump 100 as shown in FIG. 16 with the power generation apparatus shown in FIG. 1, 2, 7, 9, or 12.

In this case, at the same time to generate electric power by utilizing energy generated by the decomposition of nitrous oxide, or the energy generated by combustion of the fuel as described above, it is possible to transfer heat using the absorption-typed heat pump 100 in the cogeneration system.

Specifically, the absorption-typed heat pump 100 includes a refrigerant circulation system 101 in which the refrigerant R is circulated, an absorption liquid circulation system 102 which is connected to the refrigerant circulation system 101 and in which the absorption liquid A absorbing the refrigerant R is circulated, a condensation unit 103 for releasing heat from the refrigerant R while condensing the refrigerant R in the refrigerant circulation system 101, a vaporizing unit 104 for absorbing the heat to the refrigerant R in the refrigerant circulation system 101 while evaporating the refrigerant R, an absorption unit 105 in which the refrigerant R evaporated is absorbed by the absorption liquid A in the absorption liquid circulation system 102, and a regeneration unit 106 in which the absorbed refrigerant R is evaporated from the absorption liquid A in the absorption liquid circulation system 102.

The refrigerant circulation system 101 includes a first to fourth pipes (the channel) 107*a* to 107*d* which connect in sequence to the condenser unit 103, the evaporator unit 104, the absorption unit 105, and the regeneration unit 106. The refrigerant R, as a heat medium for the heat transport, circulates within the refrigerant circulation system 101, while repeating the evaporation from the absorption liquid A and absorption into the absorption liquid A, and repeats heat dissipation and heat absorption associated with state changes (vaporization and liquefaction). In the present embodiment, as the refrigerant R, water may be used.

The absorption liquid circulation system 102 includes fourth and fifth pipes (the channel) 107*d* and 107*e* which connect in sequence to the absorption unit 105 and the regeneration unit 106. The fourth pipe 107*d* is a common one constituting the refrigerant circulation system 101 and the absorption liquid circulation system 102. The absorption liquid A circulates within the absorption liquid circulation system 102 while repeating evaporation of the refrigerant R and absorption of the refrigerant R. In the present embodiment, as the absorbing liquid A, an aqueous solution of lithium bromide (LiBr) having high water absorption ability may be used.

The condensing unit 103 includes a condensation chamber 103*a* connected to the first pipes 107*a* and the second pipe 107*b*, and the condenser 103*b* which is provided inside the condensation chamber 103*a*. The condenser 103*b* includes, as a heat exchanger (hot) side radiator, is thermally connected to an external radiator (cooling towers, outdoor unit) 108. Specifically, between the condenser 103*b* (inside the condensation chamber 103*a*) and the radiator 108 (outside the condensation chamber 103*a*), a heat pipe 109 is routed and a coolant W flows inside (circulation). As the coolant W, water may be used, for example.

In the condensation unit 103, the refrigerant R (steam) which is evaporated in the regeneration unit 106 is supplied to the condensation chamber 103*a* through the first pipe 107*a*. In this condensation chamber 103*a* inside, heat is released from the refrigerant R by heat exchange with the condenser 103*b* (contact with the heat pipe 109). As a result, the refrigerant is cooled and condensed to liquid (water) and then sent to the evaporator unit 104 through the second pipe 107*b* from the condensation chamber 103*a*.

In the condensation unit 103, the heat released from the refrigerant R is absorbed (endothermic) by the coolant W which flows through the heat pipe 109, and the heat is released as the hot air $T_H$ from the radiator 108 by heat exchange with the outside. Further, in the radiator 10, the fan (blower unit) 108a is provided, and it is possible to efficiently release the hot air $T_H$ outside while driving the fan 108a.

In the condensation unit 103, it is possible to heat by using hot air $T_H$ emitted from the radiator 108. That is, it is possible to use the radiator 108 as a heater (heating device). The applications of heating, for example, may be heating, supplying hot water, heating water, drying and the like.

The evaporation unit 104 includes a vaporization chamber 104a which is connected to the second pipe 107c, the third pipe 107b and an evaporation unit 104b which is disposed inside the evaporation chamber 104a. In addition, the pressure state of the evaporation chamber 104a inside is reduced close to a vacuum (a state that refrigerant R is easy to evaporate (vaporization)). On the other hand, as a heat exchanger for endothermic (cold) side, the evaporation unit 104b is thermally connected to a heat sink external (air conditioner, the indoor unit) 110. Specifically, the heat pipe 111 is routed between the heat absorber 110 (outer side of the evaporation chamber 104a) and the evaporation unit 104b (the inside of the evaporation chamber 104a), and the coolant C flows (circulation) flows therethrough. As the coolant C, it is possible to use, for example, water.

Then, in the evaporator unit 104, the refrigerant R (water) condensed (liquefied) in the condenser unit 103 is supplied to the evaporation chamber 104a through the second pipe 107b. Heat is absorbed by the refrigerant R by heat exchange with the evaporation unit 104b within the evaporation chamber 104a (contacted with the heat pipe 111).

At this time, since the pressure of the evaporation chamber 104a is reduced close to a vacuum, the refrigerant R dropped from the second pipe 107b is easily evaporated (vaporized) by contact with the heat pipe 111. And then, the refrigerant R gas (water vapor) is sent to the absorber unit 105 through the third pipe 107c from the evaporation chamber 104a.

Further, in the evaporation unit 104, after the coolant C which flows through the heat pipe 111 is cooled by the heat of vaporization when the refrigerant R evaporates, and it is released as a cold air $T_L$ by the heat sink 110 by heat exchange with the outside. Further, the heat sink 110, a fan (blower unit) 110a is provided, it is possible to efficiently release the cold air $T_L$ outside while driving the fan 110a.

In the evaporation unit 104, it is possible to performs cooling by using the cold air $T_L$ emitted from the heat sink 110. That is, it is possible to use the heat sink 110 as a cooler (cooling device). The application of cooling, for example, may be cooling, refrigeration, freezing, cold water, ice-making and the like.

The absorption unit 105 includes an absorber having an absorption chamber 105a which is connected to the third pipe 107c, the fourth pipe 107d, and the fifth pipe 107e.

Then, in the absorption unit 105, the refrigerant R (steam) evaporated (vaporized) in the evaporation unit 104 is supplied to the absorption chamber 105a through the third pipe 107c, and then the refrigerant R is absorbed by the absorption liquid A within the absorption chamber 105a.

At this time, since the absorption liquid A dropped from the fifth pipe 107e is a concentrated solution of highly hygroscopic, it may easily absorb the evaporated (vaporized) refrigerant R (water vapor). Then, the absorption liquid A which has absorbed the refrigerant R becomes a dilute solution is sent to the regeneration unit 106 through the fourth pipe 107d from the absorption chamber 105a.

The regeneration unit 106 is made of a regenerator including a regeneration chamber 106a which is connected to the first pipe 107a, the fourth pipe 107d and the fifth pipe 107e, a heater (heating unit) 112 for heating the regeneration chamber 106a.

Then, in the regeneration unit 106, the absorption liquid A which has absorbed the refrigerant R is supplied to the regeneration chamber 106a through the fourth pipe 107d, and then in the regeneration chamber 106a inside, the absorption liquid A which has absorbed the refrigerant R is heated with a heater 112, and as a result, the refrigerant R is evaporated (vaporized) from the absorption liquid A.

Thus, the refrigerant R which becomes a gas (steam) is sent to the condenser 103 through the first pipe 107a from the regeneration chamber 106a. On the other hand, the absorption liquid A which becomes a concentrated solution (a state easy to absorb refrigerant R) is sent to the absorption unit 105 through the fifth pipe 107e from the regeneration chamber 106a.

In this way, in the absorption-typed heat pump 100, it is possible to perform heat transfer by circulating the refrigerant R within the refrigerant circulation system 101 while circulating absorption liquid A within the absorption liquid circulation system 102.

Then, the absorption-typed heat pump 100 has features that, in the regeneration unit 106, the absorption liquid A within the regeneration chamber 106a is heated by the decomposition gas generated by the decomposition of nitrous oxide and the heat recovery from combustion gas generated by combustion of the fuel.

That is, in the absorption-typed heat pump 100, the decomposition-gas ($N_2$, $O_2$) of nitrous oxide generated by decomposing nitrous oxide ($N_2O$) in the above decomposition reactor 22 (decomposition reaction units 6, 13) and the combustion gas (Ex-Gas) generated by burning fuel in the combustion reaction units 56 and 63 is supplied to the heater 112.

The method for supplying the combustion gas or the decomposition-gas to the heater 112 is not limited particularly. It is possible to supply the combustion or decomposition gas to the heater by providing the heater 112 at a position in the gas line (flow path) through which the combustion or decomposition gas discharged from the combustion reactors 56, 63 or the decomposition reaction units 6, 13 flows, or by providing the heater 112 at a position in a branched line (flow path) through which a part of the combustion or decomposition gas discharged from the combustion reactors 56, 63 or the decomposition reaction units 6, 13 flows.

The heater 112 is a heat exchanger of heating (hot) side attached to the regeneration chamber 106a. The regeneration chamber 106a is heated by the heat exchange while the combustion gas and decomposition-gas pass through the interior of the heat exchanger.

In the heater 112, a heat sink (fins) 112a for improving thermal conductivity with the regeneration chamber 106a is provided in a state of being in contact with the heat transfer surfaces of the regeneration chamber 106a. Thus, it is possible to efficiently heat the regeneration chamber 106a.

In addition, the heater 112 may use heat exchangers having varied sizes or types depending on the application. For example, as a type of heat exchanger, it is possible to use a tube type (a double tube type, multitubular (shell and tube type) type, spiral type, etc.), a plate type, and a regeneration type which may be selected and used appropriately in accordance with the application.

The absorption-typed heat pump 100 having a structure as described above may constitute, in addition to the power generation apparatuses shown in FIG. 1, 2, 7, 9 or 12, a heat transport apparatus utilizing the energy generated by the combustion of the fuel and the energy generated by the decomposition of nitrous oxide as described above.

The cogeneration system of the present invention as described above may not only generate electric power by utilizing the energy generated by the decomposition of nitrous oxide and the energy generated by combustion of the fuel as described above, but also perform heat transfer using the absorption-typed heat pump 100. In the present invention, by constructing such the cogeneration system, it is possible to improve overall energy efficient.

The present invention is not limited to the configuration of the heat transport apparatus shown in FIG. 16, various modifications may be made without departing from the scope of the present invention.

Figure 17:
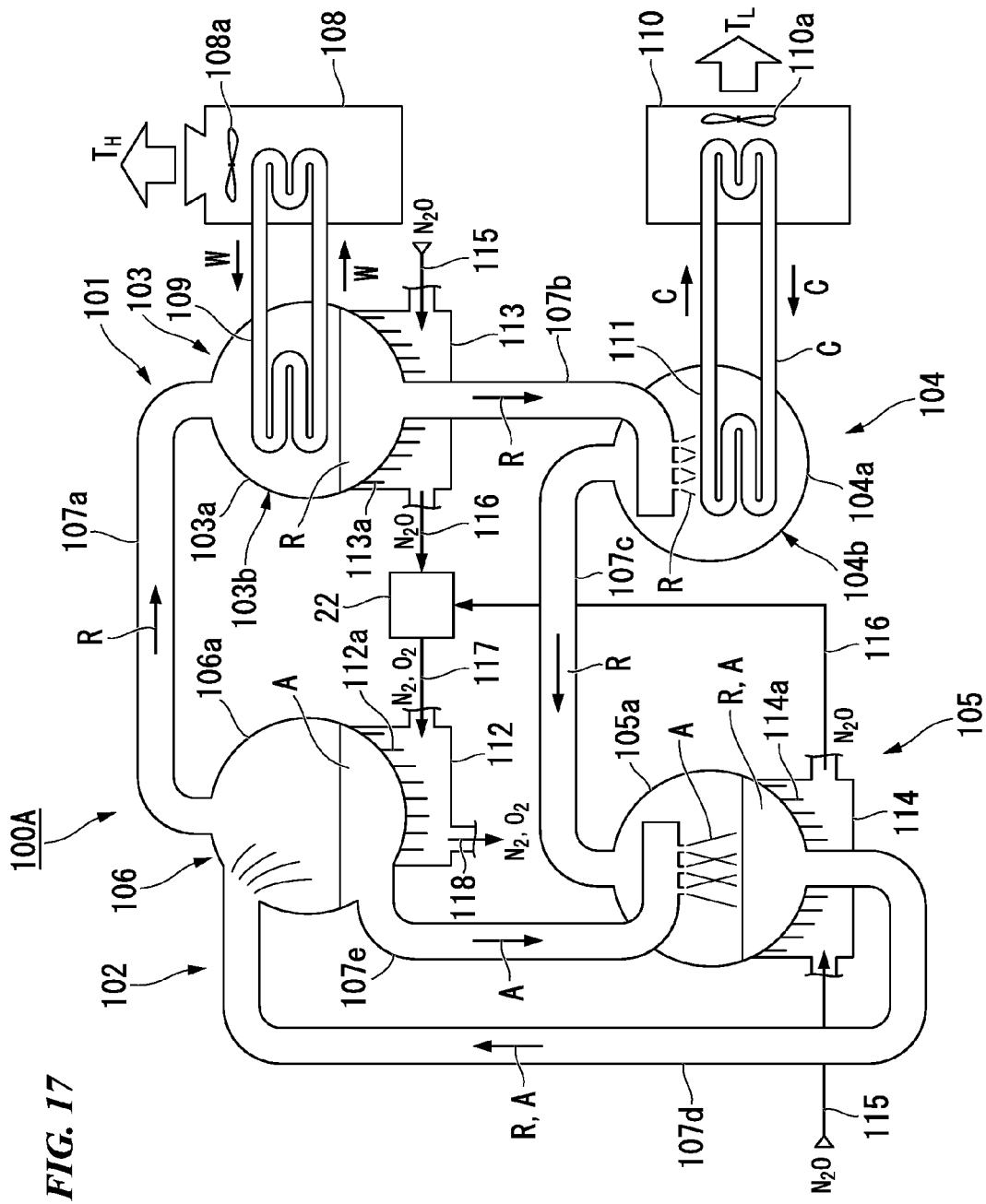
FIG. 17 is a schematic diagram showing a modification of the absorption-typed heat pump.

For example, the absorption-typed heat pump 100A shown in FIG. 17 may include a cooler (cooling device) 113 for cooling the condensation chamber 103a or a cooler (cooling device) 114 for cooling the absorption chamber 105a, by utilizing the cooling heat due to adiabatic expansion nitrous oxide ($N_2O$).

Specifically, the coolers 113 and 114 are thermal exchangers in the cooling (cold) side, which are attached to the condensation chamber 103a and the absorbent chamber 105a. Nitrous oxide gas with a low temperature due to temperature drop (cooling heat) while adiabatic expansion is supplied to the heat exchanger. Then, while the nitrous oxide gas of low temperature passes through the inside of the heat exchanger, the condensation chamber 103a and the absorption chamber 105a are cooled by heat exchange with the nitrous oxide gas.

In the interior of the coolers 113 and 114, heat sinks (fins) 113a, 114a for improving thermal conductivity with the condensation chamber 103a and the absorber chamber 105a are provided in the state that the heat sinks (fins) 113a, 114a are in contact with the heat transfer surface of the condensation chamber 103a and the absorption chamber 105a. Thus, it is possible to efficiently cool the condensation chamber 103a and the absorption chamber 105a.

Further, the coolers 113, 114 may use heat exchangers having varied sizes and types depending on the application. For example, the type of heat exchanger may include a tube type (a double tube type, multitubular (shell and tube type) type, spiral, etc.), a plate type, or regeneration type, which may be selected and used appropriately in accordance with the application.

Further, the absorption-typed heat pump 100A shown in FIG. 17 include a first supply line 115 for supplying nitrous oxide gas of low temperature obtained by the adiabatic expansion wherein the nitrous oxide gas is discharged from the high pressure gas container 31a (Not shown in FIG. 17) to coolers, a second supply line 116 for supplying nitrous oxide gas that is discharged from the coolers 113 and 114 to the decomposition reactor 22, a third supply line 117 for supplying decomposition gas ($N_2$, $O_2$) with high temperature obtained by decomposing nitrous oxide in the decomposition reactor 22 to the heater 112, and a discharge line 118 for discharging the decomposition-gas from the heater 112.

Among them, the first supply line 115 is a pipe (passage), one end of which is connected to the high pressure gas container 31a, and another end of which is connected to the inlet side of the coolers 113, 114. On the other hand, the second supply line (passage) 116 is a pipe (passage), one end of which is connected to the outlet side of the coolers 113, 114, and another end of which is connected to input side of the decomposition reactor 22 (the gas inlet port 22b). The first and second supply lines 115 and 116 constitute a nitrous oxide gas supply line (nitrous oxide gas supply device) for supplying nitrous oxide gas ($N_2O$) emitted from the high-pressure gas container 31a to the decomposition reactor 22.

On the other hand, the third supply line 117 is a pipe (passage), one end of which is connected to the exit side of decomposition reactor 22 (gas outlet 22c), and another end of which is connected to the inlet side of the heater 112. On the other hand, the discharge line 118 is a pipe (passage), one end of which is a connected to the outlet side of the heater 112.

The components of the absorption-typed heat pump 100A other than those shown in FIG. 17 have a schematic configuration similar to the absorption-typed heat pump 100 shown in FIG. 16. Accordingly, in the absorption-typed heat pump 100A shown in FIG. 17, regarding the portions equivalent to the absorption-typed heat pump 100 shown in FIG. 16, a description thereof is omitted, and portions are denoted by the same reference numerals in the drawings, or are omitted The absorption-typed heat pump 100A may perform heat transfer while circulating refrigerant R within the refrigerant circulation system 101 and circulating absorption liquid A within the absorption liquid circulation system 102. Further, the heat transport apparatus uses decomposition heat generated by the decomposition of nitrous oxide as a heat source, when heating the absorption liquid A using the heater 112 in the regeneration unit 106. Further, the heat transport apparatus uses cooling heat due to adiabatic expansion of nitrous oxide as a cold source, when cooling the absorbent liquid A and the refrigerant R using condensers 113 and 114 in the condensation chambers 103a and the absorption chamber 105a.

The absorption-typed heat pump 100A having a structure as described above may constitute, besides the power generation apparatus shown in FIG. 1, 2, 7, 9 or 12, a heat transport apparatus using decomposition heat generated by the decomposition of nitrous oxide or cooling heat due to adiabatic expansion of nitrous oxide as described above.

The cogeneration system of the present invention as described above, at the same time to generate electric power by utilizing energy generated by the decomposition of nitrous oxide as described above, and the energy generated by combustion of the fuel, may perform heat transfer using a absorption-typed heat pump 100A. In the present invention, by constructing the cogeneration system like this, it is possible to improve overall energy efficiency.

The absorption-typed heat pump 100A shown in FIG. 17 has a structure including both the coolers 113 and 114, but may have a structure including only one of the coolers 113 and 114.

The features of the present invention is not limited to the configuration shown in FIG. 3. For example, the decomposition reactor 22 may be appropriately changed according to the designs of the heat pumps 100, 100A having various shapes and arrangements. Further, it is possible to add appropriate modifications to the nitrogen gas supply line 24, the fuel gas supply line 23, the flow rate adjusting device 25, the temperature measuring instrument 26, the control unit 27, the heater 28, the power supply line 29, the fuel gas valve 30 connected to the decomposition reactor 22, the fuel gas supply source 31, the nitrogen gas shutoff valve 32, or the nitrogen gas supply source 33, according to the designs of the heat pumps 100 and 100A.

Also, the heat transport apparatus according to the present invention may include, in addition to the structures of the absorption-typed heat pumps 100, 100 A shown in FIG. 17 and FIG. 16, for example, a pump (liquid passage device) for passing (circulating) refrigerant R through the refrigerant circulation system 101, or a pump (liquid passage device) for passing (circulating) the absorption liquid A through the absorption liquid circulation system 102.

In addition, the heat transport apparatus according to the present invention may include safety equipment (parts) or accessories (parts).

Regarding the structure of the heat transport apparatus shown in FIGS. 17 and 16, other than the characteristic portion of the present invention described above, it is possible to have a structure similar to the conventional absorption heat pump, such as, for example, the first kind of absorption-typed heat pump for increasing heat, or the second kind of absorption-typed heat pump for increasing temperature.

Also, the absorption-typed heat pump of the present invention is not limited to the type of direct firing in which it is heated by using a decomposition gas generated by the decomposition of nitrous oxide as described above. The absorption-typed heat pump may use the type of steam heating in which it is heated by steam which is generated by heat recovery from the decomposition gas generated by the decomposition of nitrous oxide.

Further, regarding the format of the absorption-typed heat pump of the present invention, for example, any type of a single-effect absorption, the double effect absorption, and heat pumps in a triple effect absorption may be used.

Further, regarding the combination of the absorption liquid A with the refrigerant R, it is preferable to use the absorption liquid A having a high absorption for refrigerant R, and for example, water (refrigerant R) and aqueous solution of lithium bromide (absorbent solution A) as described above, or water (refrigerant R) and an aqueous solution of ammonia ($NH_3$) (absorption liquid A) may be used. The former is preferably used in the application of air conditioning, and the latter is preferably used in the application of refrigeration.

Since it is possible to obtain the cool (cold) air $T_L$ or warm (hot) air $T_H$, the heat transport apparatus according to the present invention may be applied to various applications of refrigeration and air conditioning. For example, the heat transport apparatus according to the present invention may be applied to air conditioning apparatus or air conditioning equipment such as air conditioner that performs cooling or heating as described above. The air conditioner having a function of a dehumidifier performing dehumidification indoors as described above may also be used.

As the heating sector, in addition to heating, heating apparatus or heating equipment for supplying hot water, warm water, and drying or the like may be used. On the other hand, as the cooling sector, in addition to cooling, cooling equipment and a cooling system for performing refrigeration, freezing, cold water, ice-making and the like may be used.

Furthermore, the heat transport apparatus according to the present invention may have various sizes from small to large. In addition, with respect to its use, it is not limited to plant (industry), the use is available in all areas such as use for house (home), or for portable or installation (stationary) type. It may be designed according to the application.

Also, the cogeneration system according to the present invention may include, together with the heat pumps 80, 80A of compression type shown in FIG. 15 or FIG. 14, a configuration with the heat pumps 100, 100A of absorption type shown in FIG. 17 or FIG. 16.

In this case, at the same time to generate electric power by utilizing energy generated by the decomposition of nitrous oxide or energy generated by the combustion of the fuel as described above, the compression-typed heat pumps 80, 80A and the absorption-typed heat pumps 100, 100A may constitute a cogeneration system for heat transfer. In the present invention, by constructing a cogeneration system like this, it is possible to improve the overall energy efficiency.

Nitrous oxide for use in the present invention can be industrially produced. Specifically, the industrial production method of nitrous oxide, for example, may include the following (1) to (3).

(1) Direct ammonia oxidation method $$2NH_3+2O_2 \rightarrow N_2O+3H_2O$$

(2) Ammonium nitrate pyrolysis $$NH_4NO_3 \rightarrow N_2O+2H_2O$$

(3) Sulfamic acid method $$NH_2SO_3H+HNO_3 \rightarrow N_2O+H_2SO_4+H_2O$$

As the nitrous oxide produced industrially, for example, a medical nitrous having a high purity of 99.9% (3N) to 99.999% (5N), a medical nitrous oxide (Japanese Pharmacopoeia) having a purity of 97.0% or more, or an industrial nitrous oxide having a purity of 98% or more may be used.

In addition, the method for producing nitrous oxide may include the following (4) to (10).

(4) Urea decomposition method $$2(NH_2)_2CO+2HNO_3+H_2SO_4 \rightarrow 2N_2O+2CO_2+(NH_4)_2SO_4+2H_2O$$

(5) Preparation of hydroxyl amine $$4NO+2NH_2OH \rightarrow 3N_2O+3H_2O$$

$$2NH_2OH+NO_2+NO \rightarrow 2N_2O+3H_2O$$

$$2NH_2OH+O_2 \rightarrow N_2O+3H_2O$$

(6) By-product of $N_2O$ from organic reactions

Recovery of by-product of $N_2O$ from the production process of adipic acid.

Recovery of $N_2O$ by-product from the production of glyoxal.

(7) Reduction of nitrite or nitrite

Reduced as a solution of nitrite or nitrous acid using warm sulfite, sodium, amalgam, stannous chloride as a reducing agent.

(8) Reduction of nitric acid

Reduced with zinc or tin nitrate, or reduction with sulfur dioxide.

(9) Reduction of nitrate $$2KNO_3+6HCOOH \rightarrow N_2O+4CO_2+5H_2O+2HCOOK$$

(10) Dehydration hyponitrous acid $$H_2N_2O_2+H_2SO_4 \rightarrow H_2SO_4 \cdot H_2O+N_2O$$

Then, after being charged to the high pressure gas container 31a at a gas maker, nitrous oxide produced is temporarily sent to the fuel gas supply source 31 and stored in the fuel gas reservoir. On the other hand, high-pressure gas container 31a may be repeatedly used by being returned to the gas maker after use and re-filled.

As a method of supplying the fuel gas, it is not limited to the method of supplying it with the high pressure gas container 31a (replace the high pressure gas containers 31a), and for example, a method of supplying the fuel gas to a storage tank that is installed in a source 31 (high pressure gas containers 31a) using a vehicle such as a tank truck or tanker may be used. Furthermore, a method of supplying the fuel gas containing nitrous oxide through a pipeline to a storage tank installed in the fuel gas supply source 31 (high pressure gas container 31a) may also be used.

Also for the method of supplying nitrogen gas, it is not limited the method supplying with the high pressure gas container 33a (replace the high pressure gas containers 33a), and it is possible to supply nitrogen gas by a method similar to the above-mentioned method of supplying the fuel gas. Further, it is also possible to supply nitrogen gas by a method similar to the supplying method of fuel gas or nitrogen gas($N_2$) of the plant shown in FIGS. 9 (a), (b).

In the present invention, by using the above catalyst 21, it is possible to lower the decomposition starting temperature of the nitrous oxide. Then, after decomposition of nitrous oxide, it is possible to continuously decompose nitrous oxide to be supplied subsequently by using the heat generated by decomposition of the nitrous oxide.

Therefore, in the present invention, before decomposition of nitrous oxide, the catalyst 21 may be preheated. After decomposition of nitrous oxide, by using decomposition heat generated by decomposition of the nitrous oxide, it is possible to carry out continuous decomposition of nitrous oxide while keeping the temperature of the catalyst 21 more than the temperature which is necessary to decompose nitrous oxide.

Specifically, it is preferable to keep the temperature of the catalyst 21 in the range of 200 to 600° C. from the viewpoint of catalytic activity, and is more preferable to keep the temperature of the catalyst 21 in the range of 350 to 450° C. from the viewpoint of easily carrying out decomposition reaction. That is, in the present invention, it is preferable to preheat by the heater 28, and control temperature of the decomposition-gas by the control unit 27, in order to keep the temperature of the catalyst 21 within such a range.

On the other hand, since the temperature of self-decomposition is at about 500° C. or more, it is also possible to continuously carrying out the decomposition of nitrous oxide without the catalyst 21 by keeping the temperature of the decomposition reactor 22 higher than self-decomposition temperature of nitrous oxide. However, when self-decompose nitrous oxide without the catalyst 21 is carried out, it is known that NO gas is generated as a decomposition by-products. Therefore, in the present invention, it is preferable to use the catalyst 21 in order to prevent generation of the NO gases. The catalyst 21 may be used at a temperature higher than the self-decomposition temperature of nitrous oxide.

The fuel gas may usually be used at room temperature or less as long as that at the temperature nitrous oxide is not liquefied. The fuel gas may also be used at a temperature higher than the room temperature by pre-heating it. For example, when the concentration of the nitrous oxide contained in the fuel gas is low, it is possible to accelerate the decomposition of nitrous oxide by preheating the fuel gas.

The concentration of the nitrous oxide contained in the fuel gas, not limited in particular, for example, may be adjusted in the range of 1 to 100%, or in in the range of more than 50% to 100% when it is necessary to obtain more energy, or in in the range of more than 70% and 100%. Further, it is possible to adjust a decomposition reaction speed of the nitrous oxide by adjusting the concentration of nitrous oxide as described above.

Further, in the present invention, by adjusting the concentration of nitrous oxide as described above, the decomposition-gas may be used as a respiratory gas. Specifically, since air contains about 80% of nitrogen ($N_2$) and about 20% of oxygen ($O_2$) in volume, for example, the volume ratio (molar ratio) of nitrous oxide ($N_2O$) and nitrogen ($N_2$) contained in the fuel gas may be set to $N_2O:N_2=1:1$. That is, when the concentration of nitrous oxide in the fuel gas is set to 50% by adding nitrogen gas into the fuel gas, the volume ratio (molar ratio) of nitrogen ($N_2$) and oxygen ($O_2$) contained in the decomposition-gas becomes the $N_2:O_2=4:1$ after the nitrous oxide contained in the fuel gas is decomposed to oxygen and the nitrogen finally, because that 1 mole of the nitrous oxide is decomposed into 0.5 mol of oxygen and 1 mol of nitrogen. It is possible to use the decomposition-gas as a respiratory gas because that the composition ratio of nitrogen ($N_2$) and oxygen ($O_2$) contained in the decomposition-gas is close to air.

Specifically, when the decomposition-gas is used as a breathing-gas it is preferable that the oxygen concentration is in the range of 18-24%, and in such a case, it is preferable that the concentration of the nitrous oxide contained in the fuel gas is in the range of about 44-63%.

Further, in the present invention, it is possible to use a fuel gas containing nitrous oxide having a concentration of nitrous oxide of less than 44%. That is, the fuel gas with low concentration of nitrous oxide may be used. In this case, the energy(energy density) generated by the decomposition of the nitrous oxide contained in the fuel is low, however it is possible to suppress the deterioration (such as oxidation and thermal fatigue) of the members which is exposed to high temperature and high pressure by the decomposition-gas, such as the decomposition reactor 22 and the catalyst 21, because of the gentle decomposition reaction of nitrous oxide contained in the fuel gas. That is, in the present invention, the concentration of the nitrous oxide contained in the fuel gas may be adjusted in consideration of oxidation resistance and heat resistance of each materials of units such as the decomposition reactor 22 or the catalyst 21 as described above.

On the other hand, in the present invention, it is possible to use a fuel gas containing nitrous oxide having concentration of more than 63%. That is, a fuel gas having a high concentration of nitrous oxide may be used. In this case, it is possible to increase an output of the decomposition-gas turbine 11 and the decomposition-gas boiler 1, by increasing the energy (energy density) generated by the decomposition of the nitrous oxide contained in the fuel gas.

In particular, in the present invention, it is possible to continuously decompose nitrous oxide by using the catalyst 21 even using a fuel gas containing nitrous oxide having a concentration of nitrous oxide of 100%. In the present invention, not only the nitrous oxide having a high purity (for example, 99.9% (3N) to 99.999% (5N)) but also the nitrous oxide having a lower purity than the above-mentioned one (for example, less than 97% purity) may be used in consideration of manufacturing cost.

The method of adjusting concentration of nitrous oxide with nitrogen gas or the like described above may use a method of adding nitrogen gas or the like in the fuel gas before decomposition of nitrous oxide, or a method of adding nitrogen gas in the fuel gas after decomposition of nitrous oxide. Further, it is possible to use a fuel gas in which the concentration of nitrous oxide is adjusted in advance.

The components other than nitrous oxide contained in the fuel gas, in addition to nitrogen or the like which is added for adjusting the concentration of nitrous oxide as described above, may be unreaction materials, by-products, air, or unavoidable impurities which are mixed in the production of nitrous oxide, which will be described later Further, in the present invention, an oximeter (oxygen measuring unit) may be provided for measuring the oxygen concentration of the decomposition-gas. In this case, it is possible to control the temperature of the decomposition-gas as described above with high accuracy based on the measurement result, by measuring the concentration of oxygen contained in the decomposition-gas.

The space velocity (SV) of introducing the fuel gas into the decomposition reactor 22 may be set to an optimum value according to the design. For example, it is possible to set the space velocity in the range of 10 to 140,000 $hr^{-1}$, and it is preferable to set it in the range of 100 to 10,000 $hr^{-1}$.

The nitrous oxide decomposition catalyst according to the "Japanese Unexamined Patent Application Publication No. 2002-153734." will be explained as follows.

The concentration of nitrous oxide contained in an exhaust gas discharged from factories or incineration facilities is 10% or less. On the other hand, the waste anesthetic gas is somewhat diluted with compressed air by the waste anesthetic gas removing apparatus, nevertheless, the concentration of nitrous oxide contained in a waste anesthetic gas discharged from an operating room is very high and 70% or less. The catalyst for decomposing nitrous oxide of the present invention is a catalyst which can be used in the decomposition of nitrous oxide having from low to high concentration.

The catalyst for decomposing nitrous oxide of the present invention is advantageous in that the decomposition can be performed at a relatively low temperature, the deterioration in activity hardly occurs even when moisture is present together with the catalyst, the amount of NO generated can be controlled to a value lower than the allowable concentration, and the amount of NO generated can be reduced to a value from about 1/10 to 1/100 of that when using conventional decomposition catalysts.

The catalyst for decomposing nitrous oxide of the present invention can be at least one catalyst selected from the following catalysts (1) to (3) containing three kinds of metals, namely, aluminum, magnesium and rhodium, as essential components: (1) a catalyst comprising a carrier having supported thereon aluminum, magnesium and rhodium, (2) a catalyst including an alumina carrier having supported thereon magnesium and rhodium, and (3) a catalyst including a carrier having supported thereon rhodium, the carrier including a spinel crystalline composite oxide formed by magnesium and at least a part of aluminum, and the following catalysts (4) to (6) containing two kinds of metals, namely, aluminum and rhodium, and at least one metal selected from the group consisting of zinc, iron, manganese and nickel, as essential components: (4) a catalyst including a carrier having supported thereon aluminum, rhodium and at least one metal selected from the group consisting of zinc, iron, manganese and nickel, (5) a catalyst including an alumina carrier having supported thereon rhodium and at least one metal selected from the group consisting of zinc, iron, manganese and nickel, and (6) a catalyst including a carrier having supported thereon rhodium, the carrier including a spinel crystalline composite oxide formed by at least a part of aluminum and the at least one metal selected from the group consisting of zinc, iron, manganese and nickel.

For the carrier used in the catalyst (1), a carrier selected from the group consisting of alumina, silica, zirconia, ceria, titania and tin oxide may be used and for the carrier used in the catalyst (4), a carrier selected from the group consisting of alumina, zirconia, ceria, titanium and tin oxide may be used. In each case, the carrier which may be used has a surface area of approximately from 30 to 300 $m^2/g$. The shape thereof is not particularly limited; however, according to the reactor or reaction form, an appropriate shape can be selected, such as particle, powder and honeycomb.

In the catalyst (1), the aluminum and magnesium supported on the carrier are preferably contained such that aluminum is in an atomic ratio of 2 or more to magnesium. The magnesium is preferably contained, in terms of the metal atom, in an amount of 0.1 to 20.0% by mass based on the catalyst as a whole.

At least a part of aluminum preferably forms a spinel crystalline composite oxide with magnesium. The spinel crystalline composite oxide can be produced, for example, by calcining a carrier having supported thereon aluminum and magnesium. The spinel structure is a structure observed in oxides having a chemical formula of $XY_2O_4$ and belongs to a cubic system. Al and Mg are known to form a spinel structure of $MgAl_2O_4$. Although the reasons are not clearly known, it is presumed that in the catalyst for decomposing nitrous oxide of the present invention, at least a part of aluminum forms a spinel crystalline composite oxide with magnesium and by virtue of this structure, the ability of decomposing nitrous oxide can be improved and at the same time, the effect of reducing the amount of $NO_x$ generated can be brought out.

In the catalyst (4), the aluminum and at least one metal selected from the group consisting of zinc, iron, manganese and nickel, supported on the carrier are preferably contained such that aluminum is in an atomic ratio of 2 or more to the at least one metal selected from the group consisting of zinc, iron, manganese and nickel. Furthermore, the at least one metal selected from the group consisting of zinc, iron, manganese and nickel is preferably contained in an amount of, in terms of the metal atom, from 0.1 to 40.0% by mass based on the catalyst as a whole.

At least a part of aluminum preferably forms a spinel crystalline composite oxide with the at least one metal selected from the group consisting of zinc, iron, manganese and nickel. The spinel crystalline composite oxide can be produced by calcining a carrier having supported thereon aluminum and at least one metal selected from the group consisting of zinc, iron, manganese and nickel. Aluminum is known to form a spinel structure of $MAl_2O_4$ (M=Zn, Fe, Mn, Ni) with zinc, iron, manganese or nickel. Although the reasons are not clearly known, it is presumed that in the catalyst for decomposing nitrous oxide of the present invention, at least a part of aluminum forms a spinel crystalline composite oxide with at least one metal selected from the group consisting of zinc, iron, manganese and nickel and by virtue of this structure, the ability of decomposing nitrous oxide can be improved and at the same time, the effect of reducing the amount of NO generated can be brought out.

The carrier for use in the catalyst (2) is alumina and the alumina is not particularly limited, however, the alumina which may be used has a surface area of approximately 50 to 300 $m^2/g$. The magnesium supported on alumina is preferably contained such that aluminum is in an atomic ratio of 2 or more to magnesium. Also, the magnesium is preferably contained, in terms of the metal atom, in an amount of 0.1 to 20.0% by mass based on the catalyst as a whole. Furthermore, at least a part of aluminum preferably forms a spinel crystalline composite oxide with magnesium.

The carrier for use in the catalyst (5) is alumina and the alumina is not particularly limited, however, the alumina which may be used has a surface area of approximately 50 to 300 m²/g. The at least one metal selected from the group consisting of zinc, iron, manganese and nickel, which is supported on alumina, is preferably contained such that aluminum is in an atomic ratio of 2 or more to the at least one metal selected from the group consisting of zinc, iron, manganese and nickel. Also, the at least one metal selected from the group consisting of zinc, iron, manganese and nickel is preferably contained, in terms of the metal atom, in an amount of 0.1 to 40.0% by mass based on the catalyst as a whole. Furthermore, at least a part of aluminum preferably forms a spinel crystalline composite oxide with the at least one metal selected from the group consisting of zinc, iron, manganese and nickel.

The catalyst (3) uses a carrier in which a spinel crystalline composite oxide is formed by magnesium and at least a part of aluminum. In the catalyst (3), aluminum and magnesium are preferably contained such that aluminum is in an atomic ratio of 2 or more to magnesium. Also, the magnesium is preferably contained, in terms of the metal atom, in an amount of 0.1 to 20.0% by mass based on the catalyst as a whole.

The catalyst (6) uses a carrier in which a spinel crystalline composite oxide is formed by at least a part of aluminum and the at least one metal selected from the group consisting of zinc, iron, manganese and nickel. In the catalyst (6), aluminum and the at least one metal selected from the group consisting of zinc, iron, manganese and nickel are preferably contained such that aluminum is in an atomic ratio of 2 or more to the at least one metal selected from the group consisting of zinc, iron, manganese and nickel. Also, the at least one metal selected from the group consisting of zinc, iron, manganese and nickel is preferably contained, in terms of the metal atom, in an amount of 0.1 to 40.0% by mass based on the catalyst as a whole.

In any of the catalysts (1) to (6) for decomposing nitrous oxide of the present invention, rhodium is preferably contained in the catalyst, in terms of the metal atom, in an amount of 0.05 to 10% by mass, more preferably from 0.1 to 6.0% by mass, based on the catalyst as a whole. By increasing the amount of rhodium supported, the catalyst activity at low temperatures may be improved; however, loading in excess of 10% by mass is not preferred in view of the catalyst cost and if the amount supported is less than 0.05% by mass, sufficiently high activity of decomposing nitrous oxide cannot be obtained.

The process for producing the catalyst for decomposing nitrous oxide of the present invention is described below.

The catalyst for decomposing nitrous oxide of the present invention can be produced by various methods such as (1) impregnation method, (2) co-precipitation method and (3) kneading method. The process for producing the catalyst for decomposing nitrous oxide of the present invention is described below with reference to these three methods.

(1) Production Process of Catalyst Using Impregnation Method

By using the impregnation method, the above-described catalysts (1) to (6) can be produced. In the case of producing the catalyst (1), a carrier selected from the group consisting of alumina, silica, zirconia, ceria, titania and tin oxide is impregnated with inorganic acid salts (e.g., nitrate, hydrochloride, sulfate) or organic acid salts (e.g., oxalate, acetate) of aluminum and magnesium. In the case of producing the catalyst (4), a carrier selected from the group consisting of alumina, zirconia, ceria, titania and tin oxide is impregnated with inorganic acid salts (e.g., nitrate, hydrochloride, sulfate) or organic acid salts (e.g., oxalate, acetate) of alumina and at least one metal selected from the group consisting of zinc, iron, manganese and nickel. In the case of producing the catalyst (2), an alumina carrier is impregnated with an inorganic acid salt (e.g., nitrate, hydrochloride, sulfate) or organic acid salt (e.g., oxalate, acetate) of magnesium. In the case of producing the catalyst (5), an alumina carrier is impregnated with an inorganic acid salt (e.g., nitrate, hydrochloride, sulfate) or organic acid salt (e.g., oxalate, acetate) of at least one metal selected from the group consisting of zinc, iron, manganese and nickel. The aluminum salt, the magnesium salt and the salt of at least one metal selected from the group consisting of zinc, iron, manganese and nickel each is preferably nitrate.

In the case of producing the catalyst (1), aluminum and magnesium are preferably supported on a carrier such that aluminum is in an atomic ratio of 2 or more to magnesium and also such that the amount of magnesium supported is from 0.1 to 20.0% by mass based on the catalyst as a whole. In the case of producing the catalyst (4), aluminum and the at least one metal selected from the group consisting of zinc, iron, manganese and nickel are preferably supported on a carrier such that aluminum is in an atomic ratio of 2 or more to the at least one metal selected from the group consisting of zinc, iron, manganese and nickel and also such that the amount supported of the at least one metal selected from the group consisting of zinc, iron, manganese and nickel is from 0.1 to 40.0% by mass based on the catalyst as a whole. In the case of producing the catalyst (2), magnesium is preferably supported such that magnesium is in an atomic ratio of ½ or less to aluminum and also such that the amount of magnesium supported is from 0.1 to 20.0% by mass based on the catalyst as a whole. In the case of producing the catalyst (5), the at least one metal selected from the group consisting of zinc, iron, manganese and nickel is preferably supported on a carrier such that the at least one metal selected from the group consisting of zinc, iron, manganese and nickel is in an atomic ratio of ½ or less to aluminum and also such that the amount supported of the at least one metal selected from the group consisting of zinc, iron, manganese and nickel is from 0.1 to 40.0% by mass based on the catalyst as a whole.

After the objective salt is supported on a carrier, the carrier is dried and calcined, as a result, a carrier including aluminum and magnesium with at least a part of aluminum forming a spinel crystalline composite oxide with magnesium can be obtained. This carrier is used as the carrier of the catalyst (1). In the same manner, a carrier including aluminum and at least one metal selected from the group consisting of zinc, iron, manganese and nickel with at least a part of aluminum forming a spinel crystalline composite oxide with the at least one metal selected from the group consisting of zinc, iron, manganese and nickel. This carrier is used as the carrier of the catalyst (4). For example, the temperature at the drying after aluminum salt and magnesium salt are impregnated in the catalyst (1), and the temperature at the drying after aluminum salt and a salt of at least one metal selected from the group consisting of zinc, iron, manganese and nickel are impregnated are not particularly limited but each temperature is preferably in the range from 80 to 150° C., more preferably from 100 to 130° C. Also, the drying atmosphere is not particularly limited and nitrogen or air may be used. The drying time is not particularly limited but, in the case of using the impregnation method, the drying time is usually from about 2 to 4 hours.

The calcination treatment of the carrier after impregnation and then drying can be performed at a temperature in the range from 400 to 900° C., preferably from 500 to 700° C. If the calcination temperature is less than 400° C., the crystallization does not proceed sufficiently, whereas if it exceeds 900° C., reduction in the specific surface area of the carrier is disadvantageously incurred. The calcination time is not particularly limited but is suitably on the order of 1 to 10 hours, preferably from 2 to 4 hours. The calcination temperature may be changed stepwise. A calcination treatment over a long period of time is economically disadvantageous because the effect is saturated, whereas a calcination treatment in a short time may sometimes fail in yielding a sufficiently high effect. The calcination can be performed using a kiln or a muffle furnace and at this time, the flowing gas used may be either nitrogen or air.

On the carrier obtained by the above-described calcination, a rhodium salt is loaded. The rhodium salt which may be used includes an inorganic acid salt (e.g., nitrate, hydrochloride, sulfate) or an organic acid salt (e.g., oxalate, acetate). Among these, nitrate is preferred. In the step of loading a rhodium salt, for example, when a catalyst containing three kinds of metals, namely, aluminum, magnesium and rhodium, as essential components is produced, the rhodium salt is preferably supported on a carrier obtained by the above-described method, in which at least a part of aluminum forms a spinel crystalline composite oxide with magnesium. However, the step of loading rhodium salt may be performed simultaneously with the step of impregnating and loading aluminum and magnesium on a carrier or with the step of impregnating and loading magnesium on an alumina carrier. The amount of rhodium supported is preferably controlled to be 0.05 to 10% by mass based on the catalyst as a whole.

Similarly, in the step of loading a rhodium salt, for example, when a catalyst containing two kinds of metals, namely, aluminum and rhodium, and at least one metal selected from the group consisting of zinc, iron, manganese and nickel, as essential components is produced, the rhodium salt is preferably supported on a carrier obtained by the above-described method, in which at least a part of aluminum forms a spinel crystalline composite oxide together with the at least one metal selected from the group consisting of zinc, iron, manganese and nickel. However, the step of loading rhodium salt may be performed simultaneously with the step of impregnating and loading aluminum and at least one metal selected from the group consisting of zinc, iron, manganese and nickel on a carrier or with the step of impregnating and loading at least one metal selected from the group consisting of zinc, iron, manganese and nickel on an alumina carrier. The amount of rhodium supported is preferably controlled to 0.05 to 10% by mass based on the catalyst as a whole. Here, when a spinel crystalline composite oxide is previously formed by magnesium and at least a part of aluminum in the carrier used, the catalyst (3) can be produced by loading a rhodium salt on this carrier in the same manner as above. Furthermore, when a spinel crystalline composite oxide is previously formed by at least a part of aluminum and at least one metal selected from the group consisting of zinc, iron, manganese and nickel in the carrier used, the catalyst (6) can be produced by loading a rhodium salt on this carrier.

Subsequently, this catalyst precursor having supported thereon rhodium is dried under the same drying conditions as above and the dried catalyst precursor is calcined. The calcination temperature here is preferably from 200 to 500° C., more preferably from 300 to 400° C. The catalyst obtained after the calcination may be used as a catalyst for decomposing nitrous oxide but is preferably subjected to a reduction treatment. By performing the reduction treatment, a rhodium-containing catalyst having higher activity can be obtained. The reduction treatment may be performed by, for example, (1) a method where the catalyst precursor is reduced with hydrazine, again dried and then calcined or (2) a method of performing hydrogen reduction. Of these, the method of performing hydrogen reduction is preferred. In the case of using the hydrogen reduction method, the reduction temperature is preferably from 200 to 500° C., more preferably from 300 to 400° C. The reduction time is not particularly limited but is suitably on the order of 1 to 10 hours, preferably on the order of 2 to 4 hours. The reduction treatment may be performed without passing through the calcination treatment and also in this case, a rhodium-containing catalyst having high activity can be obtained. In the case of producing a catalyst by performing the reduction treatment without passing through calcination, a hydrogen reduction method at a temperature of 200 to 500° C. is preferred.

(2) Production Process of Catalyst Using Co-Precipitation Method

By using the co-precipitation method, the catalysts (3) and (6) can be produced. According to the process for producing the catalyst (3) using the co-precipitation method, for example, aqueous ammonia is added dropwise to an aqueous solution containing nitrates of aluminum and magnesium to cause neutralization precipitation, the precipitate is, if desired, ripened by allowing it to stand, then filtrated and washed with water, and after confirming thorough washing by the electric conductivity of the cleaning water, dried for about 10 to 12 hours under the same condition as in the impregnation method. The obtained dry material is pulverized and graded to obtain the shaped material. The shaped material is calcined in an atmosphere of nitrogen or air under the same conditions as in the impregnation method, as a result, a carrier in which a spinel crystalline composite oxide is formed by at least a part of aluminum together with magnesium, is obtained.

The amounts of aluminum and magnesium are preferably controlled such that aluminum is in an atomic ratio of 2 or more to magnesium, and the magnesium is preferably contained, in terms of metal atom, in an amount of 0.1 to 20.0% by mass based on the catalyst as a whole. On the thus-obtained carrier in which at least a part of aluminum forms a spinel crystalline composite oxide together with magnesium, a rhodium salt is loaded. The method therefor, the amount supported and the treatment subsequent thereto may be the same as in the above-described impregnation method.

According to the process for producing the catalyst (6) using the co-precipitation method, for example, aqueous ammonia is added dropwise to an aqueous solution containing a nitrate of aluminum and a nitrate of at least one metal selected from the group consisting of zinc, iron, manganese and nickel to cause neutralization precipitation, the precipitate is, if desired, ripened by allowing it to stand, then filtrated and washed with water, and after confirming thorough washing by the electric conductivity of the cleaning water, dried for about 10 to 12 hours under the same condition as in the impregnation method. The obtained dry material is pulverized and graded to obtain the shaped material. The shaped material is calcined in an atmosphere of nitrogen or air under the same conditions as in the impregnation method, as a result, a carrier in which a spinel crystalline composite oxide is formed by at least a part of aluminum and the at least one metal selected from the group consisting of zinc, iron, manganese and nickel, is obtained.

The amounts of aluminum and the at least one metal selected from the group consisting of zinc, iron, manganese and nickel are preferably controlled such that aluminum is in an atomic ratio of 2 or more to the at least one metal selected from the group consisting of zinc, iron, manganese and nickel. The at least one metal selected from the group consisting of zinc, iron, manganese and nickel is preferably contained, in terms of metal atom, in an amount of 0.1 to 40.0% by mass based on the catalyst as a whole. On the thus-obtained carrier in which at least a part of aluminum forms a spinel crystalline composite oxide together with the at least one metal selected from the group consisting of zinc, iron, manganese and nickel, a rhodium salt is loaded. The method therefor, the amount supported and the treatment subsequent thereto may be the same as in the above-described impregnation method.

(3) Production Process of Catalyst Using Kneading Method

By using a kneading method, the catalysts (3) and (6) can be produced.

According to the process for producing the catalyst (3) using the kneading method, for example, alumina and/or aluminum hydroxide are mechanically mixed with magnesium oxide, magnesium hydroxide and/or magnesium salt while adding, for example, water, if desired, and the obtained mixture is dried and calcined under the same conditions as in the impregnation method, whereby the above-described spinel crystalline composite oxide can be obtained. The amounts of aluminum and magnesium are preferably controlled such that aluminum is in an atomic ratio of 2 or more to magnesium, and the magnesium is preferably contained, in terms of metal atom, in an amount of 0.1 to 20.0% by mass based on the catalyst as a whole.

On the thus-obtained calcined product in which at least a part of aluminum forms a spinel crystalline composite oxide together with magnesium, a rhodium salt is loaded. The method therefor, the amount supported and the treatment subsequent thereto may be the same as in the impregnation method described above. The rhodium salt may also be added in advance at the time when alumina and the like are mechanically mixed.

According to the process for producing the catalyst (6) using the kneading method, for example, alumina and/or aluminum hydroxide are mechanically mixed with an oxide, hydroxide and/or salt of at least one metal selected from the group consisting of zinc, iron, manganese and nickel while adding, for example, water, if desired, and the obtained mixture is dried and calcined under the same conditions as in the impregnation method, whereby the above-described spinel crystalline composite oxide can be obtained. The amounts of aluminum and the at least one metal selected from the group consisting of zinc, iron, manganese and nickel are preferably controlled such that aluminum is in an atomic ratio of 2 or more to the at least one metal selected from the group consisting of zinc, iron, manganese and nickel, and the at least one metal selected from the group consisting of zinc, iron, manganese and nickel is preferably contained, in terms of metal atom, in an amount of 0.1 to 40.0% by mass based on the catalyst as a whole.

On the thus-obtained calcined product in which at least a part of aluminum forms a spinel crystalline composite oxide together with the at least one metal selected from the group consisting of zinc, iron, manganese and nickel, a rhodium salt is loaded. The method therefor, the amount supported and the treatment subsequent thereto may be the same as in the impregnation method described above. The rhodium salt may also be added in advance at the time when alumina and the like are mechanically mixed.

The method for decomposing nitrous oxide using the decomposition catalyst of the present invention is described below.

In the case of performing the decomposition reaction of nitrous oxide using the decomposition catalyst of the present invention, the reaction may be performed by contacting the decomposition catalyst of the present invention with nitrous oxide in a gas phase at a temperature of 200 to 600° C., preferably from 300 to 500° C., more preferably from 350 to 450° C. If the temperature is less than 200° C., the decomposition of nitrous oxide does not proceed satisfactorily, whereas if it exceeds 600° C., the catalyst life is readily shortened and this is not preferred. The catalyst bed system is not particularly limited but in general, a fixed bed is preferably used.

Conventional catalysts using palladium are affected by moisture and decrease in the catalytic activity and even if the moisture is removed, the activity cannot be recovered. On the other hand, the decomposition catalyst of the present invention has properties such that the activity may decrease slightly due to the presence of moisture in a concentration of 1 to 3%, but when the moisture is removed, the original activity can be recovered.

The gas composition which can be decomposed using the decomposition catalyst of the present invention is described below. The concentration of nitrous oxide contained in an exhaust gas discharged from factories or incineration facilities is 10% or less and by using the decomposition catalyst of the present invention, nitrous oxide contained in the exhaust gas at a concentration of 1 ppm to 10% can be decomposed. The concentration of nitrous oxide discharged from an operating room by a waste anesthetic gas removing apparatus is very high and from 3 to 70%. In the case of decomposing nitrous oxide contained in an anesthetic gas, the reaction proceeds usually in the presence of oxygen in a concentration of 13 to 20% and the reaction conditions are severe to the decomposition catalyst. As long as heat can be gradually removed and the temperature can be satisfactorily controlled, the concentration of nitrous oxide subjected to the decomposition treatment may not be particularly limited, however, since the decomposition reaction of nitrous oxide into nitrogen and oxygen is an exothermic reaction, the concentration of nitrous oxide is suitably from 3 to 50%, preferably from 3 to 25%, and more preferably from 3 to 10%.

The space velocity (SV) as the amount of gas fed per unit catalyst is suitably from 10 to 20,000 $Hr^{-1}$, preferably from 100 to 10,000 $Hr^{-1}$.

Following, I will explain about the nitrous oxide decomposition catalyst according to the "Japanese Unexamined Patent Application Publication No. 2002-253967."

The catalyst for decomposing nitrous oxide of the present invention is a catalyst capable of decomposing nitrous oxide having a concentration over the range from low to high. The nitrous oxide contained in a waste anesthetic gas discharged from an operating room is somewhat diluted with compressed air. But it still has a very high concentration of 70% or less. However, the catalyst for decomposing nitrous oxide of the present invention can cope with this high concentration.

Also, the catalyst for decomposing nitrous oxide of the present invention can recover the activity through activation and regeneration even when deteriorated due to a volatile anesthetic contained in a waste anesthetic gas. Moreover, the catalyst for decomposing nitrous oxide of the present invention can decompose nitrous oxide at a relatively low temperature, is less deteriorated in the activity due to moisture even when moisture is present together, can control the amount of NO generated to the allowable concentration or less and can reduce the amount of NO generated to the level of about 1/10 to 1/100 as compared with conventional decomposition catalysts.

The catalyst for decomposing nitrous oxide of the present invention is characterized by containing as an essential component at least one noble metal selected from the group consisting of rhodium, ruthenium and palladium, and any one of the following catalysts (1) to (3) may be used.

(1) A catalyst obtained by loading at least one noble metal selected from the group (a) consisting of rhodium, ruthenium and palladium on a carrier selected from silica or silica alumina.

(2) A catalyst obtained by loading at least one noble metal selected from the group (a) consisting of rhodium, ruthenium and palladium, (b) aluminum and at least one metal selected from the group (c) consisting of zinc, iron and manganese on a silica carrier.

(3) A catalyst obtained by loading at least one noble metal selected from the group (a) consisting of rhodium, ruthenium and palladium and at least one metal selected from the group (d) consisting of magnesium, zinc, iron and manganese on a silica alumina carrier.

The carrier for use in the catalyst (1) is silica or silica alumina. A carrier having a surface area of approximately from 50 to 300 m$^2$/g may be used, but it is not particularly limited to this range. The shape thereof is not particularly limited, according to the reactor or reaction method, a suitable shape may be selected, such as particle, powder or honeycomb.

The carrier for use in the catalyst (2) is silica. A carrier having a surface area of approximately from 50 to 300 m$^2$/g may be used, but it is not particularly limited to this range. The shape thereof is also not particularly limited. According to the reactor or reaction method, a suitable shape may be selected, such as particle, powder or honeycomb.

Among the components supported on the silica carrier, at least one metal selected from the group (c) consisting of zinc, iron and manganese is preferably contained in an amount of 0.1 to 5.0% by mass, more preferably from 0.2 to 1.0% by mass, based on the entire mass of the catalyst. Even if the metal selected from the group (c) is contained in an amount of 5.0% by mass or more based on the entire mass of the catalyst, the effect is sometimes saturated.

The aluminum supported on the silica carrier is preferably contained in an atomic ratio of at least 2 or more to at least one metal selected from the group (c) consisting of zinc, iron and manganese. At least a part of aluminum preferably forms a spinel crystalline composite oxide with at least one metal selected from the group (c) and the spinel crystalline composite oxide can be produced by calcining the carrier having supported thereon, for example, aluminum and at least one metal selected from the group consisting of zinc, iron and manganese.

The spinel structure is a structure observed in oxides having a chemical formula of XY$_2$O$_4$ and belongs to a cubic system. With Zn, Fe or Mn, Al is known to form a spinel structure of ZnAl$_2$O$_4$, FeAl$_2$O$_4$ or MnAl$_2$O$_4$, respectively. Although the reasons are not clearly known, it is considered that at least a part of aluminum in the catalyst for decomposing nitrous oxide of the present invention forms a spinel crystalline composite oxide with a part or the whole of at least one metal selected from the group (c), whereby effects of enhancing the capability of decomposing nitrous oxide and at the same time, reducing the amount of NO$_x$ generated can be brought out.

The carrier for use in the catalyst (3) is silica alumina. A carrier having a surface area of approximately from 50 to 300 m$^2$/g may be used, but it is not particularly limited to this range. At least one metal selected from the group (d) consisting of magnesium, zinc, iron and manganese, which is supported on the silica alumina carrier, is preferably contained in an amount of 0.1 to 5.0% by mass, more preferably from 0.2 to 1.0% by mass, based on the entire mass of the catalyst. Even if the metal selected from the group (d) is contained in an amount of 5.0% by mass or more based on the entire mass of the catalyst, the effect may be saturated.

The aluminum contained in the catalyst (3) is preferably contained in an atomic ratio of 2 or more to at least one metal selected from the group (d) consisting of magnesium, zinc, iron and manganese. Furthermore, at least a part of aluminum preferably forms a spinel crystalline composite oxide with at least one metal selected from the group (d). The spinel crystalline composite oxide can be produced by loading at least one metal selected from the group (d) on the silica alumina carrier and calcining the carrier.

Whichever catalyst (1), (2) or (3) is used, at least one noble metal selected from the group (a) consisting of rhodium, ruthenium and palladium, which is contained in the catalyst for decomposing nitrous oxide of the present invention, is preferably contained in an amount of 0.05 to 10% by mass, more preferably from 0.1 to 6.0% by mass, based on the entire mass of the catalyst. The catalytic activity at low temperatures may be improved by increasing the amount supported of at least one noble metal selected from the group (a); however, the amount supported in excess of 10% by mass is not preferred in view of the catalyst cost. On the other hand, if the amount supported is less than 0.05% by mass, the catalyst may fail to have a sufficiently high activity of decomposing nitrous oxide.

The process for producing the catalyst for decomposing nitrous oxide of the present invention is described below.

The catalyst for decomposing nitrous oxide of the present invention can be produced by various methods, for example, by the method such as (1) impregnation, (2) coprecipitation and (3) kneading. The process for producing the catalyst (2) using the impregnation method is described below, however, needless to say, the present invention is not limited thereto.

The process for producing the catalyst (2) using the impregnation method can include the following three steps:

(1) a step of loading (b) aluminum and at least one metal selected from the group (c) consisting of zinc, iron and manganese on a silica carrier;

(2) a step of calcining the carrier obtained in the step (1) at 400 to 900° C.; and (3) a step of loading at least one noble metal selected from the group (a) consisting of rhodium, ruthenium and palladium on the calcined carrier obtained in the step (2).

In the step (1), a silica carrier is impregnated with an inorganic acid salt of aluminum and an inorganic acid salt (e.g., nitrate, hydrochloride, sulfate) or organic acid salt (e.g., oxalate, acetate) of at least one metal selected from the group (c) consisting of zinc, iron and manganese. The salt of aluminum and the salt of at least one metal selected from the group (c) are each preferably nitrate.

Aluminum and at least one metal selected from the group (c) are preferably supported on a carrier such that aluminum is in an atomic ratio of 2 or more to at least one metal selected from the group (c) and also such that the amount supported of at least one metal selected from the group (c) is from 0.1 to 5.0% by mass based on the entire mass of the catalyst.

After performing the step (1), the carrier is preferably dried and by further performing the calcination step (2), a carrier-containing aluminum and at least one metal selected from the group (c) can be obtained, where at least a part of aluminum supported forms a spinel crystalline composite oxide with at least one metal selected from the group (c) consisting of zinc, iron and manganese. The temperature at the drying after the step (1) is not particularly limited but the temperature is preferably in the range from 80 to 150° C., and more preferably from 100 to 130° C. Also, the drying atmosphere is not particularly limited but air is preferably used. The drying time is not particularly limited but, in the case of using the impregnation method, the drying time is usually from about 2 to 4 hours.

The calcination step (2) can be performed at a temperature in the range from 400 to 900° C., preferably from 500 to 700° C. If the calcination temperature is less than 400° C., the crystallization does not proceed sufficiently, whereas if it exceeds 900° C., the specific surface area of the carrier is disadvantageously liable to decrease. The calcination time is not particularly limited but is suitably on the order of 1 to 10 hours, and is preferably on the order of 2 to 4 hours. The calcination temperature may be changed stepwise. A long-term calcination operation is economically disadvantageous because the effect is sometimes saturated, whereas a short-time calcination operation cannot yield a sufficiently high effect. The calcination can be performed using a kiln or a muffle furnace and at this time, the flowing gas which may be used may be either nitrogen or air.

Then, the step (3) of loading a salt of at least one noble metal selected from the group (a) consisting of rhodium, ruthenium and palladium on the carrier obtained in the step (2) where at least a part of aluminum forms a spinel crystalline composite oxide with at least one metal selected from the group (c) consisting of zinc, iron and manganese, is performed. The salt of at least one noble metal selected from the group (a) is an inorganic acid salt (e.g., nitrate, hydrochloride, sulfate) or an organic acid salt (e.g., oxalate, acetate), and is preferably nitrate as an inorganic acid salt.

The step (3) is preferably performed on a carrier obtained in the step (2) where at least a part of aluminum forms a spinel crystalline composite oxide with at least one metal selected from the group (c), however, the step (3) may also be performed simultaneously with the step (1). In this case, it is preferred to perform the step (1) and the step (3) simultaneously and then perform the step (2), so that at least a part of aluminum can form a spinel crystalline composite oxide with at least one metal selected from the group (c). In any case, the amount supported of at least one noble metal selected from the group (a) consisting of rhodium, ruthenium and palladium is preferably adjusted to 0.05 to 10% by mass based on the entire mass of the catalyst.

The catalyst precursor after the step (3) is then dried under the same drying conditions as above. The dried catalyst precursor is preferably subjected to a reduction treatment. By performing the reduction treatment, the obtained catalyst containing at least one noble metal selected from the group (a) can have high activity. The reduction treatment may be performed, for example, by (1) a method of reducing the catalyst precursor with hydrazine and again performing drying and then calcination or by (2) a method of performing hydrogen reduction. Among these, the method of performing hydrogen reduction is preferred. In the case of using the hydrogen reduction method, the reduction temperature is preferably from 200 to 500° C., more preferably from 300 to 400° C. The reducing time is not particularly limited but is suitably on the order of 1 to 10 hours, preferably on the order of 2 to 4 hours. The above-described dried catalyst precursor may be calcined in nitrogen or air without passing through the reduction treatment (1) or (2). At this time, the calcination temperature is preferably from 200 to 500° C., and is more preferably from 300 to 400° C.

The method for decomposing nitrous oxide using the above-described catalyst for decomposing nitrous oxide is described below. The method for decomposing nitrous oxide of the present invention includes the following four methods.

The method (1) for decomposing nitrous oxide of the present invention is characterized in that a nitrous oxide-containing gas is contacted with the above-described catalyst at a temperature of 200 to 600° C. The method (2) for decomposing nitrous oxide of the present invention is characterized in that the catalyst is a catalyst including a carrier having supported thereon at least one noble metal selected from the group consisting of rhodium, ruthenium and palladium and the carrier includes silica or silica alumina and in that a nitrous oxide-containing gas is contacted with the catalyst at a temperature of 200 to 600° C., the feed of the nitrous oxide-containing gas is stopped on recognizing the reduction in activity of the catalyst in the decomposition process, the catalyst is activated and regenerated by heating at 500 to 900° C. and then, the feed of the nitrous oxide-containing gas is restarted.

The method (3) for decomposing nitrous oxide of the present invention is characterized in that the catalyst is a catalyst including a silica carrier having supported thereon at least one noble metal selected from the group (a) consisting of rhodium, ruthenium and palladium, (b) aluminum and at least one metal selected from the group (c) consisting of zinc, iron and manganese and in that a nitrous oxide-containing gas is contacted with the catalyst at a temperature of 200 to 600° C., the feed of the nitrous oxide-containing gas is stopped on recognizing the reduction in activity of the catalyst in the decomposition process, the catalyst is activated and regenerated by the heating at 500 to 900° C. and then, the feed of the nitrous oxide-containing gas is restarted.

The method (4) for decomposing nitrous oxide of the present invention is characterized in that the catalyst is a catalyst including a silica alumina carrier having supported thereon at least one noble metal selected from the group (a) consisting of rhodium, ruthenium and palladium and at least one metal selected from the group (d) consisting of magnesium, zinc, iron and manganese and in that a nitrous oxide-containing gas is contacted with the catalyst at 200 to 600° C., the feed of the nitrous oxide-containing gas is stopped on recognizing the reduction in activity of the catalyst in the decomposition process, the catalyst is activated and regenerated by the heating at 500 to 900° C. and then, the feed of the nitrous oxide-containing gas is restarted.

In the method for decomposing nitrous oxide of the present invention, the nitrous oxide-containing gas is suitably contacted with the decomposition catalyst at a temperature of 200 to 600° C., preferably from 300 to 500° C., and more preferably from 350 to 450° C. If the contact temperature is less than 200° C., the decomposition of nitrous oxide may not proceed satisfactorily, whereas if it exceeds 600° C., the catalyst is disadvantageously liable to have a shortened life. The catalyst bed system is not particularly limited and a fixed bed can be preferably used.

As for the composition of the nitrous oxide-containing gas, the concentration of nitrous oxide contained in an exhaust gas discharged from factories or incineration facilities is usually 1,000 ppm or less, however, the concentration of nitrous oxide discharged from an operating room by a waste anesthetic gas-removing apparatus is very high and approximately from 8 to 50%. In the waste anesthetic gas, oxygen is usually present in a concentration of 13 to 20% and therefore, the decomposition catalyst is laid under severe conditions, and preferably heat may be removed. As long as the temperature can be controlled, the concentration of nitrous oxide contacted with the decomposition catalyst is not particularly limited, however, since the reaction of decomposing nitrous oxide into nitrogen and oxygen is an exothermic reaction, the concentration of nitrous oxide is suitably 50% or less, is preferably 25% or less, and is more preferably about 5%. The space velocity indicating the amount of gas fed per unit catalyst is preferably from 10 to 20,000 $Hr^{-1}$, and is more preferably from 100 to 10,000 $Hr^{-1}$.

The nitrous oxide-containing gas sometimes contains a volatile anesthetic; however, the catalyst for decomposing nitrous oxide of the present invention is not easily poisoned by the volatile anesthetic. Moreover, even when the catalyst is poisoned by the volatile anesthetic and reduced in the activity, the catalytic activity can be recovered by using the decomposition method of the present invention, so that the decomposition of nitrous oxide can be performed over a long period of time. Accordingly, when the decrease in activity of the catalyst for decomposing nitrous oxide is recognized, the feed of the nitrous oxide-containing gas is once stopped and after the catalyst is activated and regenerated by performing a calcination treatment, the feed of the nitrous oxide-containing gas can be restarted.

In the calcination treatment for activating and regenerating the catalyst, the decomposition catalyst reduced in the activity can be calcined at temperature of 500 to 900° C., preferably from 600 to 800° C., more preferably from 650 to 750° C. During the calcination treatment, an inert gas such as helium and nitrogen, or air can be flowed into the catalyst layer and oxygen may be contained in the inert gas. Air is preferably used because it is simple and convenient. The calcination treatment time is suitably on the order of from 10 minutes to 12 hours, preferably from 20 minutes to 6 hours, and more preferably from 30 minutes to 2 hours. Among the above-described catalysts where at least one noble metal selected from the group (a) consisting of rhodium, ruthenium and palladium is supported, the catalyst containing ruthenium is less poisoned by the volatile anesthetic and easier to recover the catalytic activity. The activity is liable to lower in the order of rhodium and palladium. Accordingly, at least ruthenium is preferably used as the noble metal component selected from the group (a). After the calcination treatment, a reduction treatment with hydrogen may also be performed.

The catalyst for use in the decomposition method (3) of the present invention preferably contains, out of the components supported on the silica carrier, at least one metal selected from the group (c) consisting of zinc, iron and manganese in an amount of 0.1 to 5.0% by mass, and more preferably in an amount from 0.2 to 1.0% by mass, based on the entire mass of the catalyst. Even if the metal selected from the group (c) is contained in an amount of 5.0% by mass or more based on the entire mass of the catalyst, the effect is sometimes saturated.

The aluminum supported on the silica carrier is preferably contained in an atomic ratio of at least 2 or more to at least one metal selected from the group (c) consisting of zinc, iron and manganese. Furthermore, at least a part of aluminum preferably forms a spinel crystalline composite oxide with at least one metal selected from the group (c) and the spinel crystalline composite oxide can be produced, for example, by calcining the carrier having supported thereon aluminum and at least one metal selected from the group consisting of zinc, iron and manganese.

The catalyst for use in the decomposition method (4) preferably contains at least one metal selected from the group (d) consisting of magnesium, zinc, iron and manganese, which is supported on a silica alumina carrier, in an amount of 0.1 to 5.0% by mass, and more preferably in an amount from 0.2 to 1.0% by mass, based on the entire mass of the catalyst. Even if the metal selected from the group (d) is contained in an amount of 5.0% by mass or more based on the entire mass of the catalyst, the effect is sometimes saturated.

The aluminum is preferably contained in an atomic ratio of at least 2 or more to at least one metal selected from the group (d) consisting of magnesium, zinc, iron and manganese. Furthermore, at least a part of aluminum preferably forms a spinel crystalline composite oxide with at least one metal selected from the group (d). The spinel crystalline composite oxide can be produced by loading at least one metal selected from the group (d) on the silica alumina carrier and calcining the carrier.

Whichever decomposition method (1), (2), (3) or (4) is used, at least one noble metal selected from the group (a) consisting of rhodium, ruthenium and palladium, which is contained in the catalyst used in the method for decomposing nitrous oxide of the present invention, is preferably contained in an amount of 0.05 to 10% by mass, and more preferably from 0.1 to 6.0% by mass, based on the entire mass of the catalyst. By increasing the supported amount of at least one noble metal selected from the group (a), the catalytic activity at low temperatures may be improved; however, the amount supported in excess of 10% by mass or more is not preferred in view of the catalyst cost, and if the amount supported is less than 0.05% by mass, the catalyst may fail in having a sufficiently high activity of decomposing nitrous oxide.

EXAMPLES

Hereinafter, the effects of the invention will be specifically described using Examples. In addition, the invention is not limited to these Examples. The present invention can be appropriately modified within the scope without changing the gist.

In this Example, a decomposition reactor (nickel reaction tube, ½ inch diameter, and 57 mm height of catalyst layer) which was filled with 2.12 g (4 ml) of a nitrous oxide decomposition catalyst (Showa Denko Co., Ltd) was heated by using a heater (ceramics electric tube furnace, 100V, 500 W) at about 350° C., and then nitrous oxide gas ($N_2O$) having a concentration of 100% was supplied at down-flow into the decomposition reactor, as a result, decomposition of nitrous oxide was carried out, wherein the nitrous oxide decomposition catalyst is a granular catalyst having 3.2 mm of average particle size and containing an alumina carrier (Nikki Universal Co., Ltd.), and 1% zinc and 5% rhodium supported on the carrier.

When supplying nitrous oxide gas to the decomposition reactor, the flow rate is adjusted between 20 to 2422 cc/min by a flow control valve. Then, while the linear velocity (LV: Linear Velocity) [m/min] and the space velocity (SV Space Velocity) [$hr^{-1}$] of the nitrous oxide gas to be supplied to the decomposition reactor were measured, the maximum value of exothermic temperature (temperature of the catalyst) [° C.] in the reaction vessel after the decomposition of nitric oxide gas was also measured by the temperature measuring device. Further, the amount of NO generated after the decomposing nitrous oxide gas [ppm] was measured, and then decomposition ratio of the nitrous oxide gas [%] was determined. The results of the measurements were summarized in Table 1. In addition, from the measurement results shown in Table 1, a graph summarizing the relationship between the linear velocities (LV) of nitrous oxide gas and each of the decomposition ratio of nitrous oxide gas and the heat generation temperature in the reaction vessel were shown in FIG. 18.

TABLE 1

| LV [m/min] | SV [Hr$^{-1}$] | Flow Rate of N$_2$O [ml/min] | Heat Generation Temperature MAX [° C.] | Amount of Generated NO$_X$ [ppm] | Decomposition Ratio of N$_2$O [%] |
|---|---|---|---|---|---|
| 0.22 | 300 | 20 | 351 | 0 | 100 |
| 1.11 | 1500 | 100 | 417 | 0 | 100 |
| 1.72 | 2325 | 155 | 458 | 0 | 100 |
| 4.64 | 6255 | 417 | 587 | 22 | 99.4 |
| 6.43 | 8670 | 578 | 651 | 30 | 99.3 |
| 8.61 | 11610 | 774 | 727 | 40 | 99.2 |
| 12.75 | 17190 | 1146 | 838 | 60 | 98.9 |
| 20.90 | 28170 | 1878 | 951 | 1000 | 96.9 |
| 25.08 | 33810 | 2254 | 991 | 1700 | 95.4 |
| 27.17 | 36630 | 2422 | 1005 | 2800 | 94.3 |

Figure 18:
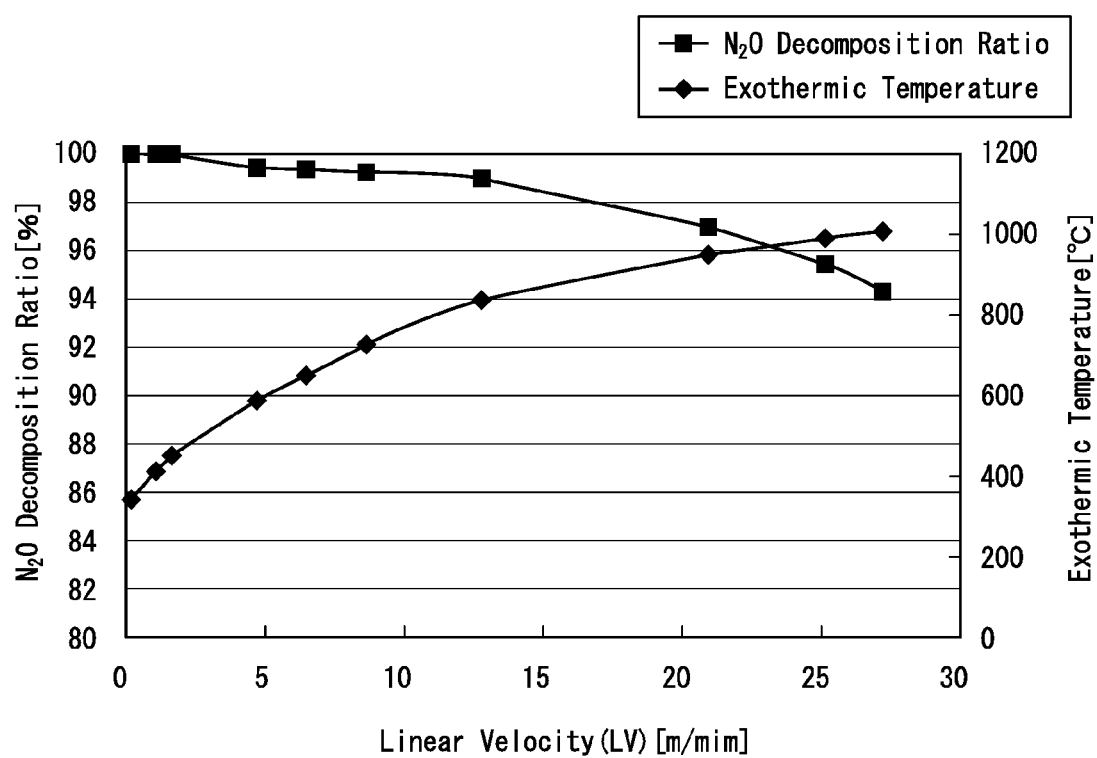
FIG. 18 is a graph showing the relationship between decomposition ratios of $N_2O$ and each of exothermic temperatures of the reaction vessel and linear velocities of the nitrous oxide gas in the examples.

As shown in FIG. 18 and Table 1, even using the nitrous oxide gas with a concentration of 100%, it is possible to decompose nitrous oxide gas at a high decomposition ratio (more than 99%) by adjusting the flow rate of the nitrous oxide gas to be supplied to the decomposition reactor as described above.

In addition, under the conditions of SV=17190 hr$^{-1}$ and LV=12.75 m/min shown in Table 1, after 1 hour (hr) of stopping heating by the heater, the heat generation temperatures of the reaction vessel and the decomposition ratios of nitrous oxide gas were measured As a result, it was found that it was possible to continue decomposition of the nitrous oxide gas at a decomposition ratio (98.7%) having the same level as that when starting heating, while keeping the exothermic temperature of the reaction vessel, because the decomposition heat generated by the decomposition of nitrous oxide gas was maintained after stopping heating by heater. For this reason, in order to terminate the decomposition of nitrous oxide gas after about 1 hour (hr) of stopping heating by the heater, the supply of nitrous oxide gas was stopped and then the decomposition was forcibly stopped. From this results, it was found that decomposition of nitrous oxide gas which is supplied thereafter can be continued without heating by the heater by using the decomposition heat generated by the decomposition of nitrous oxide gas.

INDUSTRIAL APPLICABILITY

According to the present invention, by utilizing the decomposition-gas and the decomposition heat generated by the decomposition of nitrous oxide, it is possible to use nitrous oxide as an environment-friendly energy. Further, since nitrous oxide is finally decomposed into nitrogen and oxygen as a decomposition-gas, the decomposition-gas may also be utilized as a new resource. In addition, since an industrial production of nitrous oxide is also possible, the utility value of the present invention in the industry is very high.

As mentioned above, since nitrous oxide is a stable gas at room temperature and atmospheric pressure and has a high safety and the low toxicity, handling nitrous oxide is easy. Further, it is possible to storage or transport it easily before decomposition as a liquefied high-pressure gas filled in the high pressure gas containers.

In addition, since nitrous oxide has a low melting point (about −90° C.), and does not freeze even in outer space, it may be used not only on earth, but also on celestial body other than the earth (Moon or Mars, for example) or outer space (space station or spacecraft, for example).

Further, in the present invention, since nitrous oxide may be decomposed into nitrogen and oxygen, for example, it is possible to use nitrous oxide not only as an energy source but also as respiratory gas source for space activities and underwater activities in the space environment such as in a spacecraft or space station, or in a marine environment such as in a submarines or sea station.

Further, in the present invention, by combining oxygen obtained by the decomposition of nitrous oxide with a suitable fuel such as hydrogen or methanol, for example, it may be used in a fuel cell (primary battery) or the like. Further, it is also possible to combine them with a battery (secondary battery) or the like.

Power generation apparatus according to the present invention may be used as a power source for driving electric vehicle (including hybrid vehicles). Further, a steam turbine driven by decomposition-gas boiler according to the present invention, and decomposition-gas turbine according to the present invention may be used as a power source for driving vehicle (including a hybrid car). The advantage of these is that nitrous oxide may be used as a safe fuel and exhaust gas does not contain carbon dioxide.

DENOTATION OF REFERENCE NUMERALS

1 . . . decomposition-gas boiler
2 . . . steam turbine
3 . . . electric generator
4 . . . condenser
5 . . . water supply pump
6 . . . decomposition reaction unit
7 . . . steam generation unit
11 . . . decomposition-gas turbine
12 . . . electric generator
13 . . . decomposition reaction unit
14 . . . turbine unit
21 . . . nitrous oxide decomposition catalyst
22 . . . decomposition reactor (decomposition reaction unit)
22*a* . . . main body
22*b* . . . gas inlet
22*c* . . . gas outlet
23 . . . fuel gas supply line (fuel gas supply device)
24 . . . nitrogen gas supply line (nitrogen gas supply device, concentration adjusting device)
25 . . . flow rate adjusting device (flow control unit)
26 . . . temperature measuring instrument (temperature measuring device)
27 . . . control unit (control unit)
28 . . . heater (preheating device)
29 . . . power supply line
30 . . . fuel gas valve
31 . . . fuel gas supply source
31*a* . . . high-pressure gas container
32 . . . nitrogen gas on-off valve
33 . . . nitrogen gas supply source 33a . . . high-pressure gas container
41 . . . decomposition-heat-recovery boiler
42 . . . steam turbine
43A, 43B . . . electric generator
44 . . . condenser
45 . . . water supply pump
51 . . . combustion gas boiler
52 . . . steam turbine
53 . . . electric generator
54 . . . condenser
55 . . . water supply pump
56 . . . combustion reactor
57 . . . steam generation unit
58a . . . decomposition-gas supply line
58b . . . fuel supply line
58c . . . nitrogen gas supply line
59a . . . nitrogen gas on-off valve
59b . . . nitrogen gas supply source
61 . . . combustion-gas turbine
62 . . . electric generator
63 . . . combustion reactor
64 . . . turbine unit
65a . . . decomposition-gas supply line
65b . . . fuel supply line
65c . . . nitrogen gas supply line
66a . . . nitrogen gas on-off valve
66b . . . nitrogen gas supply source
71 . . . exhaust-heat-recovery boiler
72 . . . steam turbine
73A, 73B . . . electric generator
74 . . . condenser
75 . . . water supply pump
80, 80 A . . . compression-typed heat pump
81 . . . refrigerant circulation system
82 . . . compression unit
83 . . . condensation unit
84 . . . expansion unit
85 . . . evaporator unit
86, 87 . . . fan (blower unit)
88 . . . four-way valve (switching device)
89 . . . indoor unit
90 . . . outdoor unit
R . . . refrigerant
$T_H$ . . . hot air
$T_L$ . . . cold air
100, 100 A . . . absorption-typed heat pump
101 . . . refrigerant circulation system
102 . . . absorption liquid circulation system
103 . . . condensation unit
103a . . . condensation chamber
103b . . . condenser
104 . . . evaporator unit
104a . . . evaporation chamber
104b . . . evaporator
105 . . . absorption unit
105 . . . absorption chamber
106 . . . regeneration unit
106a . . . regeneration chamber
107a to 107e . . . first to fifth pipes
108 . . . radiator
109 . . . heat pipe
110 . . . heat sink
111 . . . heat pipe
112 . . . heater (heating unit)
113 . . . cooler (cooling unit)
114 . . . cooler (cooling unit)
112a, 113a, 114a . . . heat sink (fin)

115 . . . first supply line
116 . . . second supply line
117 . . . third supply line
118 . . . discharge line
R . . . refrigerant
A . . . absorption liquid
W, C . . . coolant
$T_H$ . . . hot air
$T_L$ . . . cold air

The invention claimed is:

1. A power generation apparatus, comprising:
a decomposition-gas boiler, generating steam by heat recovery from a decomposition gas produced by decomposition of nitrous oxide,
a steam turbine, rotationally driven by the steam generated by the decomposition-gas boiler, and
an electric generator, generating electric power by driving the steam turbine;
or
a decomposition-gas turbine, rotationally driven by decomposition gas produced by decomposition of nitrous oxide and
an electric generator, generating electric power by driving the decomposition-gas turbine;
wherein the decomposition-gas turbine or the decomposition-gas boiler comprise a decomposition reaction unit, in which a nitrous oxide decomposition catalyst for decomposition of the nitrous oxide is placed and a preheating device for preheating the nitrous oxide decomposition catalyst for decomposition before starting decomposition of the nitrous oxide is provided; and
a fuel gas supply device, which supplies a fuel gas comprising nitrous oxide to the decomposition reaction unit, and
in the decomposition reaction unit, after decomposition of the nitrous oxide contained in the fuel gas using the nitrous oxide decomposition catalyst, decomposition of a nitrous oxide contained in a fuel gas which is supplied after the decomposition of the nitrous oxide contained in the fuel gas is continued by using the decomposition heat generated by decomposing the nitrous oxide.

2. The power generation apparatus according to claim 1, wherein
the decomposition-gas turbine or the decomposition-gas boiler further comprises a flow regulating device for regulating a flow rate of the fuel gas supplied to the decomposition reaction unit, and
a temperature of the decomposition-gas is controlled by adjusting the flow rate of the fuel gas supplied to the decomposition reaction unit;
or
the decomposition-gas turbine or the decomposition-gas boiler further comprises a concentration adjustment device for adjusting the concentration of nitrous oxide contained in the fuel gas, and
a temperature of the decomposition-gas is controlled by adjusting the concentration of the fuel gas supplied to the decomposition reaction unit.

3. The power generation apparatus according to claim 2, wherein the concentration adjustment device adjusts the concentration of nitrous oxide contained in the fuel gas by adding nitrogen to the fuel gas.

4. The power generation apparatus according to claim 2, wherein the decomposition-gas turbine or the decomposition-gas boiler further comprises a temperature measuring device for measuring the temperature of the decomposition-gas or the nitrous oxide decomposition catalyst or the decomposition-gas boiler, and the flow rate adjusting device adjusts the flow rate based on a result measured by the temperature measuring unit, or the concentration adjustment device adjusts the concentration based on a result measured by the temperature measuring unit.

5. The power generation apparatus according to claim 1, wherein the decomposition-gas turbine or the decomposition-gas boiler further comprises a nitrogen gas supply device for supplying the nitrogen gas to the decomposition reaction unit, and the nitrogen gas is supplied into the decomposition reaction unit after stopping the supply of fuel gas to the decomposition reaction unit.

6. The power generation apparatus according to claim 1, wherein the power generation apparatus further comprises a decomposition-heat-recovery boiler, generating steam by heat recovery from a decomposition gas produced by the decomposition-gas turbine, a steam turbine, rotationally driven by a steam generated by the decomposition-heat-recovery boiler, and an electric generator, generating electric power by driving the steam turbine.

7. The power generation apparatus according to claim 1, wherein the power generation apparatus further comprises a combustion-gas boiler, generating steam by heat recovery from combustion gas when fuel is burned by using the decomposition gas discharged from the decomposition-gas boiler, the decomposition-gas turbine, or the decomposition-heat-recovery boiler, a steam turbine, rotationally driven by a steam generated by the combustion-gas boiler, and an electric generator, generating electric power by driving the steam turbine.

8. The power generation apparatus according to claim 1, wherein the power generation apparatus further comprises a combustion-gas turbine, rotationally driven by combustion gas when fuel is burned by using the decomposition gas discharged from the decomposition-heat-recovery boiler, the decomposition-gas turbine, or the decomposition-gas boiler, and an electric generator, generating electric power by driving the steam turbine.

9. The power generation apparatus according to claim 8, wherein the power generation apparatus further comprises an exhaust-heat-recovery boiler that generates steam by heat recovery from combustion gas discharged from the combustion-gas turbine, a steam turbine, rotationally driven by a steam generated by the exhaust-heat-recovery boiler, and an electric generator, generating electric power by driving the steam turbine.

10. A power generation method, comprising steps of:

generating steam by a decomposition-gas boiler by heat recovery from decomposition gas produced by decomposition of nitrous oxide, rotationally driving a steam turbine by steam generated by the decomposition-gas boiler, and generating electric power using an electric generator by driving the steam turbine;

or rotationally driving a decomposition-gas turbine by decomposing gas produced by decompositing nitrous oxide, and generating electric power using an electric generator by driving the decomposition-gas turbine, wherein a fuel gas comprising nitrous oxide is supplied to a decomposition reaction unit in which a nitrous oxide decomposition catalyst for decomposition of the nitrous oxide is placed and a preheating device for preheating the nitrous oxide decomposition catalyst for decomposition before starting decomposition of the nitrous oxide is provided, and in the decomposition reaction unit, after using the nitrous oxide decomposition catalyst to decompose the nitrous oxide contained in the fuel gas, using the decomposition heat generated by decomposing the nitrous oxide to decompose nitrous oxide contained in a fuel gas which is supplied after the decomposition of the nitrous oxide contained in the fuel gas is continued.

11. The power generation method according to claim 10, wherein the method further comprises steps of:

generating steam using a decomposition-heat-recovery boiler by heat recovery from a decomposition gas produced by decomposition of nitrous oxide, rotationally driving a steam turbine using steam generated by the decomposition-heat-recovery boiler, and generating electric power using an electric generator by driving the steam turbine.

12. The power generation method according to claim 10, wherein the method further comprises steps of generating steam using a combustion-gas boiler by heat recovery from the combustion gas when fuel is burned using the decomposition gas discharged from the decomposition-heat-recovery boiler, the decomposition-gas turbine, or the decomposition-gas boiler, rotationally driving a steam turbine by a steam generated by the combustion-gas boiler, and generating electric power using an electric generator by driving the steam turbine.

13. The power generation method according to claim 10, wherein the method further comprises steps of:

rotationally driving a combustion-gas turbine using combustion gas when fuel is burned by using the decomposition gas discharged from the decomposition-heat-recovery boiler, the decomposition-gas turbine, or the decomposition-gas boiler, and generating electric power using an electric generator by driving the combustion-gas turbine.

14. The power generation method according to claim 13, wherein the method further comprises steps of:

generating steam using an exhaust-heat-recovery-boiler by heat recovery from the combustion gas discharged from the combustion-gas turbine, rotationally driving a steam turbine using a steam generated by the exhaust-heat-recovery boiler; and generating electric power using an electric generator by driving the steam turbine.

15. A decomposition-gas boiler, which generates steam or hot water by heat recovery from a decomposition gas produced by decomposition of nitrous oxide, comprising a decomposition reaction unit, in which a nitrous oxide decomposition catalyst for decomposition of the nitrous oxide is placed and a preheating device for preheating the nitrous oxide decomposition catalyst for decomposition before starting decomposition of the nitrous oxide is provided; and a fuel gas supply device, which supplies a fuel gas comprising nitrous oxide to the decomposition reaction unit, and in the decomposition reaction unit, after decomposition of the nitrous oxide contained in the fuel gas using the nitrous oxide decomposition catalyst, using the decomposition heat generated by decomposing the nitrous oxide to decompose a nitrous oxide contained in a fuel gas which is supplied after the decomposition of the nitrous oxide contained in the fuel gas is continued.

16. A decomposition-gas turbine, which is rotationally driven by a decomposition gas produced by decomposition of nitrous oxide, comprising
- a decomposition reaction unit, in which a nitrous oxide decomposition catalyst for decomposition of the nitrous oxide is placed and a preheating device for preheating the nitrous oxide decomposition catalyst for decomposition before starting decomposition of the nitrous oxide is provided; and
- a fuel gas supply device, which supplies a fuel gas comprising nitrous oxide to the decomposition reaction unit,
- wherein in the decomposition reaction unit, after decomposition of the nitrous oxide contained in the fuel gas using the nitrous oxide decomposition catalyst, using the decomposition heat generated by decomposing the nitrous oxide to decompose a nitrous oxide contained in a fuel gas which is supplied after the decomposition of the nitrous oxide contained in the fuel gas is continued.

* * * * *